United States Patent
Cote et al.

(10) Patent No.: US 7,303,677 B2
(45) Date of Patent: Dec. 4, 2007

(54) SUPPORTED BIOFILM PROCESS

(75) Inventors: Pierre Lucien Cote, Dundas (CA); Hidayat Husain, Oakville (CA); Henry Behmann, Puslinch (CA)

(73) Assignee: Zenon Technology Partnership, Wilmington, DE (US)

( * ) Notice: Subject to any disclaimer, the term of this patent is extended or adjusted under 35 U.S.C. 154(b) by 0 days.

(21) Appl. No.: 11/357,051

(22) Filed: Feb. 21, 2006

(65) Prior Publication Data

US 2006/0163157 A1   Jul. 27, 2006

Related U.S. Application Data

(63) Continuation of application No. 11/203,197, filed on Aug. 15, 2005, which is a continuation-in-part of application No. PCT/CA2004/000206, filed on Feb. 13, 2004, and a continuation of application No. PCT/CA2004/001495, filed on Aug. 12, 2004, and a continuation-in-part of application No. 10/896,086, filed on Jul. 22, 2004, and a continuation-in-part of application No. 10/801,660, filed on Mar. 17, 2004, now Pat. No. 7,169,295, and a continuation-in-part of application No. 10/777,204, filed on Feb. 13, 2004, now Pat. No. 7,118,672, and a continuation-in-part of application No. PCT/CA2004/001496, filed on Aug. 12, 2004, and a continuation-in-part of application No. 10/895,959, filed on Jul. 22, 2004.

(60) Provisional application No. 60/496,178, filed on Aug. 18, 2003, provisional application No. 60/447,025, filed on Feb. 13, 2003.

(51) Int. Cl.
*C02F 3/00* (2006.01)

(52) U.S. Cl. ..................... 210/615; 210/619
(58) Field of Classification Search ............... 210/615, 210/619
See application file for complete search history.

(56) References Cited

U.S. PATENT DOCUMENTS 2,458,163 A   1/1949 Hays (Continued)

FOREIGN PATENT DOCUMENTS

CA   1096976   3/1981

(Continued)

OTHER PUBLICATIONS

English Language Abstract JP 54-21057, Feb. 16, 1979, Doriko.

(Continued)

*Primary Examiner*—Chester T. Barry
(74) *Attorney, Agent, or Firm*—Bereskin & Parr

(57) ABSTRACT

A membrane supported biofilm reactor uses modules having fine, hollow fibres, for example, made from melt spun thermoplastic polymers treated after spinning to increase their permeability to oxygen, used, for example, in tows or formed into a fabric. In one module, one or more sheets of the fabric are potted into a module to enable oxygen containing gas to be supplied to the lumens of the hollow fibres. Various reactors and processes, for example to treat wastewater, using such modules are described. In one process, oxygen travels through fibers, optionally through an attached biofilm, to oxygenate surrounding water. Mechanical, chemical and biological methods, for example endogenous respiration, are used to control the thickness of the biofilm.

23 Claims, 25 Drawing Sheets

U.S. PATENT DOCUMENTS

| | | |
|---|---|---|
| 4,126,544 A | 11/1978 | Baensch et al. |
| 4,181,604 A | 1/1980 | Onishi et al. |
| 4,328,102 A | 5/1982 | Bellhouse et al. |
| 4,341,005 A | 7/1982 | Oscarsson |
| 4,416,993 A | 11/1983 | McKeown |
| 4,664,681 A | 5/1987 | Anazawa et al. |
| 4,746,435 A | 5/1988 | Onishi et al. |
| 4,883,594 A | 11/1989 | Sekoulov et al. |
| 5,015,421 A | 5/1991 | Messner |
| 5,034,164 A | 7/1991 | Semmens |
| 5,043,140 A | 8/1991 | Combs |
| 5,116,506 A | 5/1992 | Williamson et al. |
| 5,126,050 A | 6/1992 | Irvine et al. |
| 5,149,649 A | 9/1992 | Miyamori et al. |
| 5,238,562 A | 8/1993 | Rogut |
| 5,395,468 A | 3/1995 | Juliar et al. |
| 5,439,736 A | 8/1995 | Nomura |
| 5,482,859 A | 1/1996 | Biller |
| 5,486,475 A | 1/1996 | Kramer et al. |
| 5,518,620 A | 5/1996 | Eguchi et al. |
| 5,520,812 A | 5/1996 | Ryhiner et al. |
| 5,523,003 A | 6/1996 | Sell et al. |
| 5,543,039 A | 8/1996 | Odegaard |
| 5,647,986 A | 7/1997 | Nawathe et al. |
| 5,716,689 A | 2/1998 | Rogut |
| 5,945,002 A | 8/1999 | Leukes et al. |
| 6,001,585 A | 12/1999 | Gramer |
| 6,013,511 A | 1/2000 | Diels et al. |
| 6,183,643 B1 | 2/2001 | Goodley |
| 6,209,855 B1 | 4/2001 | Glassford |
| 6,241,867 B1 | 6/2001 | Mir |
| 6,309,550 B1 | 10/2001 | Iversen et al. |
| 6,354,444 B1 | 3/2002 | Mahendran et al. |
| 6,361,695 B1 | 3/2002 | Husain et al. |
| 6,387,262 B1 | 5/2002 | Rittmann et al. |
| 6,531,062 B1 | 3/2003 | Whitehill |
| 6,558,549 B2 | 5/2003 | Cote et al. |
| 6,592,759 B2 | 7/2003 | Rabie et al. |
| 6,685,832 B2 | 2/2004 | Mahendran et al. |
| 6,863,815 B1 | 3/2005 | Smith |
| 6,878,279 B2 * | 4/2005 | Davis et al. ............... 210/610 |
| 2001/0037967 A1 | 11/2001 | Rabie et al. |
| 2002/0020666 A1 | 2/2002 | Cote et al. |
| 2002/0171172 A1 | 11/2002 | Lowell |
| 2003/0092020 A1 | 5/2003 | Carson et al. |
| 2003/0104192 A1 | 6/2003 | Hester et al. |
| 2004/0060442 A1 | 4/2004 | Nakahara et al. |
| 2004/0115782 A1 | 6/2004 | Paterek |
| 2004/0224396 A1 | 11/2004 | Maston |
| 2005/0064577 A1 | 3/2005 | Berzin |
| 2005/0260739 A1 | 11/2005 | Rosen et al. |
| 2005/0269263 A1 | 12/2005 | Rittmann et al. |

FOREIGN PATENT DOCUMENTS

| | | |
|---|---|---|
| CA | 1177977 | 11/1984 |
| CA | 2005959 | 6/1990 |
| CA | 2100002 | 2/1994 |
| CA | 2102156 | 7/1994 |
| CA | 2182915 | 2/1997 |
| CA | 2356316 | 8/2000 |
| CA | 2300719 | 9/2001 |
| CA | 2458566 | 8/2004 |
| DE | 3544382 | 6/1986 |
| DE | 4440464 | 6/1987 |
| DE | 3730797 | 3/1989 |
| EP | 0049954 | 4/1982 |
| JP | 54-21057 | 2/1979 |
| WO | WO8703615 | 6/1987 |
| WO | WO2005/113456 | 12/2005 |

OTHER PUBLICATIONS

Dr. Michael J. Semmens and Denise Hanus, "Studies of a Membrane Aerated Bioreactor for Wastewater Treatment", Cranfield University, Jun. 1999.

Brindle et al., "Nitrification and Oxygen Utilisation in a Membrane Aeration Bioreactor", Journal of Membrane Science, 1998.

Cote et al., "Bubble-free Aeration Using Membranes: Process Analysis", Journal Water Pollution Control Federation, Nov. 1998.

Yeh, Show-Jong and Charles R. Jenkins, "Pure Oxygen Fixed Film Reactor", Journal of the Environmental Engineering Division, Aug. 1978, pp. 611-623.

Woolard, C.R., "The Advantages of Periodically Operated Biofilm Reactors for the Treatment of Highly Variable Wastewater", Wat. Sci. Tech. vol. 35, No. 1, pp. 199-206, 1997.

Twarowska-Schmidt, Krystyna and Andrzej Wlochowicz, "Melt-spun Asymmetric Poly (4-methyl-1-pentene) Hollow Fibre Membranes", Journal of Membrane Science 137 (1997), 55-61.

Yamagiwa et al, "Simultaneous Organic Carbon Removal and Nitrification by Biofilm Formed on Oxygen Enrichment Membrane", Journal of Chemical Engineering of Japan, 27 (Oct. 1994). 638-643.

Casey et al., "Review of Membrane Aerated Biofilm Reactors," Resources, Conservation and Recycling 27 (1999) 203-215.

* cited by examiner

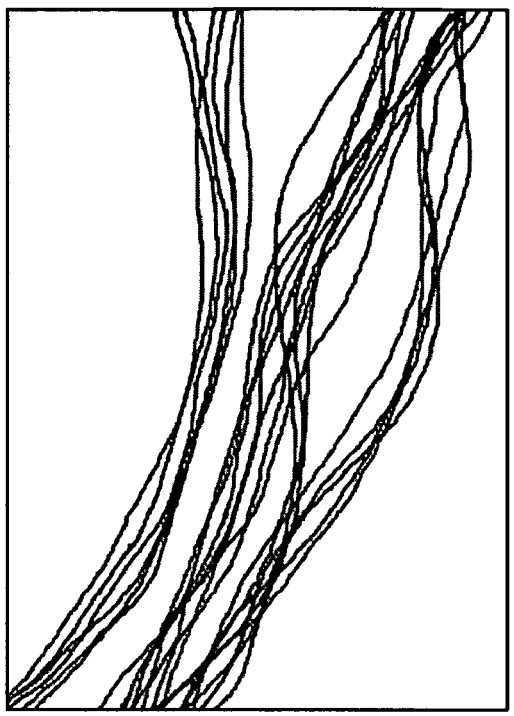
FIG. 1
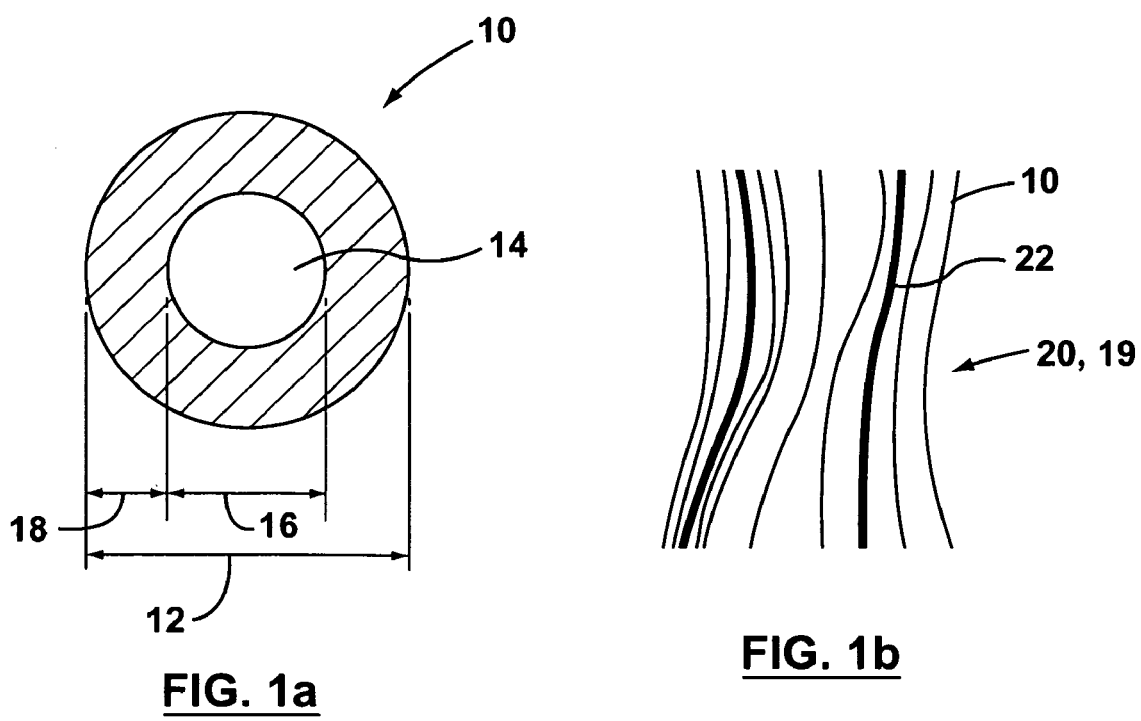
FIG. 1a
FIG. 1b

SUPPORTED BIOFILM PROCESS

This is (1) a continuation of U.S. application Ser. No. 11/203,197 filed Aug. 15, 2005; which is a continuation-in-part of International Application No. PCT/CA2004/000206 filed Feb. 13, 2004 (2) a continuation of International Application No. PCT/CA2004/001495 filed Aug. 12, 2004; (3) a continuation-in-part of U.S. application Ser. No. 10/896,086 filed Jul. 22, 2004; (4) a continuation-in-part of U.S. Ser. No. 10/801,660 filed Mar. 17, 2004, now U.S. Pat. No. 7,169,295 which is an application claiming the benefit under 35 USC 119(e) of U.S. Provisional Patent Application Ser. No. 60/496,178 filed Aug. 18, 2003; (5) a continuation-in-part of U.S. Ser. No. 10/777,204 filed Feb. 13, 2004 now U.S. Pat. No. 7,118,672 which is an application claiming the benefit under 35 USC 119(e) of U.S. Provisional Patent Application Ser. No. 60/447,025 filed Feb. 13, 2003; (6) a continuation-in-part of International Application No. PCT/CA2004/001496 filed Aug. 12, 2004; and, (7) a continuation-in-part of Ser. No. 10/895,959 filed Jul. 22, 2004. This application also claims priority from Canadian Patent Application Nos. 2,438,444; 2,438,441; 2,438,432; 2,438,050; and, 2,438,101 all filed Aug. 22, 2003 and Canadian Patent Application No. 2,458,566 filed Feb. 13, 2004. All of the applications listed above are incorporated herein in full by this reference to them.

FIELD OF THE INVENTION

This invention relates to a gas transfer apparatus and process, for example to support a biofilm in a liquid, as in a water or wastewater treatment process or apparatus and more particularly to a membrane supported biofilm module and process.

BACKGROUND OF THE INVENTION

Currently, most wastewater treatment plants use an activated sludge process, based on biological oxidation of organic contaminants in a suspended growth medium. Oxygen is supplied from air using bubble type aerators. Efficiency of these systems is poor resulting in very high energy use. Tank size is large since oxygen demand loadings are low. The result is high capital and operating cost.

A second type of established biological oxidation process uses biofilms grown on a solid media. For example, the wastewater may be circulated to the top of the reactor and trickles down. Air is supplied at the bottom. The rate of oxygen transfer is limited by the biofilm surface area, and the operating cost is high because of wastewater pumping requirements.

Recently, development work has been done on a membrane supported bioreactor concept. For example, U.S. Pat. Nos. 4,181,604 and 4,746,435 describe a process for treating wastewater by supplying oxygen from one side of a gas-permeable membrane to micro-organisms growing on the other side of the membrane. Hollow fibers with porous walls were used as the membrane. In U.S. Pat. No. 5,116,506, a gas permeable membrane divides a reactor vessel into a liquid compartment and a gas compartment. A biofilm is grown on the gas permeable membrane on the liquid side of the membrane. Oxygen and alternate gases pass through the membrane to the bacteria growing on the liquid side of the membrane.

SUMMARY OF THE INVENTION

It is an object of this invention to improve on the prior art. It is another object of this invention to provide methods and apparatus suitable for treating water, for example industrial and municipal wastewater, using membrane supported bioreactor technology. It is another object of this invention to provide a hollow fibre gas transfer membrane and module which is, for example, suitable for supporting a biofilm. It is another object of the invention to select a membrane material suitable for use in membrane supported biofilm modules and processes. These aspects and others are met by the invention described and claimed herein. The following summary will introduce the reader to various aspects of the invention but is not intended to define the invention which may reside in a combination or sub-combination of various elements or steps found in the following summary or other parts of this document.

In one aspect, the invention provides a membrane and module with a reasonably high gas transfer rate and adequate surface area, for oxygen transfer, biofilm support or both, to allow a membrane supported biofilm reactor to provide an operating cost advantage over other processes used in the art. The membrane and module may have an oxygen transfer efficiency (OTE) of over 50% or in the range of 50% to 70% or more. The module may be made of non-porous or dense walled hollow fibre membranes to provide a large surface area while avoiding the tendency of porous fibers to wet over time which results in a drastic drop in their oxygen transfer rates.

In another aspect, the invention provides a very fine dense hollow fibre made from poly methylpentene (PMP), which has a high selectivity and diffusion coefficient for oxygen. In particular, PMP has a gas permeability of about 70,000 cc·mm/m$^2$·24 hr·Bar in dense wall, non-wetting form without being treated to increase the porosity of the base material. While this is significantly less than silicone, which has an extremely high gas permeability, PMP may be melt spun into a hollow fibre. The fiber can have an outside diameter of 500 microns or less or 100 microns or less. Use of such a small diameter fibre helps reduce module cost as textile fine fibre technology can be used to create modules. A very large surface area can be provided to achieve high OTE. The non-porous wall, meaning a wall with only very small openings, for example of 30 Angstroms or less, or about 4 or 5 Angstroms in the case of unmodified PMP, avoids wetting which would reduce the flux through the fibers.

In another aspect, the invention relates to an apparatus or process using other than homogenous dense walled fibers. Buy using PMP in hollow fibre form, an effective module can be made. However, PMP is still expensive compared to more common materials. For example, it is currently about 10 times as expensive as other thermoplastic polymers including more common polyolefins such as polyethelene (PE) and polypropylene (PP). These substances have poor gas transfer rates in dense wall form of only about 4,000 to 8,000 cc·mm/m$^2$·24 hr·Bar. These materials may be made in a microporous form with much increased gas permeability and treated chemically to make them hydrophobic. However, the chemically treated pores tend to wet out in practice when immersed in water containing surfactants or proteins resulting in a significant decrease in flux rate. Alternately, the fibres may be melt spun to have a partially dense, asymmetric, variable porosity or homogenous wall which does not permit water flow even without chemical treatment to make the fibers hydrophobic, but has gas permeability over the standard values mentioned above. The increased permeability results from altering the method used to make the fibres, for example by thermal or physical treatment after the fibers leave the spinneret. The method of making the fibres also typically reduces the selectivity of the membranes, for example selectivity to carbon dioxide or nitrogen ($O_2/N_2$, $O_2/CO_2$) may be as low as 5 or less for PP or 3 or 1.5 or less for all fibers. This lack of selectivity may make the fibres unsuitable for gas separation but the inventors have found that high selectivity is not required, and may even be undesirable, in many water treatment applications. In particular, where air is used as a source of oxygen to support a biofilm growing in water, there are minimally adverse or even useful partial pressure gradients of carbon dioxide or nitrogen across the membrane wall. The polymer used for the fibres may still be a highly gas permeable polymer such as PMP. However, the fibres may also be made of less expensive polymers, for example other polyolefins such as PE or PP. The polymer is extruded as fine hollow fibres by melt spinning under certain conditions and subject to post-treatment whereby the permeability to gases is increased, for example to 20,000 or 30,000 cc·mm/m$^2$·24 hr·Bar or more for a PE or PP fibre.

In another aspect, the invention provides a fabric with a very large number of hollow fibres, for example of any of the fibers as described above, providing sufficient surface area so that oxygen transfer does not become a limiting factor in controlling biological kinetics. The fabric may be made, for example, with the hollow fibres, optionally collected into units, woven as weft and an inert fibre as warp to minimize the damage to the transfer fibre while weaving. Other methods of preparing a fabric may also be used. The fabric provides strength to the fine fibre to permit biofilm growth on its surface with minimal fibre breakage.

In another aspect, the invention provides a module built from fabric sheets with very high packing density to permit good substrate velocities across the surface without recirculation of large volume of liquid. The modules enable a supply of oxygen containing gas, such as air, to be supplied to the lumens of the hollow fibres without exposing the lumens to the wastewater. Long fibre elements, for example between 1 and 3 metres or between 1.5 and 2.5 metres are used and potted in the module header to provide a low cost configuration.

In another aspect, a biofilm is grown on a fabric made from a gas permeable hollow fibre, for example any of the fibers described herein. Oxygen bearing gas is introduced into the lumen of the fibre. Aerobic reactions take place near the surface of the fibre, where the highest levels of oxygen exists. These reactions include conversion of organic carbon compounds to carbon dioxide and water, and ammonia to nitrates. The surface of the biofilm is maintained under anoxic conditions such that conversion of nitrates to nitrogen can take place. The result is simultaneous reduction of organic carbon, ammonia and total nitrogen.

In another aspect, the invention uses oxygen enrichment as a means of dealing with peak flows. Need for such oxygen enrichment may be determined by on-line COD monitors, or set according to time of day for, for example, municipal applications where diurnal flow and strength variations are well known.

In another aspect, the invention uses the module and bioreactor design to conduct other biological reactions on the surface of the fabric. An example is biological reduction of compounds such as nitrates in water using hydrogen gas supplied to the lumen of the hollow fibre.

In another aspect, the invention uses either air or enriched air to supply oxygen. Selection of enriched air and level of oxygen present in such air may be determined by the wastewater strength.

In another aspect, the invention may be used to digest primary and/or secondary sludge.

In another aspect, fibres, for example fibers of any of the types described herein, may have a small outside diameter, such as 100 μm or less, and substantial hollow area, for example 30% or more or 40% or more, so as to have a thin wall. The fibres can be woven, knitted, stitched or otherwise made into a fabric. The use of fine hollow fibres allows the thickness of the fibre wall to be low, for example 20 μm or less, which is several times less than what would be required to make a film handleable. The fine fibres may themselves be difficult to handle on their own, but may be combined into units such as threads or tows for handling which may include forming textile sheets. The fabric, having a large number of hollow fibres, despite the optional use of inexpensive polymers as the base material, provides sufficient surface area for oxygen transfer capability such that air can be used as a feed gas without limiting the growth of the biofilm or other biological kinetics and with acceptable pressure loss due to air flow through the module.

In another aspect, plug flow or multistage continuous stirred or batch tank reactors may be used to conduct biological reactions at the highest possible substrate concentrations for a given feed. This maximizes mass transfer of organic carbon compounds and ammonia in the biofilm, eliminating these processes as potential limitations to reaction rates. In multi-stage reactors, module designs with lower surface areas for oxygen transfer to biofilm surface area ratios may be used in downstream stages. The total surface area for oxygen transfer, for example per unit of tank volume or flow rate of feed, may increase or decrease in the downstream reactor since the lower ratio may result from an increase in biofilm surface area rather than a decrease in surface area for oxygen transfer.

In another aspect, the invention provides a membrane supported batch biofilm reactor (MSBBR). The reactor includes one or more membrane modules which are fed an oxygen containing gas and support a biofilm layer. The modules are located inside of a tank that is cyclically filled and drained to provide a batch treatment process. In an embodiment, the modules are made of a hollow fibre fabric and are used to reduce the COD, ammonia, total nitrogen and suspended solids in an industrial wastewater to concentrations suitable for discharge into a municipal sewer system or for direct discharge to a receiving stream. In another embodiment, the modules are used to reduce COD, ammonia, total nitrogen and suspended solids in a municipal wastewater stream for direct discharge to a receiving stream. In another embodiment, the modules are used to reduce COD, ammonia, total nitrogen and suspended solids in a septic tank to reduce the size of the septic field or to use simpler, lower cost disposal techniques or for direct discharge to a receiving stream.

In another aspect, the invention provides one or more methods of controlling the growth or thickness of a biofilm layer growing on the modules. Some method(s) involve applying one or more substances to the biofilm from the tank side while the tank is drained of feed. These substances may include gases, such as ozone or chlorine, or liquid such as heated water or basic or acidic solutions. During the application of the control substance, conditions in the biofilm may be cycled from aerobic to anaerobic by turning the supply of oxygen to the inside of the module on and off. The biofilm may also be starved prior to the application of the control substance by removing the feed water, replacing the feed water with clean water or replacing the feed water with feed at a loading of 0.1 kg COD per kg MLSS per day or less. After the application of the control substance, mechanical biofilm control methods may also be used on the weakened biofilm.

In another aspect, this invention uses scouring air provided on the outsides of the fibres as a means of controlling the biofilm thickness to an optimum level. Air may be used as a means of controlling the biofilm thickness to a desired level. Treatment with acid, alkali, oxidant, or enzyme, or anaerobic treatment may be used periodically prior to air scouring to weaken the biofilm and to improve the efficacy of air in completely or partially removing the biofilm. Other methods of biofilm control include in-situ digestion, periodic ozonation followed by digestion, periodic alkali or acid treatment followed by digestion, periodic enzyme treatment followed by digestion, and use of a higher life form, such as worms, to digest the biofilm periodically. To speed up the biological digestion reactions, the air supplied to inside of the module may be preheated to raise the temperature of the bioreactor.

In another aspect, the invention provides a tow of hollow fibers, for example any of the fibers described herein, for example with an outside diameter (OD) of 500 microns or less or 100 microns or less. To facilitate building modules with minimal reduction in the effective surface area of the fibres, the fibres are processed or used as tows over a significant portion, for example one half or more, of their length. Modules may be made directly from the tows without first making a fabric. The tows may also be made into open fabrics to facilitate potting, for example along the edges of the fabric, while leaving significant portions of the fibres as tows, for example a portion between the edges of the fabric. The modules made from tows may be potted at both ends, or potted at one end only with the other end left unpotted with fibre ends open to permit exhaust gas to escape. A single header module may have lower cost than a double header module. A single header module may be inserted in a vertical configuration with the header at the bottom and the fibres floating upwards. Such a module may be aerated from outside the module to remove accumulations of trash and solids. Feed may also be screened, for example through a 0.5 mm screen, to reduce trash in the feed before it enters the reactor. Where the tow module is used in a downstream stage of a multi-stage reactor, the upstream stage may also reduce the amount of trash fed to the tow module reactor.

In another aspect, reactors for treating wastewaters of different strength are provided with modules having different ratios of surface area for gas transfer to surface area of the attached biofilm. The surface area for gas transfer is the area of the outer surface of the module that is in contact with the supported biofilm. The surface area of the biofilm is the area of the outer surface of the biofilm that contacts the wastewater. Is some cases, the surface area of the biofilm depends on the thickness of the biofilm which, for calculations or for comparing modules, may be the actual thickness or time average of thicknesses of a biofilm in a rector or a nominal or design thickness or average thickness, for example 250 microns. A reactor for treating wastewater with a COD of over 1000 mg/L may have a module with a surface area for gas transfer to surface area of attached biofilm ratio of more than 1, more than 1.6, or between 1.6 and 10. A reactor for treating wastewater with a COD of less than 1000 mg/L may have a module with a surface area for gas transfer to surface area of attached biofilm ratio of less than 2.5 or between 0.2 and 2.5. A reactor for treating wastewater with a COD of less than 300 mg/L may have a module with a surface area for gas transfer to surface area of attached biofilm ratio less than 1 or between 0.1 and 10. In a multi-stage process, two or more reactors may be connected in series with the outlet of an upstream reactor connected to the inlet of a downstream reactor. The COD of the wastewater to be treated decreases through each reactor and the surface area for gas transfer to surface area of attached biofilm ratio for modules in a downstream reactor is less than for modules in an upstream reactor.

In another aspect of the invention, a biofilm is maintained in a state of endogenous respiration. Endogenous respiration may be achieved by limiting the F/M ratio of a reactor or limiting the oxygen supply to the biofilm. In a multistage reactor, an oxygen limited biofilm may be used upstream of a food limited biofilm. The F/M ratio applied to the oxygen limited biofilm may be greater than that applied to the downstream biofilm.

In another aspect of this invention, modules, for example any of those described herein, are used to supply oxygen to a suspended growth bioreactor. Either pure oxygen, or air, or oxygen enriched air may be used as a source of oxygen in such an application. As oxygen is supplied in a molecular form to the mixed liquor, it is consumed completely and at very high oxygen uptake rates.

In another aspect of this invention, modules, for example any of those described herein, are used to supply oxygen to a suspended growth bioreactor, while permitting the growth of a thin biofilm on the fibre surface. The thickness of this biofilm is normally maintained at a very small value, for example 100 microns or less due to the low concentration of substrate in a suspended growth bioreactor, and due to mixing conditions in the bioreactor, and does not become the controlling factor in oxygen transfer. Oxygen transfer through the wall of the very fine fibre may remain the mass transfer controlling step. Provision of very high surface area in a module containing very fine fibre, for example as disclosed herein, permits transfer of large quantity of oxygen to the bioreactor in a molecular from to permit oxygen uptake at a high rates of 200 mg/h/L of bioreactor volume or greater than 125 mg/h/L, or greater than 100 mg/h/L.

In another aspect of this invention, modules, for example any of those disclosed herein, are used to supply oxygen to a suspended growth bioreactor, while growing a thin biofilm, for example between 20 and 100 microns on the surface of the fibre. Such biofilm is grown to have improved nitrification properties due to high oxygen concentration at the surface of the fibre, and low concentration of biodegradable carbon compounds in the mixed liquor. Under such conditions, growth of nitrifying organisms is promoted. This promotes partial nitrification in the biofilm, while supplying oxygen far in excess of that required for nitrification through the fibre wall and the biofilm to the mixed liquor for organic carbon digestion and nitrification of remaining ammonia in the suspended media. COD may also be removed in the biofilm in addition to or instead of ammonia.

The features of these various embodiments or aspects may be combined together in various combinations or subcombinations. Other aspects of the invention are described in the claims or in the following drawings or description.

BRIEF DESCRIPTION OF THE DRAWINGS

Embodiments of the invention will be described below with reference to the following figures.

FIG. 1 is a picture of a group of hollow fibres.

FIG. 1a is a cross-section of a hollow fiber.

FIG. 1b shows a group of hollow fibers and inert fibers collected into a unit.

FIG. 4b shows details of a part of the sheet of FIG. 4a.

DESCRIPTION OF EMBODIMENTS

1.0 Module Elements

1.1 Fiber

FIGS. 1 and 1a show a Poly (4-methylpentene-1) (PMP) fiber 10 that is hollow inside but non-porous with homogenous dense walls. In a group of fibers 10, the fibers 10 may have various diameters, and may be fine fibers having outside diameters of less than 500 microns or less than 100 microns, for example, between 30 and 100 microns, or between 50 and 60 microns. The hollow fibres 10 shown are called non-porous because water does not flow through the fiber walls by bulk or advective flow of liquid water even though there are small openings through the wall, typically in the range of 4 or 5 Angstroms in the embodiment illustrated. However, oxygen or other gases may permeate or travel through the fiber walls. The fibers are called dense walled because gas travel is primarily by molecular diffusion or dissolution-diffusion which occurs when openings in the fiber walls are generally less than 30 Angstroms. The term porous has been used in some publications to refer to any structure having openings larger than in a dense wall, for example having openings of 30 or 40 Angstroms or more, but without openings large enough to be wetted or transport liquid water by advective, Poiseuille or bulk flow. In this document, membranes or layers of membranes with openings in this size range will be referred to as semi-porous.

Figure 2:
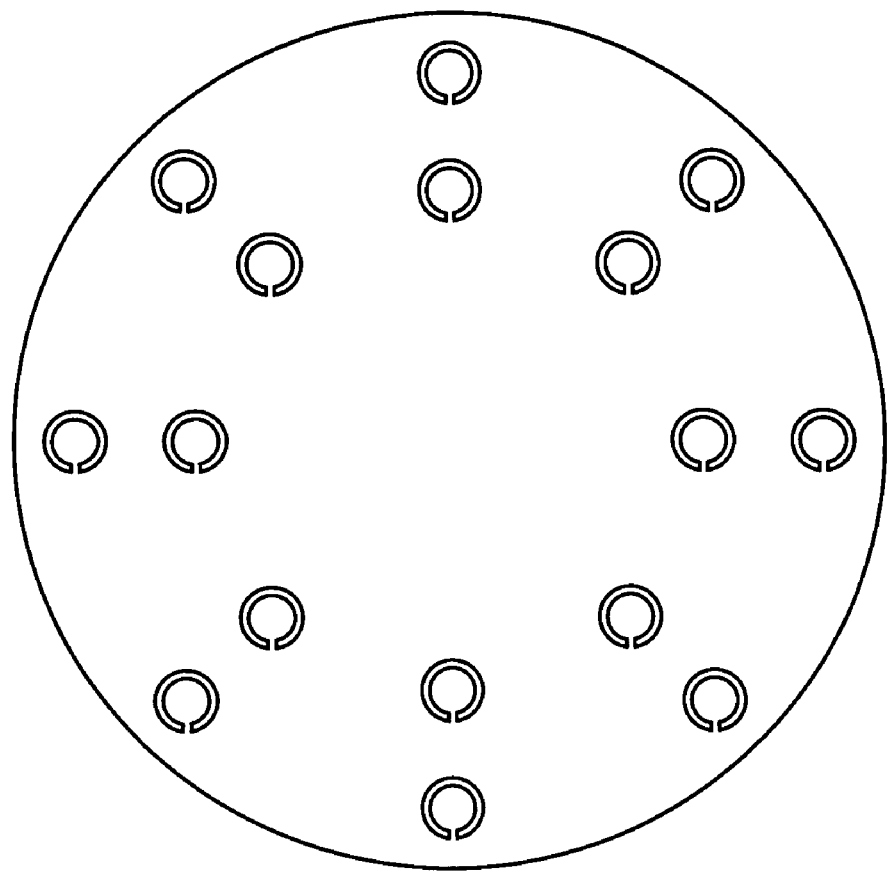
FIGS. 2a through 2d and 2 show slot arrangements and a spinneret for melt spinning fibers.
Figure 2A:
Figure 2B:
Figure 2C:
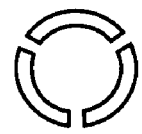
Figure 2D:
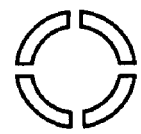

The hollow fiber 10 can be prepared by melt spinning, alternately called melt extrusion. In melt spinning a polymer granulate, for example of PMP, is fed to the hopper of an extruder. The polymer granulate is heated and melted in the extruder and continuously extruded to a spinning head under a pressure of several tens of bars. The spinning head consists of a heated in-line filter and spinneret. The spinneret is essentially a steel plate with thin arc shaped slots in circular arrangements. Examples of suitable slot arrangements for the formation of a hollow fiber are shown in FIGS. 2a to 2d. As shown in FIG. 2, the spinneret may have multiple groups of slots so that many fibers, 8 in the spinneret shown, can be extruded simultaneously. The molten polymer is extruded through the spinneret, leaves the slots and closes into a hollow fiber in a cooling zone. The gaps caused by the segment dividers allow air into the fibre to prevent collapse before the fibre sections fuse to form the annulus. In the cooling zone, the polymer fiber form is solidified and cooled by a controlled cross flow of air and the end is collected on a take up winder. Suitable fibers 10 may also be formed by other melt spinning methods. For example, in pipe in hole spinning the polymer is melted and drawn through an annular spinneret while passing a gas into the lumen of the extruded fibers through another hole in the spinneret to prevent fiber collapse. Methods other than melt spinning may also be used. Alternately, the melt spun fibers may be further treated after spinning.

Referring to FIG. 1a, in the illustrated embodiment, fibres 10, for example fibers of any of the materials or made by any of the processes described in this document, may have an outside diameter 12 of 100 μm or less. The hollow area (or area of the lumen 14) of the fibre may be more than 10% or more than 30% or 40% of the cross-sectional area of the fibre. The hollow area is typically less than 60% or 50% of the cross-sectional area of the fiber. For example, a polymethyl pentene or PE or PP fibre may be made having an outside diameter 12 of between about 50 to 60 μm and an inside diameter 16 of 30 μm or more, resulting in a wall thickness 18 of 10 μm or less and a gas permeability of over 20,000 or 30,000 cc·mm/m$^2$·24 hr·Bar or more.

In the embodiment illustrated in FIG. 1, the textile PMP fibre 10 has about a 45 micron outside diameter 12 and about a 15 to 30 micron inside diameter 16. The fibre 10 was melt extruded using MX-001 or MX-002 PMP, produced by Mitsui Petrochemical of Japan and sold under the name TPX, as the raw polymer through a segmented spinneret as described above. This fiber 10 was used in some embodiments and examples described in this document, although other fibers 10 may also be used.

In another embodiment, a melt spun thermoplastic polymer is mechanically or thermally treated after spinning to increase its permeability to oxygen without making the fiber wettable or capable of permitting advective flow of liquid water. While the precise reason for the increase in gas permeability remains unclear, it has been proposed that gas permeability of the fibers 10 is increased by adjusting the spinning process parameters to increase crystallinity and enhance molecular chain alignment to obtain a row or stacked lamellar structure. Permeability increase is then obtained by lamella separation of the row lamellar structure. Another theory is that air permeability can be increased by preventing the complete growth of stacked lamellar crystals. Either of these or other theories may be correct but the inventors do not rely on or limit the invention to any particular theory. Spinning or post-treatment steps that can be used or controlled to increase permeability include the spinning speed or drawing ratio, the quenching conditions such as temperature or air flow rate, post annealing, if any, stretching and heat setting. The resulting fibers may have a dense layer, with openings ranging from the size of openings in the raw polymer to 30 or 40 Angstroms, on either the inside of the fiber, the outside of the fiber or both, with the remaining parts of the fiber being porous or semi-porous.

Methods of making suitable fibres 10 are known in the art. For example, U.S. Pat. No. 4,664,681, issued on May 12, 1997, to Anazawa et al. describes, in examples 4 and 6, processes for melt-spinning and post-processing PE and PP to produce acceptable fibres while other fibers are made from PMP or polyoxymethylene. Processes described in "Melt-spun Asymmetric Poly (4-methyl-1-pentene) Hollow Fibre Membranes", *Journal of Membrane Science*, 137 (1997) 55-61, Twarowska-Shmidt et al., also produce acceptable fibres of PMP and may be adopted to produce fibres of other polyolefins such as PE or PP. These references are incorporated herein in full by this reference to them. Although the fibers are non-porous, oxygen, or other gases, may travel through parts of them by one or more of diffusion, dissolution-diffusion or Knudsen's flow. The fibers are typically asymmetric having a dense layer and a semi-porous layer. Selectivity of the fibers is reduced compared to the base material. For example, PP has an $O_2/N_2$ selectivity ratio of over 5 but may be 5 or less or 3 or less in a thermo-mechanically treated spun fiber. PMP normally has an $O_2/N_2$ selectivity of over 3 but may be 3 or less in a thermo-mechanically treated spun fiber. A highly permeable fiber of either, or other, materials may have an $O_2/N_2$ selectivity of 1.5 or less. However, the outer surface of the fibers remains non-wetting.

In U.S. Pat. No. 4,664,681, the membranes are melt spun, stretched (by producing the membrane at a high draft ratio) under weak cooling and then heat treated. In greater detail, the polymer is melt-extruded at a temperature between $T_m$ (the melting point of the polymer) and $T_m+200°$ C. at a draft ratio (ratio of final winding speed to actual extrusion speed) or from 20 to 10,000 to create a membrane. Cooling by weak air is provided for between 1 and 30 cm below the spinneret. The resulting membrane is then stretched amorphously at a temperature of from $T_g$ (the glass transition temperature of the polymers) $-20°$ C. to $T_g+50°$ C. and then heat-treated at a temperature of $T_g$ to $T_m-10°$ C. The resultant membrane is then stretched again at a temperature from $T_g-50°$ C. to $T_m-10°$ C. and a stretch ratio of from 1.1 to 5.0. The resultant membrane is then heat-set at a temperature ranging from the last mentioned stretching temperature to $T_m$. Other or additional steps were also used in various embodiments. The resulting membranes had increased oxygen permeabilities. $O_2/N_2$ selectivity was reduced but remained above 1.2. The fibers are asymmetric containing a dense layer with substantially no pore with a diameter of 30 Angstroms or more and a microporous layer having larger pores. The non-porous layer is the outer surface of the fiber and so the fiber is non-wetting.

In the paper by Twarowska-Shmidt et al., PMP fibers are melt spun with a variety of cooling means below the spinneret, most notably a screen, made of a cylindrical blower not producing air, installed below the spinneret to restrict cooling of the unsolidified fibers as they exit the spinneret. Melt temperatures ranged from about 277 to 310° C., take up speeds ranged from 500-1,000 m/min and extrusion rates, through a spinneret with 8 holes of 1 mm diameter and 0.1 mm slot width or 2 mm diameter and 0.15 mm slot width, was 5.6-13.3 g/min. After spinning, the fibers were annealed (in a package at 180° C. in at heat chamber for 300 to 3000 seconds or by passing a thread at a rate of 20-60 m/min through a 2 m long heated chamber), followed by one step stretching at room temperature at a draw ratio of 1.15, followed by relaxation to 7%, followed by heat setting at 180° C., followed by stretching at a rate of 265 m/min. The resulting membranes had increased oxygen permeability and reduced $O_2/N_2$ selectivity but, for at least those with the screen below the spinneret, $O_2/N_2$ selectivity remained about 1.7 indicating an asymmetric structure. Mean pore size of the fibers produced using the screen was just over 40 Angstroms.

Suitable fibres 10 may also be formed by methods other than melt spinning. Such other methods may include, for example, but not limited to, meltblown extrusion, flash spinning, and electrospinning. In meltblown extrusion, fibres are formed by extruding molten polymer through spinneret orifices. As the filaments exit from the orifices, they are attenuated by high temperature, high velocity air streams before being deposited into a conveyor belt to dry.

In flash spinning, pure solvent droplets and highly saturated polymer/solvent mixtures are decompressed through a spin orifice. As the pressurized solution is allowed to expand rapidly through the orifice, the solvent is "flashed off" instantaneously leaving behind a three-dimensional film-fibril network.

Electrospinning uses an electric field to draw a polymer melt or polymer solution from the tip of a capillary to a collector. A voltage is applied to the polymer, which causes a jet of the solution to be drawn toward a grounded collector. The fine jets dry to form polymeric fibres, which can be collected on a web. By choosing a suitable polymer and solvent system, fibre diameters can be varied and controlled.

1.2 Fiber Aggregates (e.g. Tows)

Referring to FIG. 1b, the hollow fibers 10 may be combined into fiber units 19 for handling. The fibre units 19 may be individual fibres 10, tows 20, for example, of 1 to 200 or 16 to 96 fibres 10 each, either twisted or untwisted (FIG. 1b), threads, yarns, tubular, flat or cordage braids, or other units 19 for handling. Tows 20 are made by re-winding fibers from multiple take up spools in combination on to a second spool. Stronger inert fibres 22, such as yarns of unstretched PE or PP, may be included in a tow 20 or other unit 19. The fibres 10 may be curled for use in the units 19. Curled fibres 10 can be made by winding them onto a bobbin at varying tensions.

1.3 Sheet Structures

Figures 3A, 3B, 3C:
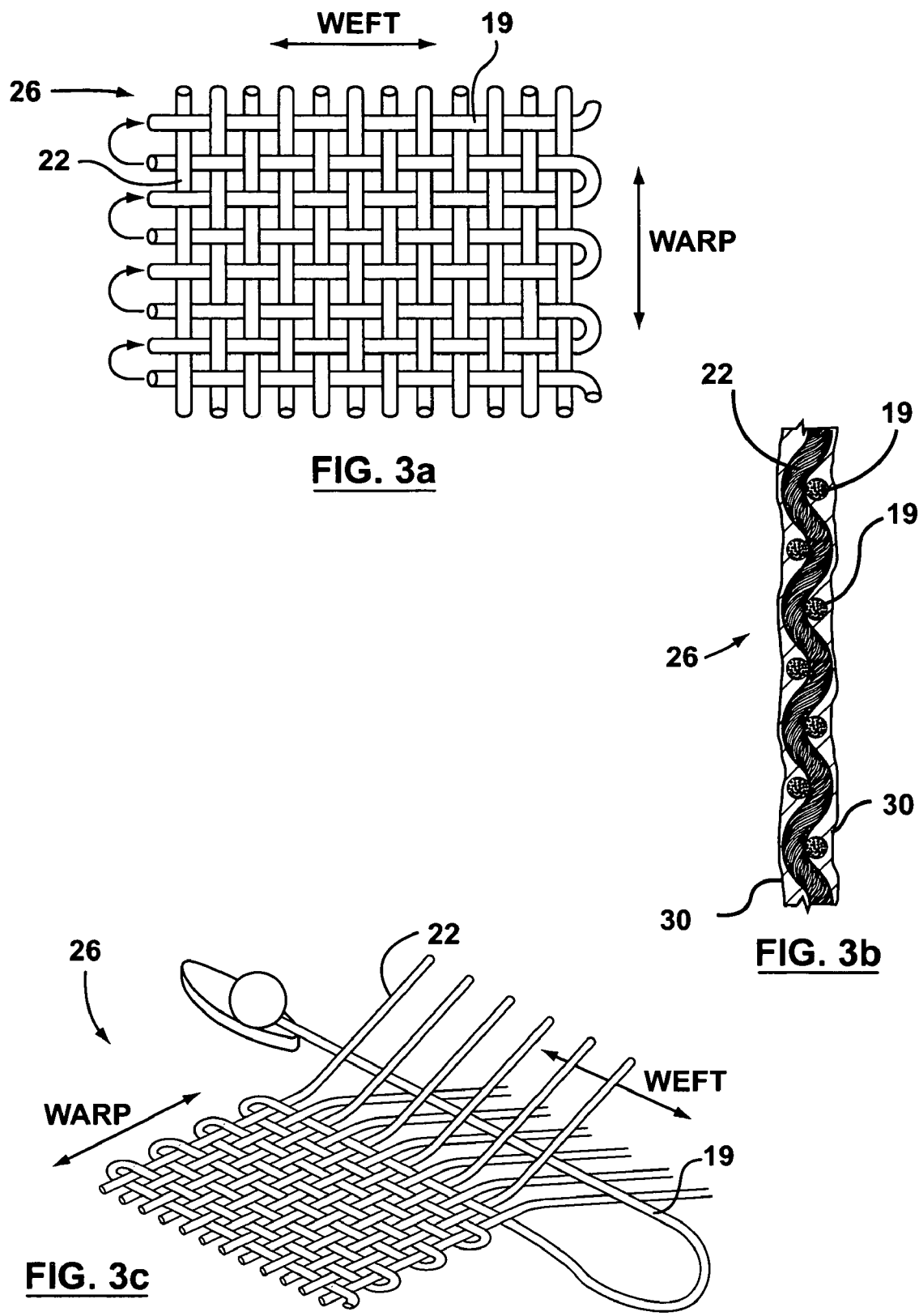
FIGS. 3a and 3b show a plan view and cross-section of a woven fabric respectively.
FIG. 3c shows steps in weaving a fabric.

The fibers 10 and/or fiber units 19 can be provided in the form of sheets 26. In FIGS. 3a and 3b, the fibres 10 are woven as fibre units 19 into a basic two-dimensional structure or fabric sheet 26. In the embodiment illustrated, the units 19 run across the sheet, meaning perpendicular to the direction in which the sheet 26 advances out of a loom. Inert fibres 22 run along the length of the sheet 26 to provide support to the fibre units 19. FIG. 3c illustrates steps involved in a weaving process. The fiber units 19 are carried on a shuttle through 2 groups of inert fibers 22 that are alternately raised or lowered after each pass of the shuttle. Other weaving or fabric making methods may also be used.

Unit 19 type, unit 19 bundle size, spacing between units 19 and percent of fibre in each direction can all be tailored to meet the mechanical or biochemical requirements of each unique application. Further, surface roughness of the sheet 26 can be controlled to aid in biofilm control. For example, it may be easier to control the biofilm on a sheet 26 with a rough or textured surface, for example, one in which the height of the surface undulations roughly matches the desired range of biofilm thickness, which may be, for example, from 200 to 1,000 microns.

In more detail, the fibre units 19 provide a support surface for the growth of a biofilm 30. The number of hollow fibre units 19, and the number of fibres 10 per unit 19, may be adjusted to provide a desired surface area for $O_2$ transfer compared to surface area of biofilm 30 or to the planar surface area of the fabric sheet 26. The planar surface area of the sheet 26 is simply the sheet length multiplied by its width, multiplied by two (since the sheet has two sides). The surface area of the biofilm 30 is the total area of the biofilm 30 exposed to the liquid in the reactor, which may be generally the same as the planar area of the sheet 26 for a substantially two dimensional sheet configuration.

The surface area for $O_2$ transfer is the total area of the hollow fibres 10 in the sheet exposed to the biofilm. This is approximately equal to the product of the effective diameter and length of the fibre 10, multiplied by the number of the fibres 10 in the sheet 26. The effective diameter for diffusion is a logarithmic average of the diameters of the fibre to account for the effect of the wall thickness. The inert fibres 22 crossing the hollow fibres 10 in the sheet 26, and contact between fibres 10, may interfere with oxygen transfer in some embodiments, for example a tightly woven fabric, but the interference is generally small and is ignored in surface area for oxygen transfer calculations.

Although the surface area of the biofilm 30 is generally the same as the planar area of the sheet, it may be slightly larger for very rough or open fabrics or fabrics having more dispersed fiber units 19. Varying fabric roughnesses may also be used to affect the thickness of the biofilm 30 or how readily the biofilm 30 can be reduced or controlled. High ratios of $O_2$ transfer surface area to biofilm area (SA $O_2$/SA biofilm) may be obtained, in the range of, for example, 6 to 10 or more. However, for treating feed water with a high concentration of COD, for example, 300 mg/L CODs or more, lower SA $O_2$/SA biofilm ratios, for example, between 1.6 and 10 are sufficient, and may be preferred to reduce module cost. An SA $O_2$/SA biofilm ratio in the range of about 2 to 8, or about 4 to 6, can provide satisfactory results in many treatment applications.

The surface area of the biofilm 30 can also be larger than the planar area of the sheet 26 by providing a loose arrangement of fibres 10 and controlling the thickness of the biofilm 30 to a sufficiently thin layer so that the biofilm 30 on adjacent parallel fibres does not form a continuous layer. A sheet 26 with a rough or textured surface, the height of the surface undulations being in the range of the desired biofilm thickness, may also be desirable since it may facilitate biofilm control. Desired biofilm thickness may be 200 to 1,000 microns.

Provided that oxygen transfer through the module 40 does not limit reactions in the biofilm 30, the rate of COD reduction in the wastewater is roughly proportional to the concentration of COD in the wastewater. However, for oxygen transfer to not be a limiting factor, more oxygen is required to flow through the module 40 to support a biomass of the same surface area as wastewater COD concentrations increase. More oxygen can be provided by increasing the size or speed of operation of a blower. However, large head losses, for example 10 psi or more, may result due to resistance to oxygen flow through the fibre lumens 14. Head loss may be kept below 10 psi, or in the range of 6 to 9 psi, by choosing a fabric type and number of fibres that produces sufficient total lumen area for a given biofilm outer surface area.

Also, the inventors have observed that biofilms growing in wastewater with high concentrations of COD, for example 1000 mg/L CODs or more or 2000 mg/L CODs or more, are more resilient and tend to grow to undesirable thickness of a few mm or more, faster than biofilms growing in wastewater with lower COD concentrations. Thus, biofilms growing in high COD wastewater require more strenuous biofilm control methods which in turn make a stronger fabric desirable.

The various issues discussed above make it preferable for fabrics to be used in high COD wastewater that have more fibres, and optionally more surface roughness, for the same overall planar area of a sheet or outer surface area of supported biofilm than for fabrics used to treat lower COD wastewater. This can be achieved by choice of method used to create the fabric and choice of thread or fabric unit count or tightness of the fabric. Multi-stage reactors may also be used. In a multi-stage reactor, an upstream reactor treats the feed at its highest COD concentration and is fitted with modules having dense fabrics with large numbers of fibres. A downstream reactor receives partially treated wastewater with a lower COD and is fitted with modules having a less dense fabric with fewer fibres for the same sheet or biofilm outer surface area. The less dense fabric is more economical since it has less fibres and may have a higher area of biofilm for a sheet of the same planar surface area.

The fabric sheets 26 may also be made by other methods such as braiding, stitching or knitting, such as warp knitting. Warp knitting is desirable, for example, when small units 19 or tows or even individual strands of fine fiber 10 are used. The fabric sheets 26 may be patterned, as in pattern knitting, if desired, to provide areas with fewer fibers or holes to enhance flow through the sheets 26.

Figure 3D:
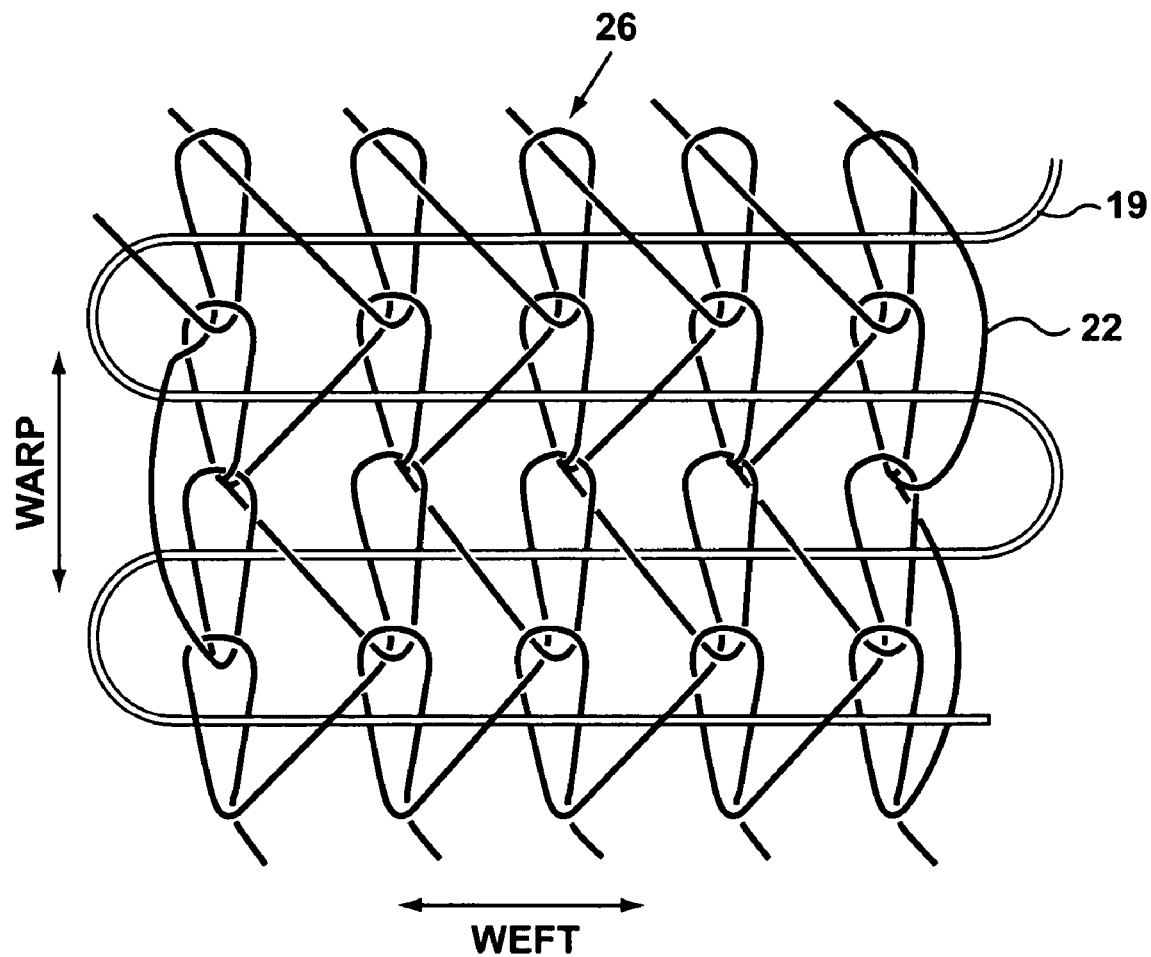
FIG. 3d shows a warp knitted fabric.

In warp knitting, the fabric sheet 26, as shown in FIG. 3d, contains interlaced loops of 'knitted stitches'. The column of stitches being formed on one needle make a fringe. The fringes in the length direction ('warp') of the fabric can be made by relatively inexpensive, commodity yarns, e.g. PET, PP, etc., as the inert fibres 22. The inert fibres 22 can withstand the stress and strain of processing and use. The fabric sheet 26 is generally strong and stiff in the warp (length) direction and elastic in the weft (cross) direction. The weft is a perpendicular yarn system, which is laid across the fringes and fixed by stitches (loops) of the warp fibres 22. The weft doesn't take part in the fabric (loop) formation, therefore the weft fibre units 19 can be processed very tenderly, being subjected to less stress and strain than the warp. Accordingly, preparing the sheet 26 with units 19 as the weft can minimize risk of damage to the fibres 10 during manufacturing the sheet 26. The weft is usually a parallel layer or band of yarns being moved crosswise to the fringes (warp) during knitting. The fabric sheet width can be about to 2-3 m.

Figure 4A:
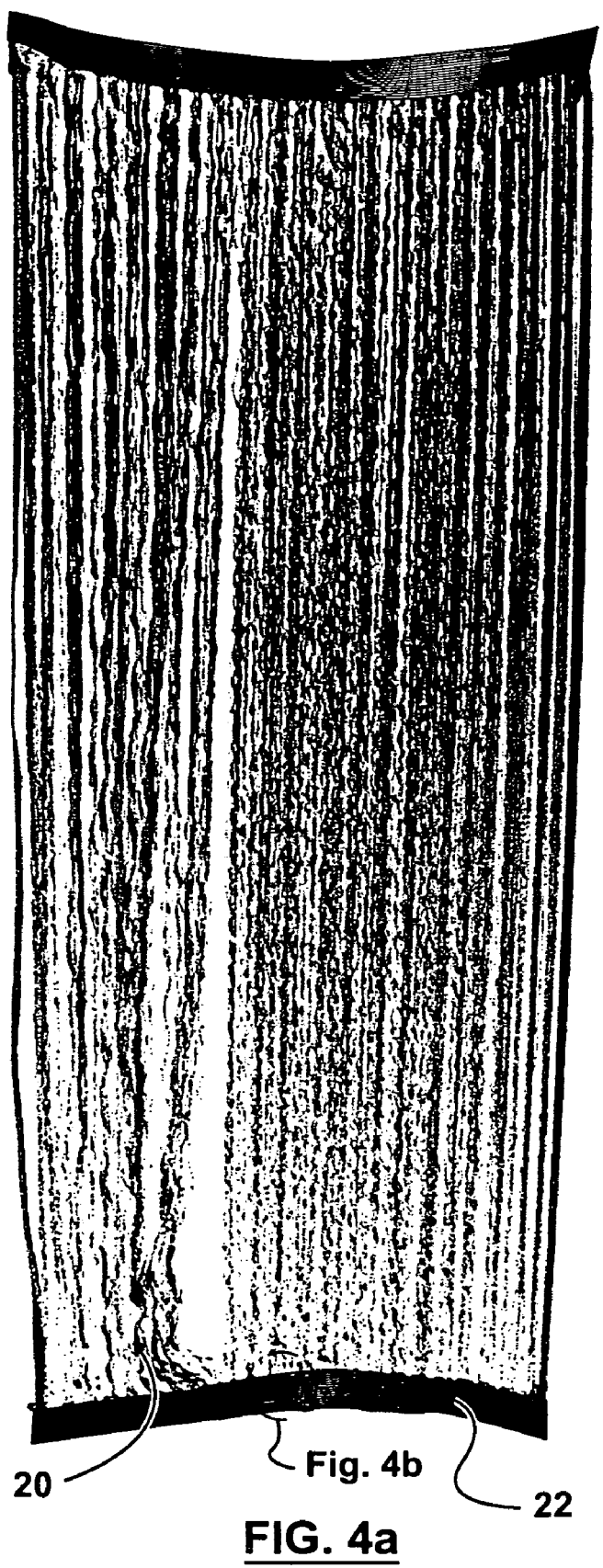
FIG. 4a shows a sheet of hollow fibres with a central portion of the sheet having the fibres in tows.
Figure 4B:
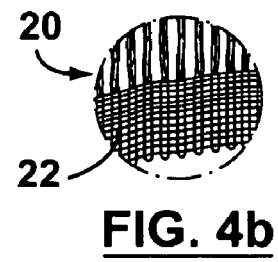

In the embodiment of FIGS. 4a and 4b, the sheets 26 are constructed of an open fabric made by weaving tows 20 through the shuttle of a loom and crossing the tows 20 with an inert fibre 22 only along the edges of the fabric 26. The fabric shown is approximately 1.3 m wide, that is it has active fibres 10 of about 1.3 m long, and has inert fibers 22 woven perpendicularly to the tows 20 in a strip of about 2 cm along the edges. As shown in FIG. 4b, the fibers 10 in each tow 20 disperse beyond the strips so that the tows 20 remain unrestrained and partially open between the strips. The resulting roll of 1.3 m wide fabric is cut into sections of about 20-200 cm, or 30-60 cm, width to make individual sheets 26. In FIG. 4b, the number of fibers 10 in each tow 20 is small for clarity but the tows 20 may each have, for example, between 1 and 200, for example 16, 48 or 96 fibers 10.

1.4 Modules 1.4.1 Loose Tow Module

Figure 5:
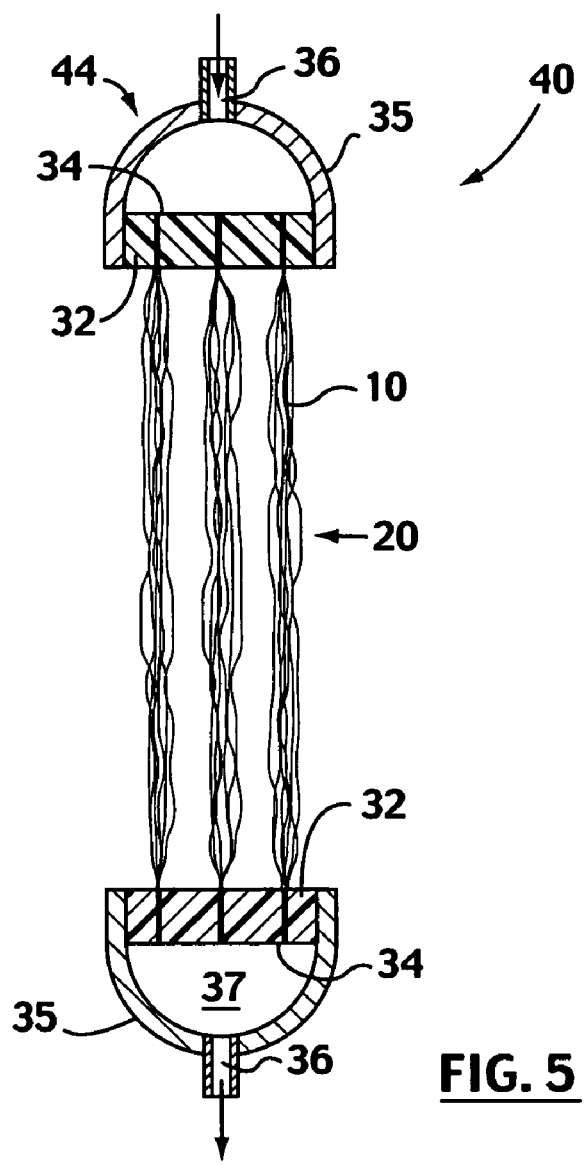
FIG. 5 is a cross-section of a loose tow module.
Figure 6:
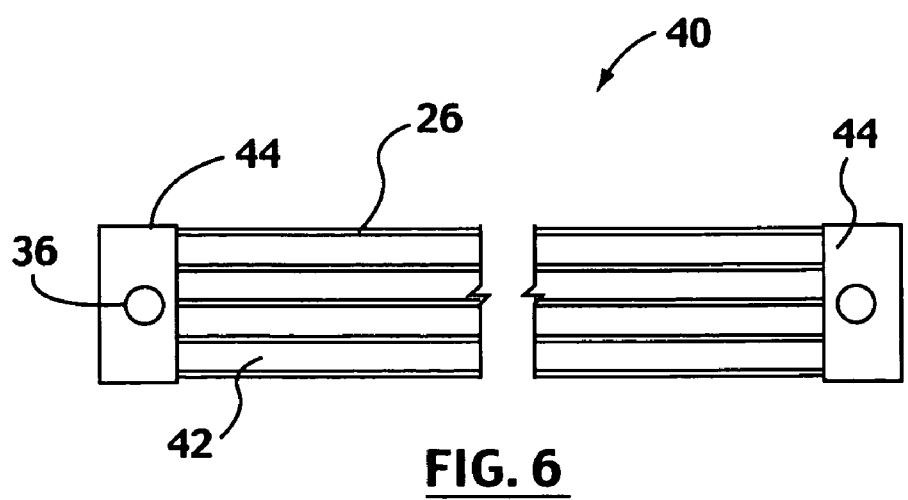
FIG. 6 shows a top view of a module having sheets of fibres.
Figure 7:
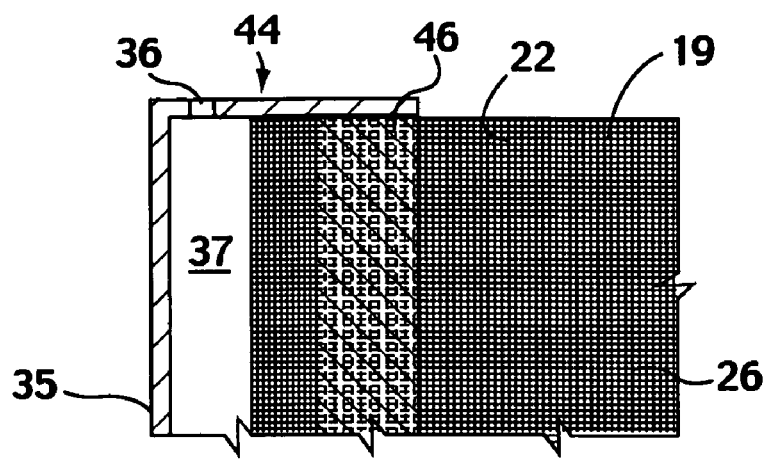
FIG. 7 is a partial section, in elevation view, of the module of FIG. 6.

In accordance with the present invention, multiple fiber units 19, including fibers 10, tows 20 or sheets 26, can be grouped together to form membrane modules 40. FIG. 5 shows a module 40, which may be called a tow or loose tow module, with fibres 10 arranged and potted in tows 20 of fibres. The tows 20 are made of a loose collection of a plurality of fibres 10, for example between 1 and 200 or 16 to 96 fibres 10. The fibres 10 may be lightly twisted together or left untwisted. The fibres 10 may be curled, crimped or undulating to provide three dimensional structure to the each potted row. Curling may be achieved by re-winding the fibres 10 onto a bobbin while varying the tension on the fibres. The individual fibres 10 remain separable from each other in the tow 20. Such a tow 20, when coated with a thin biofilm, for example of less than 1 mm thickness, may provide a ratio of gas transfer area through the fibre walls to biofilm outer surface area ($SA_{oxygen}/SA_{biofilm}$) of less than 2.5, less than 1 or between 0.1 or 0.2 and 1. Inert fibres 22 may be added to the tow to strengthen it if required. Each tow 20 is potted into a plug of resin 32 so that its ends 34 are open at one face of the resin 32. The plug of resin 32 is glued into a plastic header enclosure 35 having a port 36 which forms a header 44 connecting the port 36 to the open ends 34 of the fibers 10 through a cavity 37. There are two headers 44, one associated with each end of the fibres 10, although modules 40 with only an inlet header 44 may also be made. With two headers 44, air or other gases may be input into one header 44, flow through the fibres 10 and exhaust from the second header 44. Tows are potted in a resin 32, such as polyurethane, and the potted ends are cut to expose the fibre lumen. Alternately, a fugitive potting material may be used to block off fibre ends, as described in U.S. Pat. No. 6,592,759, or other potting methods may be used. In FIG. 5, the number of tows 20 and the number of fibers 10 per tow 20 are both small for clarity in the drawing and may be much larger in practice.

1.4.2 Sheet Module

A module 40 can also be constructed of a bundle or stack of sheets 26. The sheets 26 may have perpendicular inert fibers present across the entire width of sheet 26 as in FIG. 3a or only across a portion of the width of the sheet 26, for example at the ends as in FIG. 4. Raw material for the sheets 26 may be rolled onto a fabric roll. For example, where the sheets 26 are prepared by weaving, the material is rolled on to a take up roll at the end of a loom as material is produced. The fiber units 19 may extend across the roll while the inert fibers spiral around the roll. With the fibers oriented in this way, individual sheets 26 may be cut from the roll by rolling out a length of material from the roll and cutting it off with a hot knife or heat cutter. The heat cutter melts through the fiber units 19 and inert fibers and bonds them together to protect the fabric edge from disintegrating or fraying. Since the heat cutter melts a strip of fibers on either side of the cut line, for example a strip about 5 mm wide, the fibers remaining on the roll are similarly melted together to produce a stable edge. After a sheet 26 has been cut from the roll, the other two ends of the sheet, meaning the edges of the sheets 26 at right angles to the heat cut edges, are cut to open the lumens of the fiber units 19. To minimize distortion or collapse of the ends of the fibers 10 under the cutting pressure, the area to be cut is first reinforced, for example by impregnating it with polyurethane to provide a reinforcing coating around the fibers 10 or fiber units. The cut across the fiber units 19 is then made with a sharp cutter, for example a razor edge cutter. The cutter is preferably kept very sharp, for example by changing blades regularly, to minimize distortions of the ends of the fibers 10. Other cutting machines or tools used in the garment and textile industries may also be used.

The end or ends of single or multiple sheets 26 can be potted into a header to provide one or more ports 36 in communication with the lumens of the fibers 10. To pot one or more sheets 26, sheets 26 are cut from a roll as described above. A plastic spacer strip is attached, for example with glue or adhesive transfer tape, on one or both sides of the sheet 26, at the end of the sheet 26 parallel to but offset from the razor cut line across the fiber units 19. For potting multiple sheets 26, the sheets 26 with spacer strips attached are laid on top of each other and attached together, for example by glue or adhesive transfer tape, between adjacent spacing strips or between the spacing strip of one sheet 26 and a second sheet 26. The strips space adjacent sheets 26 but also form a barrier between a potting material to be applied later and the cavity of the header containing the ends of the fibers 10. The ends of the sheet 26 or stack of sheets 26 is fitted into an elongated header cavity that may be made, for example, by injection molding. Spacing and sealing to the header walls is maintained with a self-adhesive closed cell neoprene gasket strip attached to each of the long header walls. Any openings in the header cavity left by the spacer strips may be covered with hot melt glue. Final sealing of the header is achieved by pouring a layer of potting material, for example a two-component polyurethane compound, over the spacer strips. The layer may be about 45 mm thick and extend between the insides of walls of the header. If there are multiple sheets, care is taken to force or ensure flow of the potting material, as completely and evenly as practicable, between the sheets 26. After the potting material hardens, a seal is formed between the outsides of the fibers 10 and the walls of the header but the ends of the fibers 10 remain in communication with a cavity within the header.

FIGS. 6 to 9 show a module 40 in which a set of parallel sheets 26 are potted with gaps 42 between them in a header 44. Two headers 44 may be used as shown when a bleed of exhaust air is desired. One header 44 may also be used with exhaust bled through opposed open ends of the fibres 10 or with the other ends of the fibres 10 closed for dead end operation. The gap 42 may be between 2 mm and 10 mm thick, or between 3 mm and 15 mm. The chosen gap 42 may depend on the water to be treated or the choice of method to control biofilm thickness. For example, a module 40 of tensioned sheets 26 may have a gap 42 of 6 mm when used with air scouring to control biofilm 30 thickness. Tension may be provided by mounting the headers 44 to a rigid structure, which may include parts of a tank, with one or both headers 44 movable relative to the structure. Alternately, the headers 44 may be attached to part of a frame held at an adjustable distance apart. The sheets of fabric 26 are potted and separated in the headers 44 by various potting materials 46 such as one or more of polyurethane, hot melt glue, adhesive strips, plastic spacing strips or epoxy. The spacing between adjacent sheets 26, or gaps 42, provides space for scouring air and substrate flow through the module 40. A large sheet of the fabric 26 may also be rolled or folded to produce a module 40 rather than using separate sheets. The length of the module 40 is a compromise between OTE and pressure drop and may range from 1 m to 5 m or between 1 m and 3 m.

Figure 8:
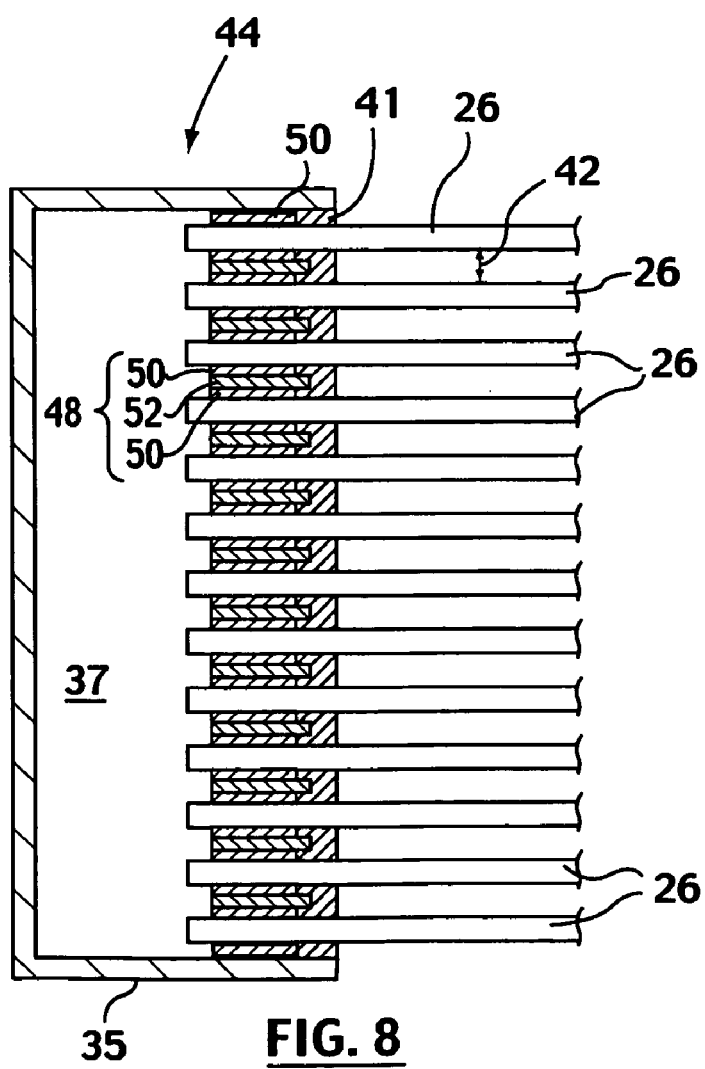
FIG. 8 is a cross-section of another part of the module of FIG. 6 in plan view.

Referring to FIG. 8, to make the module 40 a sheet 26 of fibres 10 is laid onto strips 50 (one on each end) of adhesive located to cross the ends of the fibres 10. Additional strips 50 of adhesive and spacing strips 52 are placed over the sheet 26, followed by additional strips 50 of adhesive and an additional sheet of fabric 26. These steps are repeated as appropriate for the number of sheets 26 desired. The resulting assembly is then sealed into the header enclosures 35 of a pair of opposed headers 44 such that the lumens 14 of the fibres 10 are in communication with ports 36 in the headers 44 through cavities 37. The ends of the fibres 10 are cut before potting to open them, for example as described above. Additional glue or potting resin 41 may optionally be poured into the header enclosure 35 to further seal the fibers 10 to the header enclosure 35. Alternately, sheets 26 may be separately glued to spacing strips at their edges and inserted into a header cavity and additional glue or potting resin 41 placed around this assembly to seal it to the header enclosure 35. Further alternately, the first assembly method described above may be used.

Figure 9:
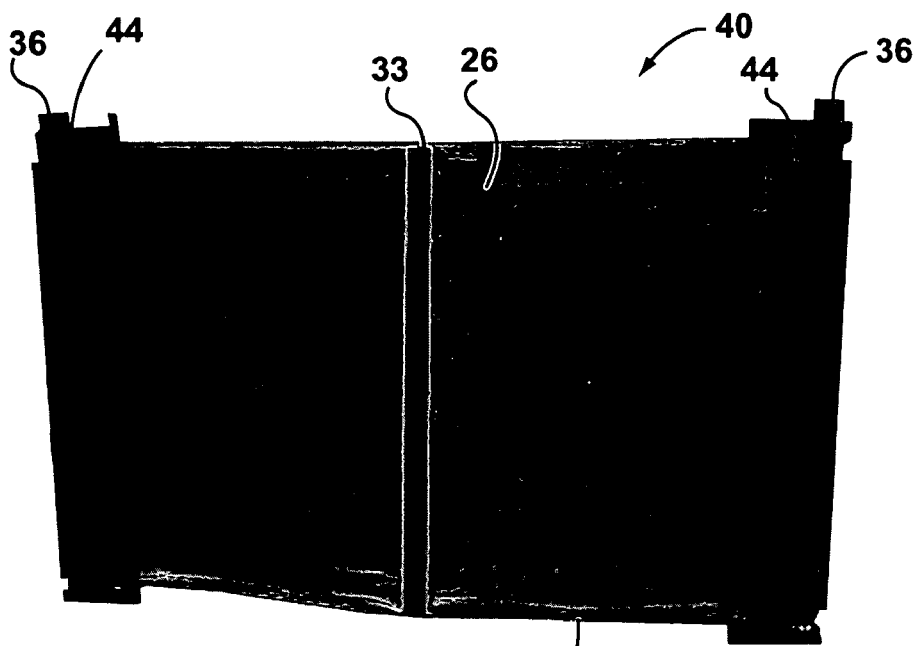
FIG. 9 is an elevation view of a module according to FIGS. 6 and 7.

FIG. 9 shows a picture of a module 40 assembled as generally described above. The headers 44 are about 2 meters apart. Additional spacers 33 are used mid way between the headers to better preserve the sheet 26 separation. A thin steel rod 45 is attached to the edges of the fabric sheet 26 in the right half of the module to address the folding which can be seen in the left half of the module. The module 40 has a ratio of SA oxygen/SA biofilm of about 5.

Figure 10A:
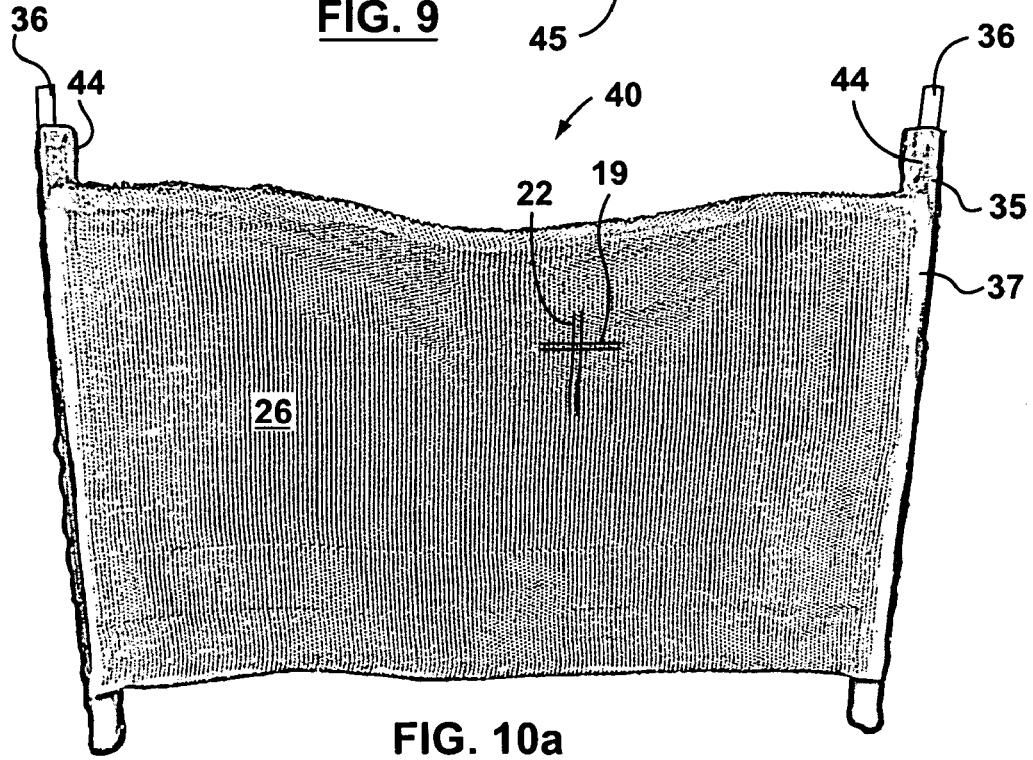
FIGS. 10a, 10b and 10c are elevation, plan and partial section views of another module having sheets of fibres.
Figure 10B:
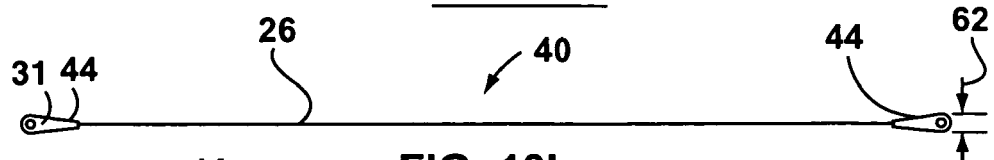
Figure 10C:
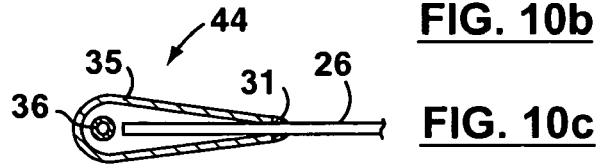

Another embodiment of a module 40 can be seen in FIGS. 10a to 10c. The module 40 has a single sheet 26 with hollow fibre units 19 and inert fibres 22. The hollow fibre units 19 extend between headers 44 at either end of the sheet 26. The width 62 of the headers 44 is such that stacking multiple modules 40 adjacent each other with the headers 44 of adjacent modules 40 abutting each other provides the desired spacing between the adjacent sheets 26. The header enclosures 35 of this module 40 are clear allowing the cavity 37 to be seen. To pot the sheet 26, the header enclosure 35, which is a folded over plastic strip, is forced open and a sheet 26 is inserted. The header enclosure 35 springs closed on the sheet 26. Tubes which function as ports 36 are inserted into the ends of the header enclosures. Potting resin 31 is laid along the joint between the sheet 26 and the header enclosure 35, between the ports 36 and the header enclosure 35 and all other openings to seal the cavity 37.

Referring again to FIG. 4, another module, which may be called a tow or tow sheet module, can be made of open sheets 26 of tows 20 cut along the woven edges to open the ends of the fibres 10 and potted with a 0 to 10 mm space between them into one or a pair of opposed headers. Depending on the potting method used, which may include potting methods described above, the fibres 10 may be cut open either before or after they are inserted into the potting resin. 1 to 100 or 8-20 sheets may be potted into a pair of headers to produce a module. Modules made in this way using the fibers of FIG. 1 had $SA_{oxygen}/SA_{biofilm}$ ratios of between 1:2.5 (0.4) and 1/11 (0.1) with a biofilm thickness of 250 microns.

1.5 Cassettes/Reactors

Figure 11:
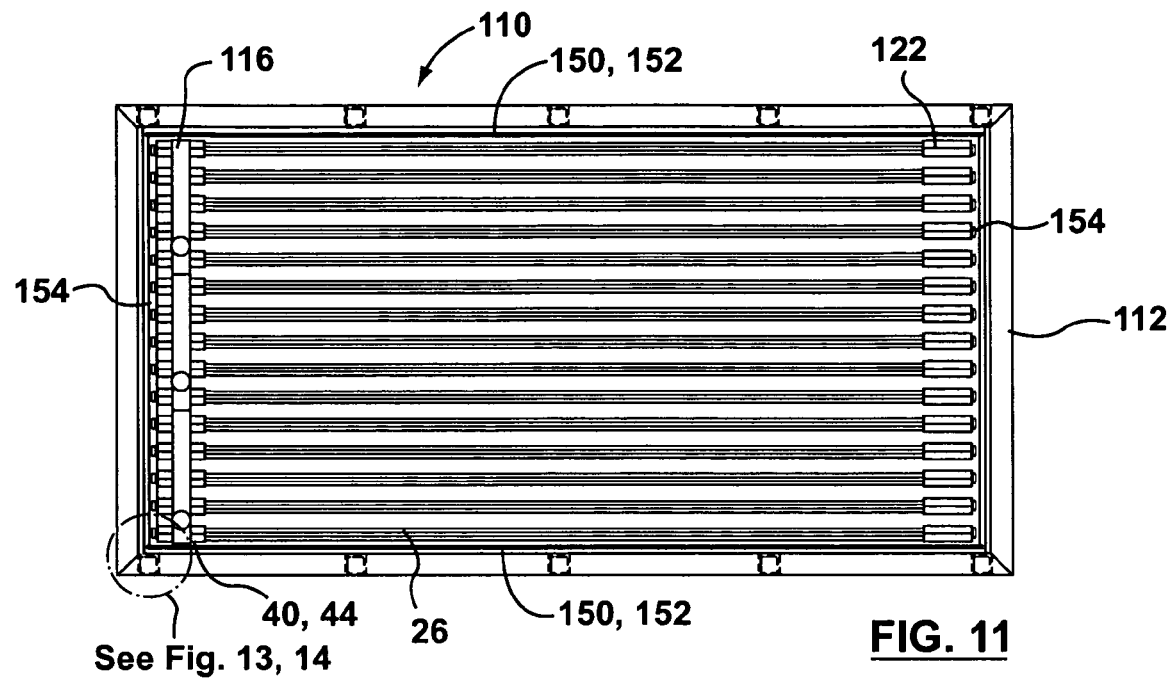
FIGS. 11 and 12 are plan and elevation views of a tank having cassettes of modules of sheets of hollow fibres.
Figure 12:
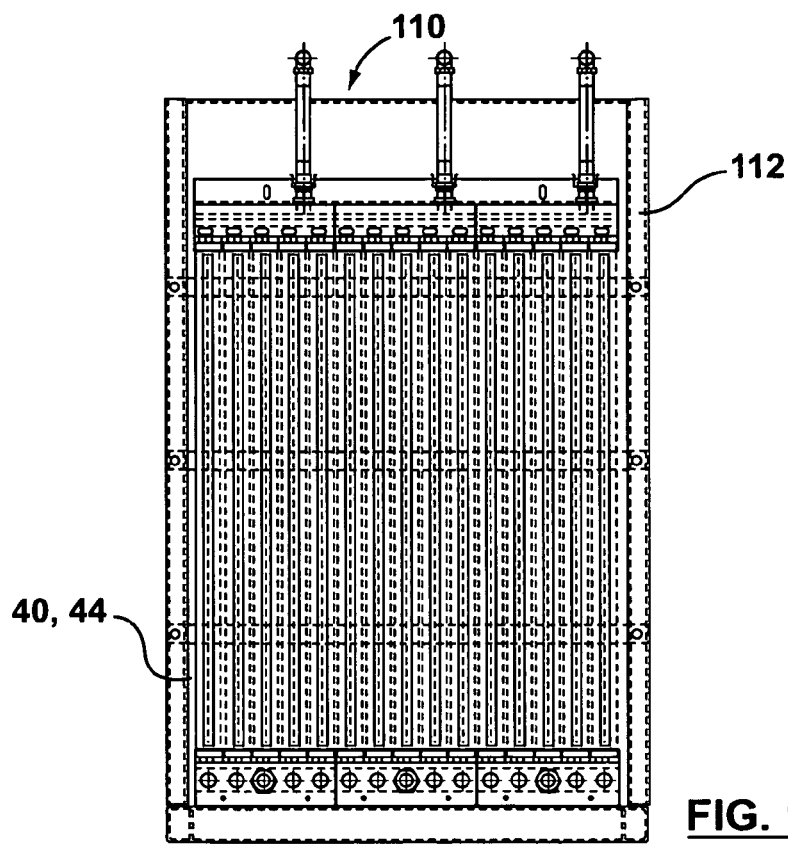

In general, a plurality of modules can be grouped together to form a cassette, and one or more modules or one or more cassettes can be placed in a tank as part of a reactor. Referring to FIGS. 11 and 12, the modules 40 of a cassette 110 are mounted in a tank 112 of a pilot reactor for treating 1 cubic meter per day of industrial wastewater having a COD of over 1,000 mg/L, typically 7,000 mg/L. The feed is treated by either batch or continuous process to reduce its COD concentration to 300 mg/L as required for discharge into the municipal sewer that it outlets to. The tank 112 has a fill volume of 1.8 m³. Fifteen modules 40 are provided in the tank 112, each module 114 containing six sheets 26 of 3.6 m² surface area of a woven fabric of PMP fibers units 19, woven as tows 20. The fibres 10 are 1.8 m long and extend between an inlet header 116 and outlet header 122 of the modules 40. Total number of PMP tows per sheet is 1968, and fibres per sheet are 94464, there being 48 fibers per tow and a two packing of 50 threads per inch in the sheet 26. Also, polyester yarn is woven perpendicular to the PMP fibre, and the total number of yarns per module is 1912. Air pressure drop in the fibre lumen is in the range of 5 to 10 psi. Total biofilm area per module is 17 m², and oxygen transfer area is about 5.1 times the biofilm area.

The modules in the embodiment illustrated are mounted in such a way that the tension of the sheets 26 extending between the headers 116, 122 can be adjusted. The cassette provides a rigid structure 150, which can include elements of the tank 112 or elements of a cassette sub-frame, adjacent the modules 40, and one or both of the headers 116, 122 are movable relative to the rigid structure 150.

Figure 13:
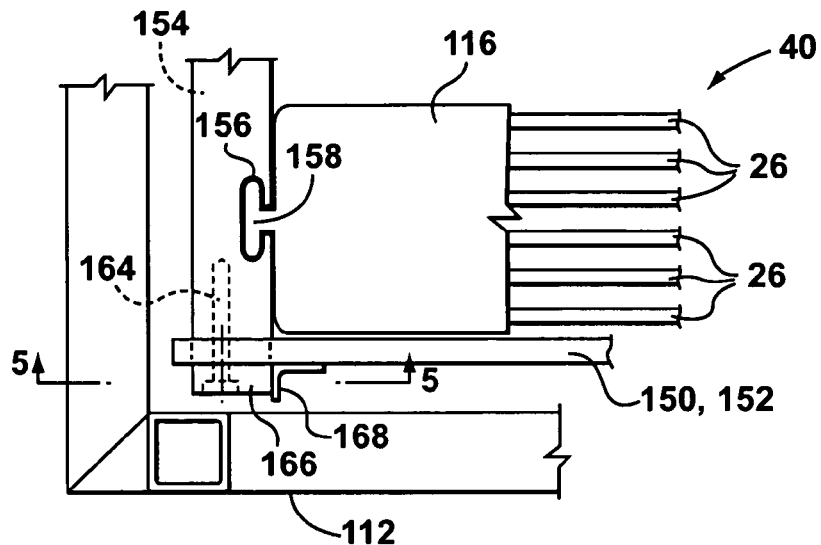
FIG. 13 is a drawing of the details of a tensioning mechanism in the apparatus of FIGS. 11 and 12.
Figure 14:
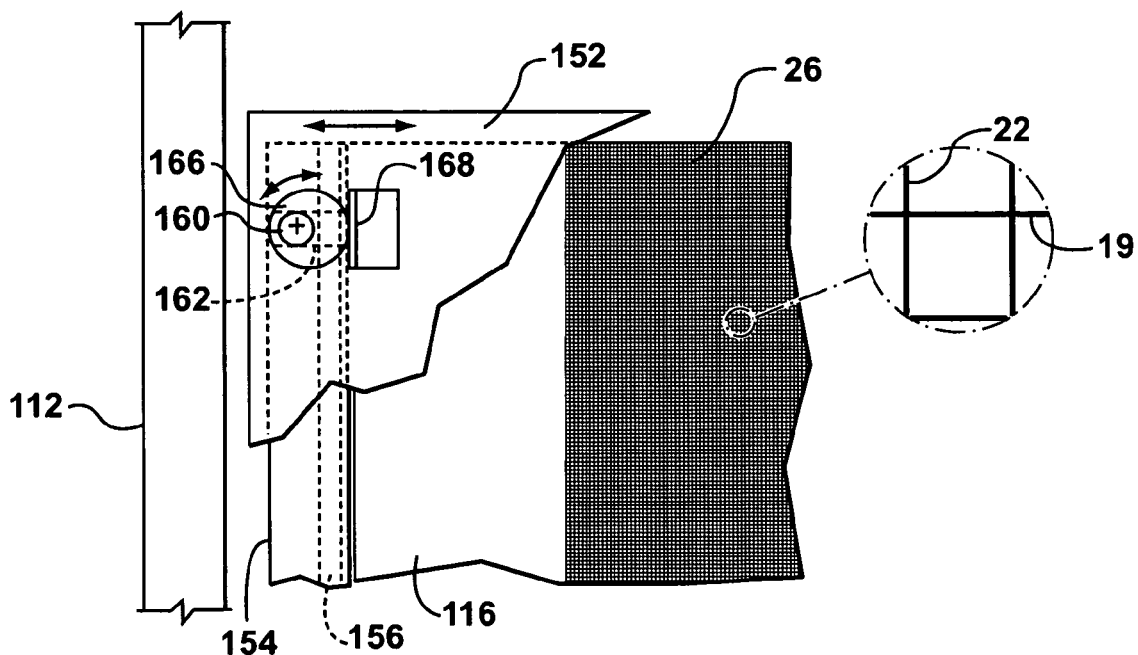
FIG. 14 is an elevation view of the mechanism of FIG. 13.

In the embodiment illustrated, the rigid structure 150 comprises a pair of side plates 152 that extend along the distal side surfaces of the outermost modules 40 of the stack of modules 40. As best seen in FIGS. 13 and 14, the modules 40 are attached to the side plate 152 by means of a mounting bracket 154 extending transversely between the side plates 152 at either end of the modules 40. The mounting brackets 154 are provided with grooves 156 shaped to receive T-shaped tongues 158 extending from surfaces of the headers 116, 122, opposite the sheets 26. The module 40 can be secured to the mounting brackets 154 by sliding the tongues 158 of the headers 116 and 122 into the grooves 156 of the brackets 154. The mounting brackets 154 can be secured to the side plate 152 by, for example, a bolt 160 passing through an aperture 162 engaging the plate 152 and a threaded hole 164 in an edge surface of the bracket 154.

The aperture 162 can be slot-shaped, so that the bracket 154 with the attached header 116, 122 can be shifted horizontally to increase or decrease the tension of the sheets 26. An eccentrically mounted cam member 166 can be provided between the head of the bolt 160 and the plate 152, with an outer diameter surface in engagement with an abutment surface 168 fixed to the plate 152. Rotating the cam member 166 can force the opposed brackets 154 further apart or allow them to draw closer together, thereby adjusting the tension of the sheets 26 in the modules 40.

The tension adjustment mechanism can be provided on only one end or on both ends of the modules 40, and can be modified to provide individual tension adjustment for each module 40 or for sub-groups of modules 40. Other mounting methods may also be used to allow modules 40 to be removed or tensioned.

In another embodiment of the invention, the elements or modules are stacked in a vertical configuration. Flow of scouring air from outside the modules or of water in the tank may be from top to bottom or bottom to top. This minimizes the capital required for scouring air and the operating cost of air.

2.0 Operation/Applications

The fiber units 19 having one or more fibers 10 can be used as membranes to support biofilm in a reactor. In general, gas containing oxygen flows into at least one of the headers 44 of a module 40. The module 40 may be operated in a dead end mode, with no outlet other than through the fibres. Alternately, the module may be operated in a cross flow manner with gas entering through one header 44, flowing through the fibers 10, then exiting from the other header 44. The oxygen content and flow rate of the gas may be set to produce an oxygen transfer that provides aerobic conditions near the outer surface of the fibers 10, where the level of oxygen is highest. Aerobic reactions occur in this area, including conversion of organic compounds to carbon dioxide and water, and ammonia to nitrates. The biofilm may be maintained under anoxic conditions on its outer surface or near the substrate being treated and conversion of nitrogen to nitrates can take place. In this way, multiple and simultaneous reactions, including carbon based organics, ammonia and total nitrogen reduction, may be performed in the biofilm.

Air may be used as an oxygen bearing gas input to the modules 40. Even though $N_2$ or $CO_2$ selectivity may be low, the partial pressure gradient between $N_2$ or $CO_2$ on the inside of the fibres and the biofilm or surrounding substrate is not large. Accordingly, substantial amounts of $N_2$ or $CO_2$ do not diffuse into the substrate. In contrast, $CO_2$ may back-diffuse into the fibre lumens 14 particularly with a low selectivity membrane. The exhaust gas, collected at the exhaust header, may be bubbled through a lime slurry to recover the $CO_2$ and prevent discharge of $CO_2$. The flow rate of $CO_2$ enhanced gas to be treated is much smaller than for a conventional wastewater treatment process allowing for more efficient control of $CO_2$ emissions.

Figure 15:
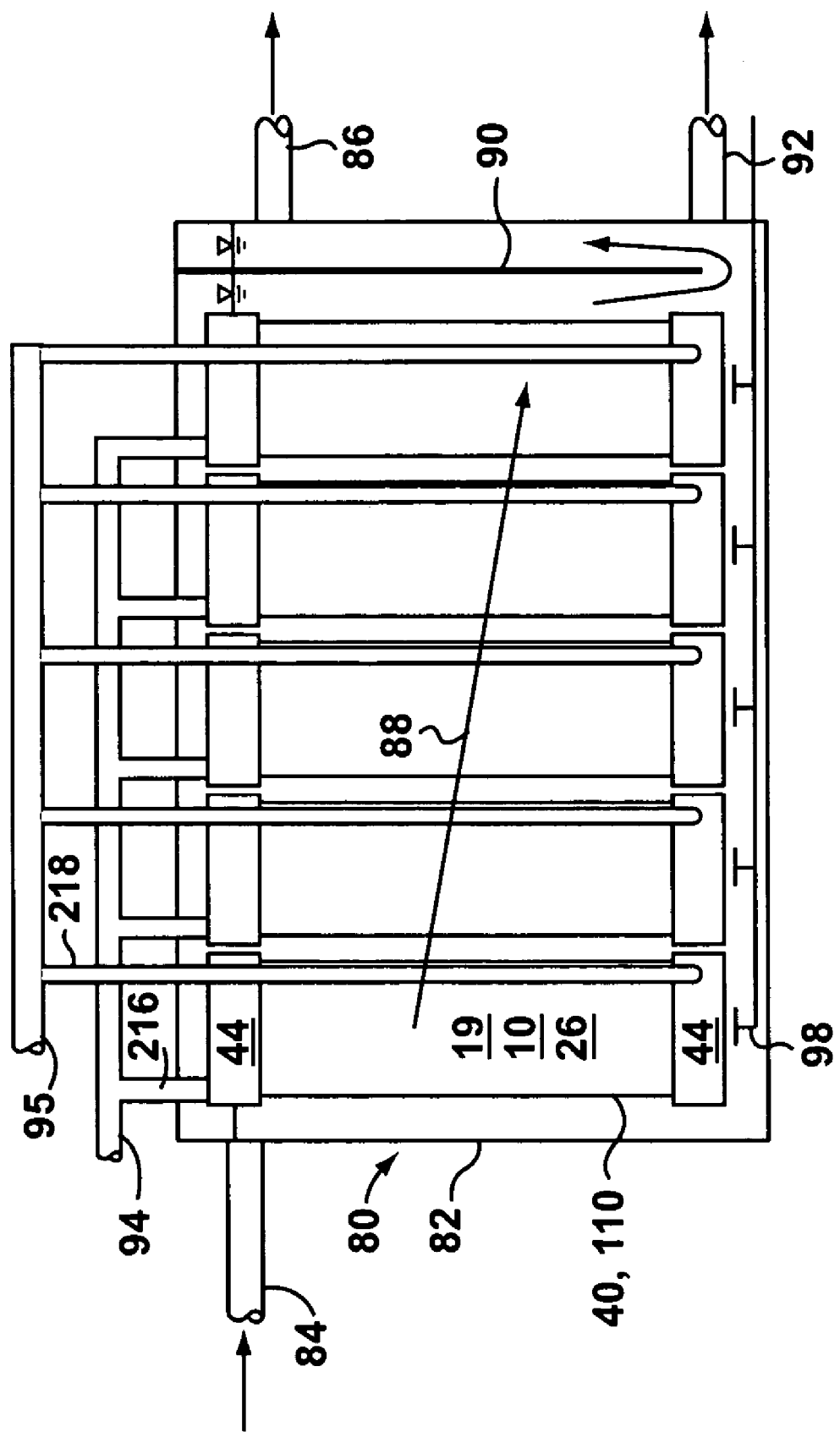
FIGS. 15 and 16 are schematic elevation drawings of reactors.

An example reactor 80 is shown in FIG. 15. FIG. 15 provides a near plug flow. The reactor 80 has a tank 82, a feed inlet 84 to the tank 82, an effluent outlet 86 from the tank 82, a flow path 88 between the feed inlet 84 and the effluent outlet 86, and a plurality of fiber units 19 in the form of modules 40 in the tank 82. Each module 40 can have one or more sheets 26 extending from one or more headers 44. The plurality of modules 40 can be provided as part of one or more cassettes 110.

The sheets 26 and modules 40 are sized to fit the tank 82 and fill a substantial part of its volume. The sheets 26 may be custom made to provide efficient use of the available space in the tank 82. The sheets 26 are preferably arranged in the tank 82 in a number of rows, one such row being shown in FIG. 15. The sheets 26 may range from 0.25 to 2 mm in thickness and adjacent sheets 26 are placed in the tank 82 side by side at a distance of 2 to 15 mm to allow for biofilm growth and wastewater flow between adjacent sheets 26.

The tank 82 is longer than it is deep and may have a generally horizontal flow path 88 with minimal mixing. This is achieved by leaving some space near the ends (ie. near the inlet 84 and outlet 86) of the tank 82 for vertical movement of water and leaving minimal free space at the top, bottom and sides of the tank 82. A baffle 90 may also be placed upstream of the effluent outlet 86 to force the flow path 88 to go under it. A sludge outlet 92 is provided to remove excess sludge.

The flow path 88 is generally straight over a substantial portion of the tank 82 between the feed inlet 84 and effluent outlet 86. Each module 40 is held in the tank 82 by its headers 44 attached to a frame (not shown for clarity) which restrains each module 40 in positions in the reactor 80 whereby the sheets 26 of each module 40 are generally parallel to the flow path 88. Preferably, a plurality of sheets 26 are spaced in series along the flow path 88 so that the reactor 80 will more nearly have plug flow characteristics. Wastewater to be treated may be partially recycled from the effluent outlet 86 to the feed inlet 84. Such a recycle can increase the rate of gas transfer by increasing the velocity of wastewater along the flow path 88, but it is preferred if the recycle ratio is small so as to not provide more nearly mixed flow characteristics in the reactor 80.

Oxygen containing gas is provided to each module 40 through its inlet conduit 216 connected to an inlet manifold 94 located above the water to be treated. With the inlet manifold 94 located above the water, a leak in any module 40 will not admit water into the manifold nor any other module 40. Gas leaves each module 40 through its outlet conduit 218 which is connected to an exhaust manifold 95. Although it is not strictly necessary to collect the gases leaving each module 40, it does provide some advantages. For example, the gas in the exhaust manifold 95 may have become rich in volatile organic compounds which may create odour or health problems within a building containing the reactor 80. These gases are preferably treated further or at least vented outside of the building.

Oxygen diffuses or permeates through the fibers 10. The amount of oxygen so diffused or permeated may be such that an aerobic biofilm is cultured adjacent the sheets 26, an anoxic biofilm is cultivated adjacent the aerobic biofilm and the wastewater to be treated is maintained in an anaerobic state. Such a biofilm provides for simultaneous nitrification and denitrification. A source of agitation 98 is operated from time to time to agitate the sheets 26 to release accumulated biofilm. A suitable source of agitation is a series of coarse bubble aerators which do not provide sufficient oxygen to the water to be treated to make it non-anaerobic.

Figure 16:
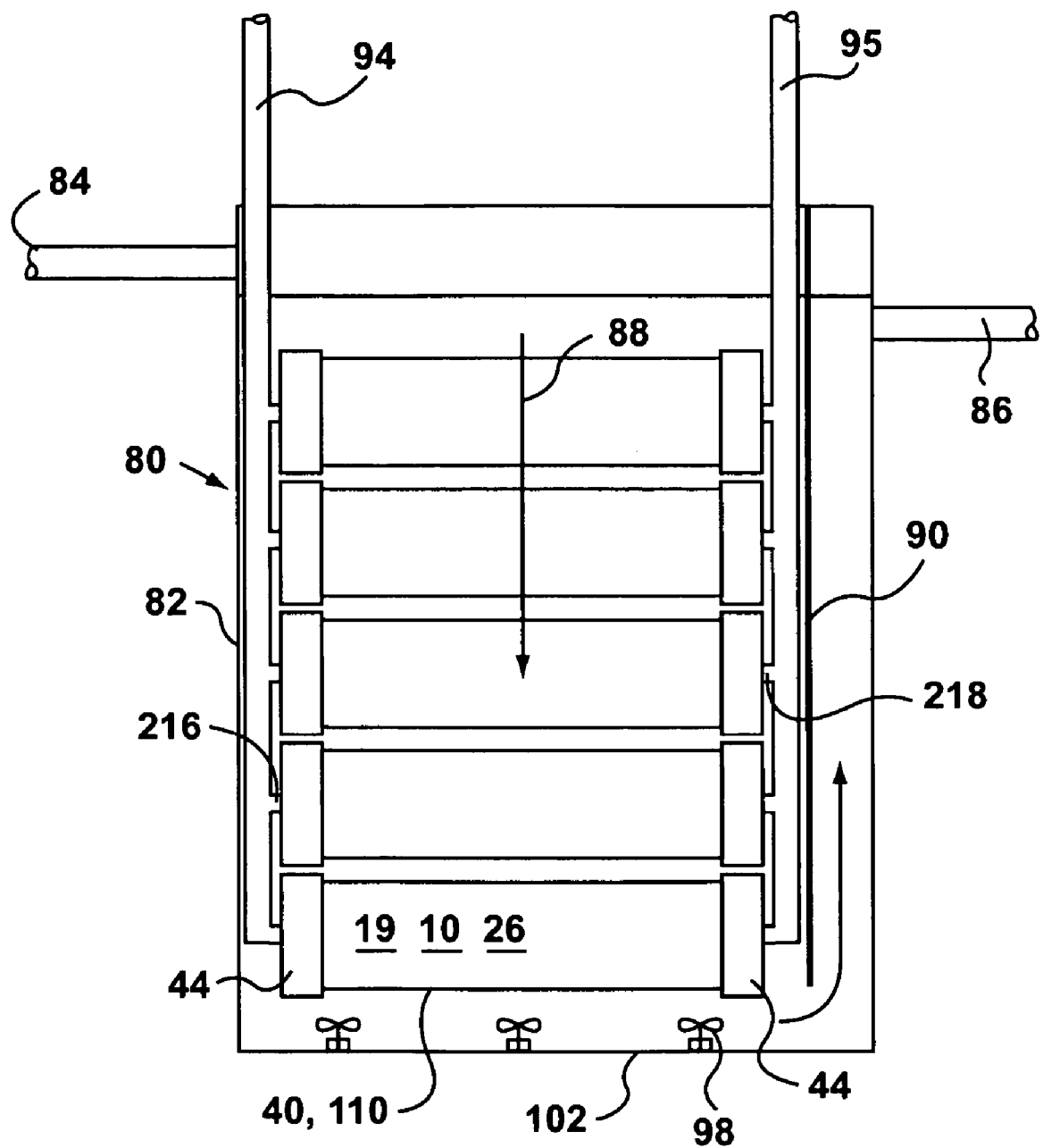

FIG. 16 shows a second reactor 80 having a tank 82, a feed inlet 84, an effluent outlet 86, a flow path 88 and a plurality of modules 40. Frames (not shown) hold each module 40 in a position whereby the sheets 26 of each module 40 are generally parallel to the flow path 88.

The sheets 26 are sized to fit the tank 82 and fill a substantial amount of its volume. The sheets 26 may be custom made to provide efficient use of the available space in the tank 182. The sheets 26 may range from 0.25 to 2 mm in thickness and are placed side by side at a distance of 2 to 15 mm to allow for biofilm growth and wastewater flow between adjacent sheets 26.

The tank 82 is deeper than it is long to encourage a straight and generally vertical flow path 88 over a substantial portion of the tank 82 with minimal mixing. This is done by leaving minimal space near the ends and sides of the tank 82 but a substantial amount of space near the top and bottom of the tank 82. Water to be treated may be partially recycled from the effluent outlet 86 to the feed inlet 84 but it is preferred that the recycle rate be small if a recycle is used.

Oxygen containing gas is provided to each module 40 through its inlet conduit 216 connected to a manifold 94. The manifold 94 may alternately be located above the water to be treated so that a leak in any module 40 will not admit water into the manifold 94 nor any other module 40. Outlet conduits 218 are connected to an outlet manifold 95 which may alternately be located above the surface of the water to be treated.

Alternatively, gas flow through the module 40 is produced by applying a suction to the outlet conduits 218. The inlet conduits 216 are placed in fluid communication with the atmosphere. By this method, the rate of gas diffusion across the membrane is slightly reduced, but the exhaust from the blower may be connected to further apparatus for processing the exhaust gases.

Oxygen diffuses or permeates through the membranes 120 preferably such that an aerobic biofilm is cultured adjacent the sheets 26, an anoxic biofilm is cultivated adjacent the aerobic biofilm and the wastewater to be treated is maintained in an anaerobic state. A source of agitation 98 is operated from time to time to agitate the sheets 26 to release accumulated biofilm. A suitable source of agitation is a series of mechanical mixers.

Figure 17:
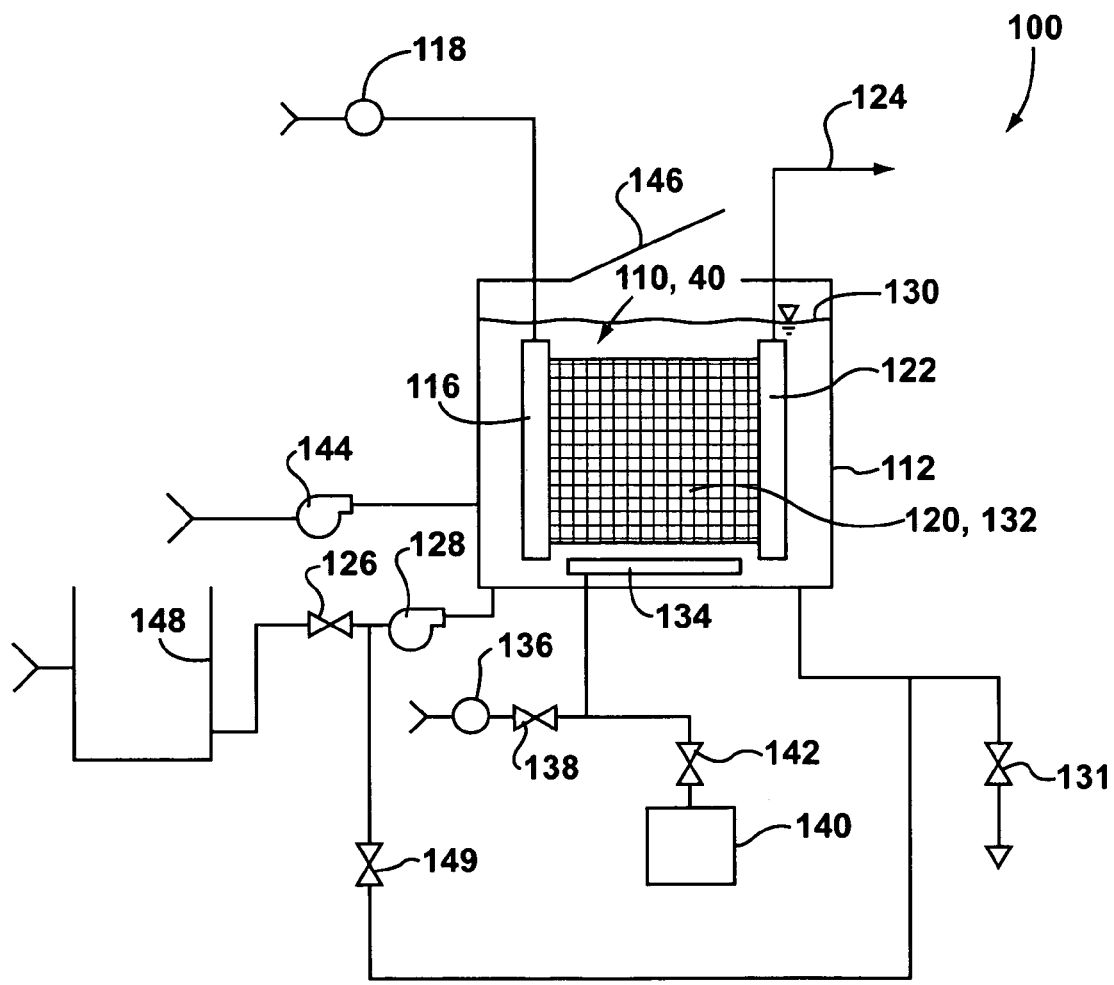
FIGS. 17 and 18 are schematic drawings of other reactors.

Referring to FIG. 17, a reactor 100 has a tank 112 with one or more membrane supported biofilm module cassettes 110 installed inside of it. The cassettes may have one or more modules 40, as described above. The module 40 may also be a tow module, a module of planar elements, or other types of modules using a membrane to support a biofilm. Each module 40 has a gas inlet header 116 fed with air, or another oxygen containing gas, through a blower 118. Gas passes from the inlet header 116 to the inside (or lumens 14) of one or more fibers 10. The walls of the fibers 10 serve as gas transfer membranes 120. A portion of the gas passes through the membranes 120 while another portion, and possibly some gasses taken up from the tank 112, flow to an outlet header 122 of the modules 40 and to an exhaust 124. The gases leaving the exhaust 124 may be post-treated or discharged to the atmosphere.

Feed water enters the reactor 100 through a feed valve 126 and feed pump 128. The feed is filled to a feed fill level 130 above the modules 40. After a batch of feed has been treated, a drain valve 131 is opened to drain the tank 112 of treated water. The treated water may flow to a municipal sewer, to the environment, discharge directly to a receiving stream, or to another stage of a MSBBR (membrane supported biofilm batch reactor) or to another sort of reactor for further processing.

A biofilm 132 grows on the outside of the membranes 120. To control the thickness of the biofilm 132, one or more aerators 134 are provided below the modules 140 and connected to a scouring air blower 136 through an aeration valve 138. The scouring air blower 136 can be operated to provide bubbles when the tank 112 is full of water. The bubbles rise through the module 140 and physically remove some of the biofilm 132 from the membranes 120. The aerators 134 are also attached to a gas supply 140 through a gas supply valve 142. The gas supply 140 may contain a pressurized gas or a gas generator and pump or other device for supplying a gas when the tank 112 is empty. The reactor 100 also has a liquid pump 144 operable to fill the tank 112 with a liquid other than feed water. The liquid pump 144 may be connected to a reservoir holding the liquid or to a source of clean water passing through a modifier, such as a chemical injection device or heater. The tank 112 is generally open to the atmosphere and contains liquid at generally ambient pressure but has a lid 146 which may be closed from time to time to provide an enclosed space.

The main treatment process in the reactor 100 involves the batch application of feed to the biofilm 132. The tank 112 is filled with feed to the feed level 130 using the feed pump 128. The feed pump 128 is connected to the feed supply through an equalization reservoir 148 to permit batch operation from a non-batch feed. The feed remains in the tank 112 for a period of time, for example between 12 and 96 hours, while it is treated by the biofilm 32. During treatment, the lid 46 may remain open, but the water in the tank 112 is generally anoxic or anaerobic. However, oxygen, typically as a component of air, is supplied to the biofilm 132 through the membrane 120 by the blower 118 creating an aerobic region on the biofilm 132. From time to time during the treatment period, a recirculaton valve 149 may be opened and feed pump 128 operated to mix the feed water in the tank 112.

After the biofilm 132 has digested the feed to the desired degree, the drain valve 131 is opened to drain the tank 112. The draining may occur in two steps. In the first step, the solids slurry present in the bottom of the tank is drained to remove settled solids which are then transferred to a sludge management system. In the second step, the clear decanted liquid is then drained to a second stage treatment or disinfection system, or discharged to a sewer, or discharged to a receiving stream.

The oxygen bearing gas supply may be continued throughout the filling operations to continue digestion of the material adsorbed on the biofilm, and to ensure that treatment starts immediately as soon as a portion of the biofilm is immersed in the wastewater. Similarly aeration may continue throughout the draining operation to continue treatment as long as a portion of the biofilm is immersed and to digest organics adsorbed in the biofilm for a short period of time even while not immersed, so as to maximize the time of treatment of each batch.

Figure 18:
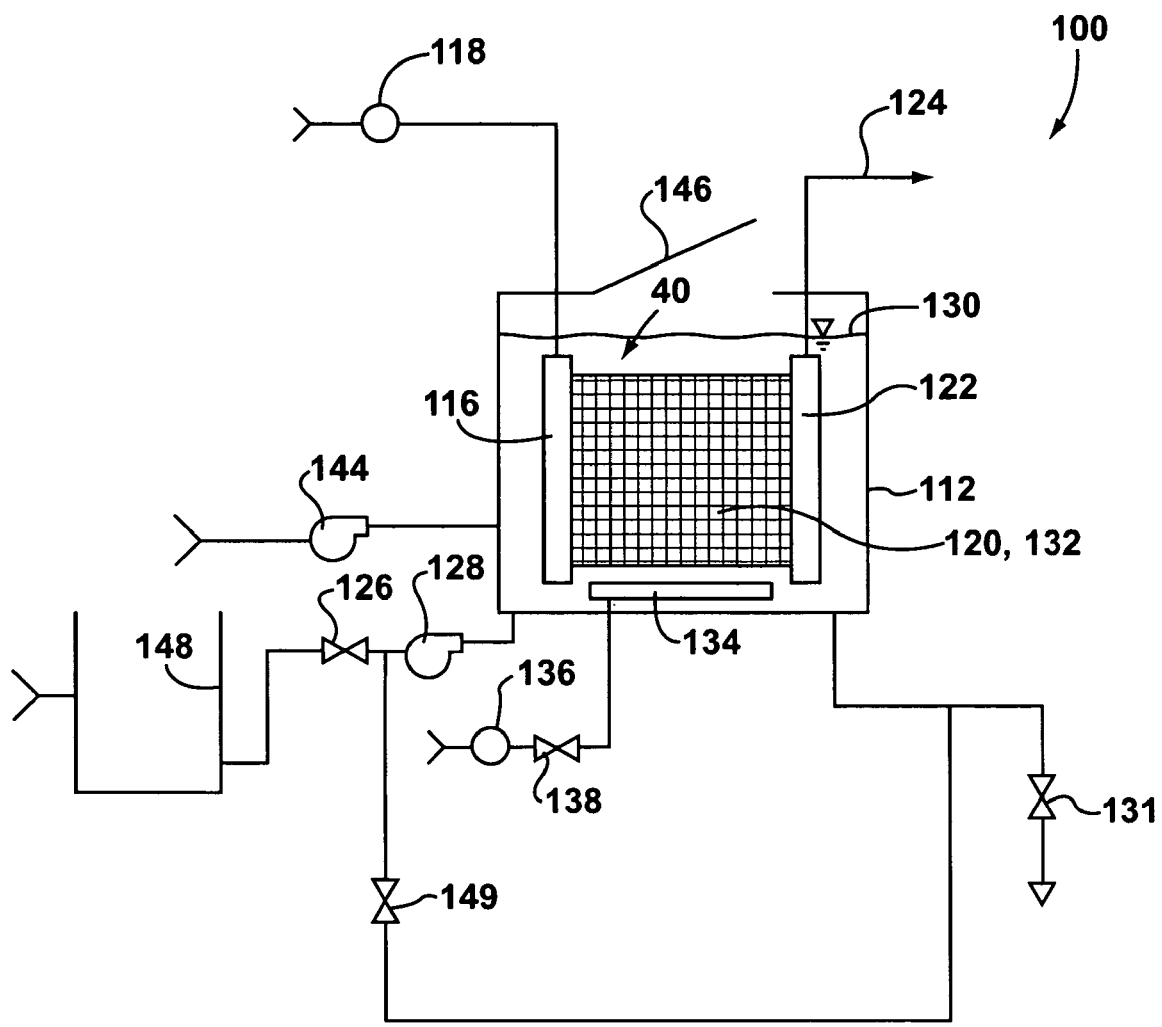

Referring now to FIG. 18, a reactor 400 is shown having similar features as the reactor 100, but without the gas supply 140, gas supply valve 142, or liquid pump 144.

In a batch process, the concentration of the wastewater decreases towards the end of each processing period. Demand for oxygen supplied to the biofilm also decreases and so the gas supply to the modules may be reduced. Modules using fibres at least partially in the form of tows allow a very high surface area for oxygen transfer and biofilm growth. Tow modules are particularly useful in treating wastewater having a low COD, for example 1,000 mg/L or less, 500 mg/L or less or 300 mg/L or less, because they provide large surface areas. Pressure loss through the fine fibre lumens is not limiting with the amount of air supply required to deliver oxygen to a biofilm treating low COD wastewater. Although they may be useful for treating other wastewaters as well, tow modules can be used where the initial feed has a low COD or as a second or third stage behind other treatment processes or apparatus that reduce the COD concentration of stronger feedwaters. With municipal wastewater or other feeds, for example feeds having a COD of 1,000 mg/L or more, a two stage apparatus may be used. In a first stage, membrane supported biofilm modules in the form of a fabric sheet are used as in FIG. 9. The outlet from a reactor containing these modules is fed to a reactor containing tow modules with sheets as in FIG. 4 which provides second stage treatment. The inventors have observed that rapid reduction in COD from a high COD wastewater limits the denitrification produced from a membrane supported biofilm reactor. With a two stage process, the first stage may be optimized for COD removal. The feed to the second stage has a reduced COD and the second stage may be optimized to support nitrifying microorganisms, for example of the species nitrobacter and nitrosomas, over carbon degrading microorganisms to provide improved ammonia oxidation in the second stage.

In general, when considering COD, soluble COD is used since soluble COD is most easily digested by a biofilm 30 and is easily measured. However, particularly for modules 40 with loose tows 20 over some or all of their area, some particles of insoluble COD are trapped in the biofilm. Over time, these particles are broken down into soluble COD and digested. Accordingly, total, or total biodegradable, COD also may be a relevant parameter in some embodiments.

For feeds having a CODs of 1000 mg/L or more, a module 40 may have an $SA_{OXYGEN}/SA_{BIOFILM}$ of 1 or more, for example between 1 and 10. Modules 40 having sheets 26 woven across the entire length of the fibers 10, in a dense weave with a high number of fibers for very high loadings, for example, are useful. For feeds having a CODs of 1000 mg/L or less, a module 40 may have an $SA_{OXYGEN}/SA_{BIOFILM}$ of between 0.2 and 2.5. Modules 40 having sheets woven across the entire length of the fibers but with a less dense weave, or sheets 26 with a central open tow 20 area, for example, are useful. For feeds having a CODs of 300 mg/L or less, a module 40 may have an $SA_{OXYGEN}/SA_{BIOFILM}$ of 1 or less, for example between 1 and 10. Modules 40 with sheets 26 have a central open tow 20 area, or modules 40 of loose tows 20, for example, are useful.

Figures 19A, 19B:
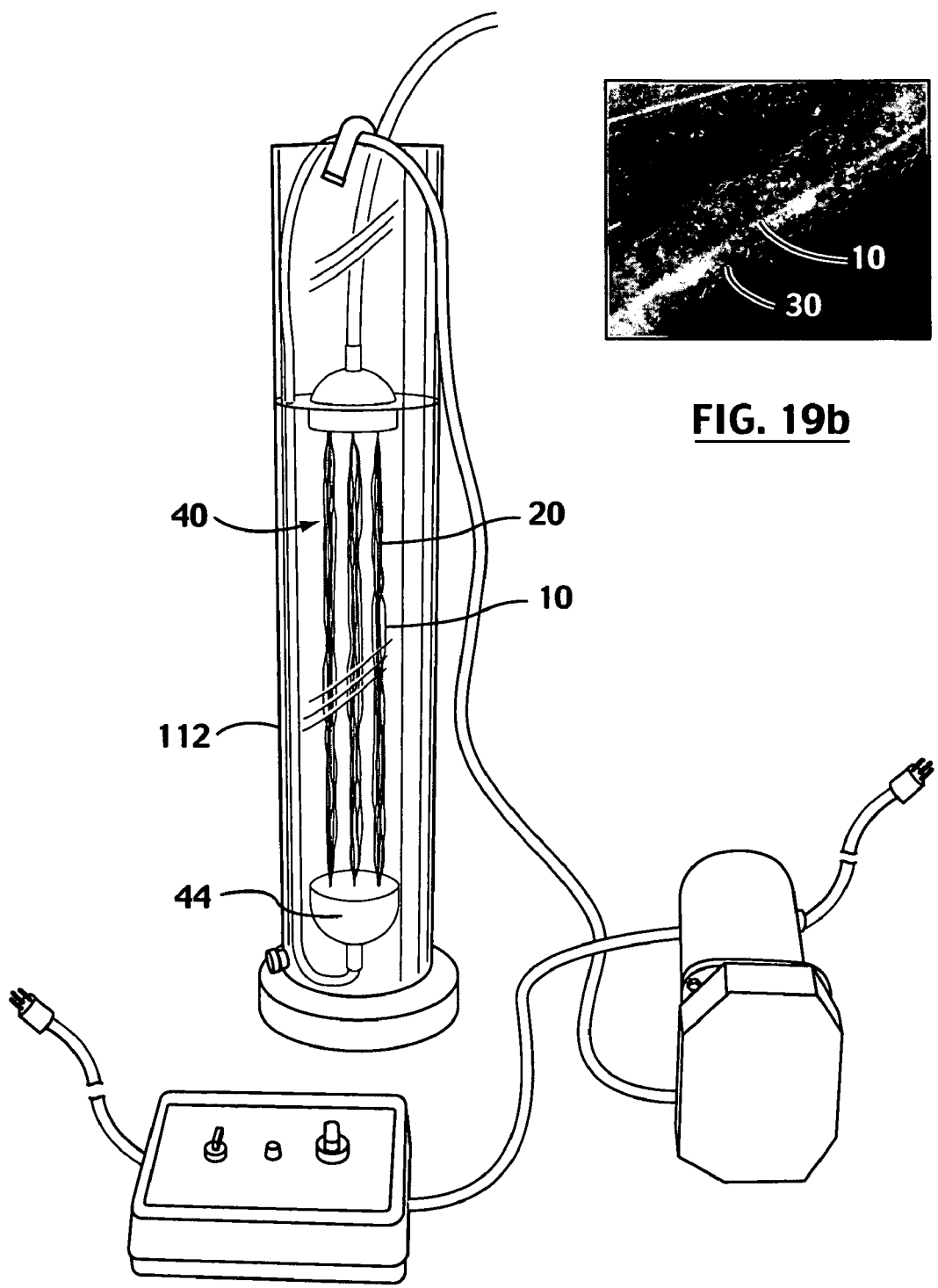
FIG. 19a is a bench scale batch reactor using a tow module.
FIG. 19b is a photograph of a biofilm on a tow of fibres growing in the reactor of FIG. 19a taken through a microscope.

FIG. 19a shows a bench scale reactor having a module 40 made by potting 100 tows 20, each of 96 fibres 10 as shown in FIG. 1, into an opposed pair of headers 44. The module 40 was used to treat a feed water in a batch process. In the process, the module 40 was located in a tank 112 filled to 4 L of synthetic wastewater. The tank was drained and filled with fresh feed every 1 to 7 days. Air was applied to the module at 10 mL/min. A biofilm 30 of stable thickness grew on the module 40 for a period of over 6 months. The biofilm 30 was essentially endogenous, its rate of growth generally equal to its rate of decay, except that a small part of the biofilm 30 broke off and was discharged with some of the tank drains. A section of a tow 20 is shown in FIG. 19b. Individual fibers 10 are covered in biofilm 30. In some places, the biofilm 30 around a small group of fibers 10 may merge together for a portion of the length of the fibers 10. The thickness of the biofilm 30 shown is about 250 microns.

Figure 20:
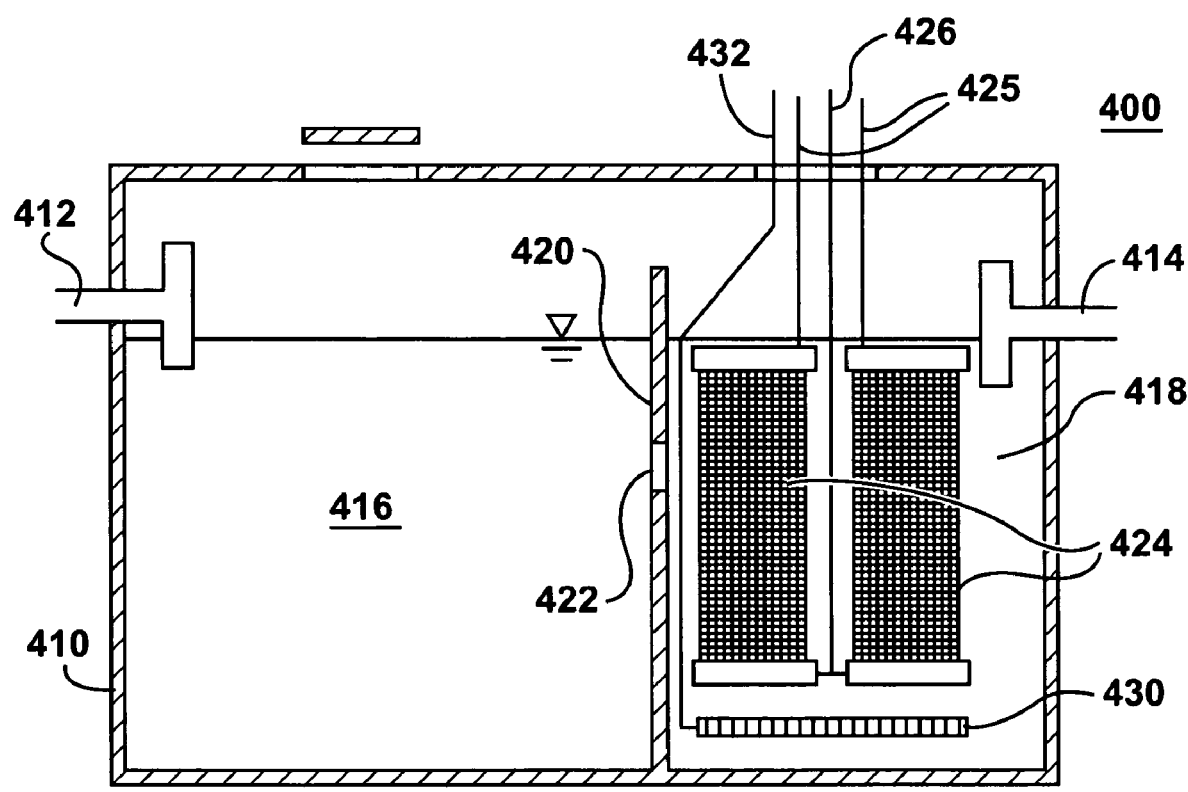
FIG. 20 is a schematic elevation drawing of a septic tank modified to use a supported biofilm module.

Referring now to FIG. 20, another reactor is shown as suitable, for example, for a septic tank, septic tank retrofit or shipboard treatment plant. The particular reactor shown is a septic tank retrofit using a standard septic tank 410 with an inlet 412 and an outlet 414 on opposite sides. The tank 410 has two stages including a primary chamber 416 and a secondary chamber 418. A dividing wall 420 has a submerged orifice 422 that allows flow between the chambers 416, 418. One or more modules 424 are placed in the secondary chamber 418. Air is supplied to the bottom headers of the modules 424 through inlet tubes 426. Exhaust air is vented from the upper headers of the modules 424 through exhaust tubes 428. Scouring air is periodically applied to a sparger 430 located under or near the bottom of the modules 424 through scouring air tube 432. The modules 424 each have 1 to 100 or 8-20 sheets as in FIG. 4 potted into a pair of headers to produce a module 424. For example, a septic tank for a single household may have one 8 to 10 sheet module 424 fed with a ¼ hp air blower and creating a pressure drop of about 1 to 7 psi, or about 3 psi. With a typical household feed, a generally endogenous biofilm grows on the individual fibre 19 and tow 20 surfaces. Biological treatment in the biofilm results in a reduction in the suspended solids and chemical oxygen demand of the effluent, allowing the septic tile field to be reduced in size or eliminated.

In another embodiment of the invention, a module 40 may be placed in a suspended growth bioreactor and used in addition to or in place of fine bubble aerators to supply substantially molecular oxygen to the mixed liquor to achieve high oxygen transfer efficiency and a high oxygen uptake rate to reduce power use and tank volume. Under conditions of low soluble and total substrate concentration that exist in a municipal or industrial suspended growth bioreactor, biofilm thickness is limited to a very small and stable value by endogenous respiration. Limited agitation is provided to maintain the biomass in suspension, which may further restrict the growth of the biofilm. Since the oxygen diffusion rate through polyolefin fibre as disclosed in this invention is substantially lower than oxygen diffusion through the liquid film or a biofilm, the liquid film or biofilm that may grow on the surface of the fibre does not become the mass transfer-controlling step and a high level of agitation, high gas pressure or frequent cleaning are not required to control the thickness of the biofilm and the liquid boundary layer. In this invention, the dense or semi-porous nature of the fibre also prevents wetting, and supply of adequate quantity of oxygen is ensure by the very high specific surface area of the fine fibre, removing or reducing the need of very high level of agitation or high gas pressure. Also, the overall oxgen transfer rates are such that any of air, or oxygen enriched air, or substantially pure oxygen gas may be used as the source of oxygen, resulting in high oxygen transfer and utilization efficiency in each case. In each of these cases, inert gases can be continuously purged, by having the gas flow through and exhaust from the module, to maintain good oxygen concentration profile throughout the module to ensure good oxygen transfer, although pure oxygen can also be supplied in a dead-end mode.

In another embodiment of the invention, the module 40 may be placed in a suspended growth bioreactor and used for supplying substantially molecular oxygen to the mixed liquor to achieve high oxygen transfer efficiency and a high oxygen uptake rate to reduce power use and tank volume. A thin biofilm may be permitted to grow on the surface of the bioreactor. COD or ammonia or both may be removed in this biofilm which may be, for example, between 20 and 100 microns thick. In conditions of low substrate concentration that exist in a suspended growth bioreactor, such biofilm will be enriched in nitrifying microorganisms due to the high concentration of oxygen at the fibre surface. This biofilm, while transferring adequate oxygen to the mixed liquor, enhances the rate and extent of nitrification in the suspended growth bioreactor by actually increasing the total concentration of nitrifying microorganisms. It also promotes better nitrification under conditions, such as high temperature, where nitrification is severely restricted in a suspended growth bioreactor, due to the stability and robustness of the biofilm, which protects the microorganisms through a thick coating of exracellular polymeric substances.

In another embodiment of the invention, the module 40 is used to supply oxygen at a high efficiency to a suspended growth bioreactor in combination with a conventional fine or coarse bubble aerator or another aeration device such as a jet aerator. In such an invention, bulk of the bioreactor oxygen demand, typically 80%, but as low as 50% of the total, may be supplied by a gas transfer module, whereas the balance, or 20%, to as high as 50%, is supplied by a conventional aerator which is also used for maintaining the biomass in suspension and for helping to control against excessive biofilm growth.

In another embodiment of the invention, the module 40 is used to supply oxygen at a high efficiency to a deep suspended growth bioreactor, without increasing the inlet oxygen carrying gas pressure to beyond that required for overcoming the pressure drop in the module, as the gas is isolated from the high static pressure in a deep tank due to the dense nature of the fibre wall. Mechanical mixing is used to maintain the biomass suspended in the bioreactor. This facilitates better utilization of the space available, and reduces the cost of bioreactor because of its deep profile without incurring a penalty in high air supply pressure as is common in conventional disk, diaphragm, coarse bubble or jet aerators that must deliver oxygen to the bottom of the tank.

Figure 32:
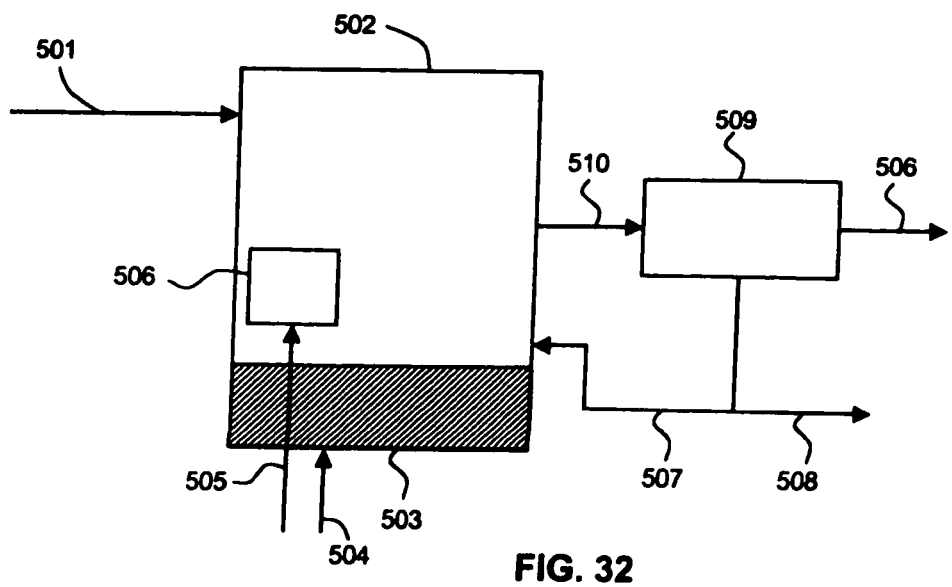
FIG. 32 is a schematic illustration of a bioreactor using modules according to the invention to transfer oxygen to a substrate.

FIG. 32 presents a process flow diagram of a membrane aerated suspended growth bioreactor which may be used, with modifications as necessary, with the embodiments discussed above or others in which a module 40 is used to transfer oxygen to a substrate. Raw or pretreated feed enters, through feed line 501, an aerobic bioreactor tank 502 having a membrane aeration zone 503 in which modules 40 (not illustrated) are placed. Air, through module air line 504, is supplied to the modules 40. Suspended growth is maintained in the aerobic bioreactor tank 502 by feeding air through mixing air line 505 to a coarse or fine bubble aerator 506. Aerator 506 may receive only a portion of the total air needs of the aerobic bioreactor tank 502, for example in the range of 10 to 50% or 10 to 30% and may, or may not, create significant additional oxygen transfer as desired. Alternatively, a mechanical mixer may be used in place of or in addition to the aerator 506 to keep mixed liquor in the aerobic bioreactor tank 502 mixed and/or keep bacteria in suspension. Mixed liquor leaves the aerobic bioreactor tank 502 through mixed liquor line 510 and enters a separator 509 which may be a clarifier, filter, microfilter or ultrafiltration membrane. Return sludge flows through recycled activated sludge line 507 to maintain the desired mixed liquor concentration in the aerobic bioreactor tank 502. Excess sludge is rejected through waste sludge line 508. Treated effluent leaves through effluent outlet 506.

The modules 40 may be placed on or near the floor of the aerobic bioreactor tank 502, optionally above the aerators 506 or other mixing device. The modules 40 may take up most or all of the floor area and, if necessary, may be provided in two or more layers. Multiple layers may be required, for example, where fibers having low volumetric delivery, such as unmodified PP fiber, are used. Multiple layers may also be required where the aerobic bioreactor tank 502 has a shape that is deep relative to its area. For most bioreactors, which are in the range of 15 to 25 feet high, two module layers are likely to be adequate. For example, for a 1 MGD municipal wastewater treatment plant, aerobic bioreactor volume may be 718 $m^3$. For a 5 m tank height, tank floor area will be 143.5 $m^2$. Total oxygen demand for this reactor may be 2153 kg/d. For the module described in Calculation Example 7, a total of 30 modules will be required to supply the oxygen demand. Footprint of each module is 7.5 $m^2$, but placement of modules 40 in a grid with some space between adjacent modules 40 may require a total surface area of 230 $m^2$. Therefore, two stacks of 15 modules each may be evenly distributed in the tank to provide uniform distribution. Mixing aerators can be uniformly placed, one underneath each module stack, and the space between the modules 40 can provide downcomer area to ensure uniform distribution.

In other embodiments, back diffusion, particularly in fibres of low selectivity, is useful. For example, the modules 40 may be used in water used to grow fish in a fish farming operation or aquarium either to transfer oxygen to the water, to support a biofilm or both. Even with a fibre 10 of low selectivity, the $N_2$ gradient towards the water that the fish live in is small or even negative. Accordingly, $O_2$ is added to the water without causing $N_2$ saturation in the water even when air is fed into the modules. The ability to use air, rather than oxygen as required when bubbles are used, results in a significant cost reduction. Depending on the concentration in the fish water, ammonia may back-diffuse into the fibre lumens 14 which helps maintain non-toxic ammonia levels in the fish water. In these and other applications where the water surrounding the modules 40 is aerobic, the entire biofilm may be maintained under aerobic conditions.

The biofilm, if any, may also be maintained at a thin and stable thickness under endogenous respiration due to the low food concentration in the water. In a similar application, a module 40 may be used to oxygenate other bodies of water, such as the hypolimnion of a lake, in which mixing is not desired and where removal of some gases could be beneficial, although a more selective membrane may also be used if only oxygen transfer is desired.

Back diffusion may also be used in other applications to advantage. For example, the module 40 may be used to oxygenate a suspended growth bioreactor at high oxygen transfer efficiency and high oxygen uptake rate due to the molecular nature of the oxygen transferred. The oxygen carrying gas, which may be air, or oxygen enriched air, or substantially pure oxygen, is supplied to the lumen of the fibre. Oxygen permeates through the fibre wall, and through a thin biofilm that grows on the surface of the fibre, to the reactor, where it is taken up rapidly by the active biomass suspended in the mixed liquor. Under such conditions of high oxygen uptake rate, carbon dioxide will build up in the bioreactor, leading to a decrease in the pH of the mixed liquor which would necessitate addition of an alkali to control pH. However, with a module 40 as described herein, and particularly one of low selectivity, carbon dioxide may diffuse back through the biofilm and the fibre to the oxygen bearing gas stream, leading to reduced or no pH adjustment requirement even at oxygen uptake rates as high as 200 mg/L/h.

In another embodiment of the invention, a number of bioreactors are installed in series to provide flow patterns approaching plug flow. This results in higher reaction rates and better utilization of oxygen.

In another embodiment of the invention, different oxygen levels are used in different stages of the bioreactor by oxygen spiking to meet different levels of oxygen demand and to achieve high bioreactor loadings. Different oxygen levels may also be used at different times in a single reactor or stage of a reactor. To increase the oxygen level, the pressure of the gas fed to the lumens of the fibers or the oxygen content of the feed gas can be increased. Similarly, to decrease the oxygen level, the feed gas pressure or oxygen content can be decreased. Higher oxygen levels may be used in upstream stages of multi-stage reactors or in highly loaded reactors. Oxygen levels may also be increased periodically or from time to time to correspond to periods of time when the loading on a reactor is temporarily increased, for example to respond to seasonal or daily variations in wastewater strength or quantity.

A module 40 may also be used in alternative processes or arrangements. For example, gas transfer into a liquid can be achieved in a dead end configuration, ie. without an outlet conduit. In this case, however, it is preferable to provide a small outlet bleed to reduce condensation in the lumens and vent gases transferred from the liquid into the lumens. To remove gases from a liquid, a dead end configuration may also be used wherein no inlet conduit is provided. Use of the apparatus in some other applications is described below.

In water degassing, water containing dissolved gases such as nitrogen, oxygen or carbon dioxide flows into a tank. A module 40 is immersed in the tank. A sweep gas flows through the module 40 or a vacuum is applied to the module 40 (the inlet conduit is omitted). Gases in the liquid cross the membrane to the lumens of the module 40 from where they are removed through the outlet conduit. Water lean in dissolved gases leaves the tank. Such a process is useful, for example, in producing ultrapure water. Pervaporation is accomplished with a similar reactor but the feed water contains volatile organic compounds which diffuse to the lumens of the module 40.

In humidification, a module 40 is immersed in a water bath. Dry air enters the module 40. Water vapour crosses the membrane to the lumens of the module 40 and humid air leaves the module 40.

In air cleaning, a module 40 is immersed in a water bath enriched with nutrients and a biofilm is cultured on the module 40. Air containing volatile organic compounds flows into the module 40 and the volatile organic compounds diffuse through the membranes to the biofilm. Air lean in volatile organic compounds exits the module 40.

3.0 Biofilm Control

In a membrane supported biofilm reactor, it can be advantageous to control the thickness of the biofilm on the membranes. For example, in the reactor 100 (FIG. 17), although the tank 112 is drained periodically, most of the biofilm 132 remains on the membranes 120, particularly where the feed has a high COD, for example over 300 mg/L. Excess thickness of the biofilm 132, for example 2 mm thick or more, provides minimal, if any, increase in digestion rate, over a thinner layer, for example of 1 mm thick or less. However, keeping the biofilm 132 thin allows the sheets 26 of the modules 40 to be placed closer together, providing more surface area per module volume. This increase in surface area generally more than offsets any minor increase in digestion that may, or may not, be achieved with a thicker biofilm 132.

Accordingly, means are provided to prevent the biofilm 32 from becoming unnecessarily thick. The following methods may be performed individually or in various combinations. The frequency of treatment varies with the growth rate of the biofilm 132. For example, a biofilm 132 may grow by 10 microns a day and the module 40 may be made to tolerate a biofilm of between 0.2 mm and 0.8 mm. Biofilm control procedures may then be required every 5 to 10 days. Alternately, the period between biofilm control procedures may be linked to the amount of COD that the biofilm has digested since the last control procedure, which is in turn related to the time and biofilm thickness increase since the last control procedure. For example, control procedures may be performed when the biofilm has digested about 20 to 200 grams of CODs per square meter of biofilm area since the last control procedure. When control or thickness reducing procedures are performed at this frequently, a stable biofilm layer is maintained over extended periods of time even though each control period does not have a drastic effect on biofilm thickness. Control procedures may be applied to the entire biofilm at once or to a portion of the biofilm at a time.

3.1 Mechanical Methods of Biofilm Control

Some methods for controlling the thickness of the biofilm 132 on the membranes 120 involve mechanically removing part of the biofilm 132. In one such method, still referring to FIG. 17, one or more aerators 134 are provided below the modules 114 and connected to a blower 136 through an aeration valve 138. With the tank 112 full of liquid, blower 136 is operated to create bubbles from aerator 134 below the modules 40. The bubbles mechanically scour the biofilm 132 and also create a flow of water through the modules 40 that physically removes some of the biofilm 132. A high velocity of scouring air of 2-8 feet/second or an air application rate of 5 to 20, for example about 10, cubic meters per hour per square meter of module footprint for intervals of 1 to 10 minutes may be used. This may be done, for example once every day to once every week. Also, air may be used to periodically mix the contents of the bioreactor.

Other mechanical methods include spraying the modules 40 with water while the tank 112 is empty and physically removing biofilm 132 such as with a comb, wire or brush. The removed biofilm 132 falls to the floor of the tank 112 and may be flushed out through drain 131 for further processing as for waste sludge. These mechanical methods may be performed less frequently than other methods and, when performed, may be performed after another method has weakened the biofilm 132.

Mechanical methods for controlling the biofilm are enhanced by providing the sheet 26 with a rough or textured surface, the height of the surface undulations being in the range of the desired biofilm thickness. Desired biofilm thickness may be 200 to 1,000 microns.

3.2 Chemical Methods

In another embodiment, ozone gas, introduced in the fibre lumen is used to oxidize a part of the biofilm to make it digestible. Oxygen is then provided to the lumens to permit the biofilm to digest the oxidized organics, thereby reducing the total amounts of solids generated and to control the biofilm thickness. The oxygen may be provided as a separate step or as part of the regular step of digesting wastewater. The reactor may be treated in this way one module or section at a time.

In another method, a control substance is applied to the tank side of the biofilm 132. For example, after the tank 112 is drained, clean water heated to, for example, 35-55 C, may be pumped into the tank 112 by the liquid pump 144. The heated water is kept in the tank 112 for a period of time (contact period), for example 3-5 hours, sufficient to kill a fraction of the biofilm 132 and dissolve some of the organics that form the biofilm matrix. The biofilm is also starved to some extent since feed has been removed. Oxygen may continue to be applied to the lumens or may be turned off. Air scouring may also be provided during this period to enhance biofilm removal, although it may be more economical to carry out this operation without air scouring, particularly if the blower 136 and aerator 134 can then be eliminated from the reactor 100 entirely. The biofilm 132 is also starved to some extent. After the contact period, the water is drained through drain valve 131. In an industrial treatment system, the discharge water will have some COD but the duration of the contact period can be chosen such that the discharge is still suitable for discharge to a municipal sewer since most of the killed organisms will remain in the biofilm 32. During a later part of the contact period, the living inner part of the biofilm 32 will biodegrade the killed organisms. The effect of the heated water, or unheated water, may be enhanced with the addition of chemicals such as acids, for example with a pH between 1 and 6 or between 3 and 3, bases, for example with a pH between 8 and 13 or between 9 and 11, or enzymes. The chemicals and their concentration and contact time are chosen to partially dissolve or weaken some organics that are structural component of the biofilm but to kill only a fraction of the microorganisms while leaving the majority behind in an active biofilm for rapid restart of the reactor.

In another method, a gaseous control substance is applied to the tank side of the biofilm 132. The gas is applied from gas supply 140 while the tank 112 is drained at the end of a batch cycle. Lid 146 is closed so that the gas remains in the tank 112. The gas may be of various types, for example an acid such as chlorine. Alternately, ozone may be used. The primary purpose of the ozone is to break up the cell walls of the microorganisms in the biofilm 132 to make it more biodegradable. The amount of ozone applied would not be sufficient to oxidize more than about 5% of the biofilm directly and to kill only a fraction of the microorganisms present in the biofilm. However, refractory organic material is converted to organic material which is later reduced by biological oxidation when the tank is refilled. The ozone is generated in a gas phase (air or oxygen) and is easily dispersed in an empty tank 112. The ozone is kept in the tank 112 for a period of time allowing it to be absorbed by the biofilm 132. Redox conditions can be controlled in the tank 112 while it is drained to promote sludge reduction. Alternating aerobic and anaerobic conditions can be established in the biofilm 132 by turning the feed to the inlet header 116 on and off while the tank 112 is filled with ozone to enhance the effects of the ozone. Killed and partially oxidized organisms remain in the biofilm 132 and are later digested in situ such that excess biomass need not be removed from the tank 112 for further treatment. Denitrification may also be improved because the carbon/nitrogen (C/N) ratio increases. Ozone may also be used in this method with membranes 120 that are sensitive to ozone since the membranes 120 are protected by the biofilm 32.

3.3 Biological Methods

In another method, worms or other animals or higher life forms are used in an isolated section of the reactor to digest excess biofilm to reduce bio-solids generation. The worms etc. are grown in a separate bioreactor. When desired, the worms etc. are applied to the biofilm by filling the tank with a liquid suspension or brine containing the worms etc.

Another method of biofilm control is endogenous respiration. By this method, the feed loading applied to the biofilm 132 is kept such that the rates of decay of the biofilm 132 equals its rate of growth. In practice, the rate of growth may exceed the rate of decay by a small amount in a batch process because some of the biofilm 132 may detach and leave the tank 12 when it is drained. However, endogenous respiration occurs most practically without limiting the oxygen supply at low loading rates and so may be used for feeds with low COD concentrations, for example 1000 mg/L CODs or less or 300 mg/L CODs or less. Endogenous respiration has the advantage of producing very little waste sludge. To produce endogenous respiration without limiting the supply of oxygen to the biofilm 132, the food to microorganisms ratio (F/M) can be limited to a value low enough so that the rate of cell growth generally equals the rate of cell decay (i.e. a generally null net ratio of cell growth) at an acceptable maximum biofilm thickness. For example, the F/M ratio may be maintained by applying feed at a rate below 0.09 kg of CODt per day for every kg of MLSS in the reactor (0.09 kgCODt/kgMLSS/d), for example between 0.03 to 0.09 kgCODt/kgMLSS/d or between 0.07 to 0.09 kgCODt/kgMLSS/d.

Alternately, endogenous respiration can be produced by limiting the supply of oxygen to the biofilm 132, even at F/M ratios that exceed these values, or at an F/M ratio of greater than 0.07 kgCODt/kgMLSS/d or greater than 0.9 kgCODt/kgMLSS/d. Further, particularly in a multi-stage reactor or system, both methods can be provided. For example, in a system having an upstream tank, zone or reactor with effluent fed to a downstream tank, zone or reactor, the upstream biofilm 132 may be kept in endogenous respiration by limiting the oxygen supply to the biofilm 132 while the downstream biofilm 132 is kept in endogenous respiration by limiting the F/M ratio. In this way, endogenous respiration can be used to treat concentrated feeds, for example feeds with 300 mg/L CODs or 1000 mg/L CODs or more. Because the feed is only partially treated by the upstream biofilm 132, the total system becomes like a plug flow reactor, particularly if more than two tanks, zones or reactors are used. Tow or loose tow modules, for example those described in part 1.4.1, may be used in one or more or all of the stages or the multi-stage reactor or system.

Another method is periodic starvation. In this method, the feed is kept in the tank 112 for an extended period of time such that the COD concentration drops to below what it is at the end of a typical batch process. The biofilm 132 is not nourished and decays rapidly until the start of the next batch cycle. The biofilm can also be starve by removing the feed and filling the tank with clean, for example tap or potable, water, or by loading the reactor at less than 0.1 kg CODs per kg MLSS per day.

In another method, the supply of gas to the inlet header 116 of the module 40 is turned on and off cyclically for a period of time. The varying supply of oxygen shocks the biofilm 132 and causes increased decay. Aerobic and anaerobic areas in the biofilm expand and contract while consuming, or being consumed by, the other. Alternately, gases such as ozone or chlorine, may be added to the inlet header 116 to enhance the shock.

With chemical or biological biofilm control, closer spacing between the sheets 26, for example 3-4 mm, may be used since hydraulic flow through the modules 40 is not required as with air scouring, agitation or other physical methods of biofilm removal. Chemical or biological methods are also useful where sheets 26 or fibers 10 or units 19 are not arranged so that a flow of scouring air will not reach all parts of the biolfim. Chemical or biological biofilm control methods may also be useful with open sheets 26 or modules with unsupported or loose fibers 10, fiber units 19 or tows 20 that would be damaged by air scouring, agitation or physical methods. Alternately, one or more chemical methods, one or more mechanical methods or one or more biological methods may be combined.

EXAMPLES

Example 1

Chemical Oxygen Demand (COD) Reduction in a Membrane Supported Bioreactor

Figure 21:
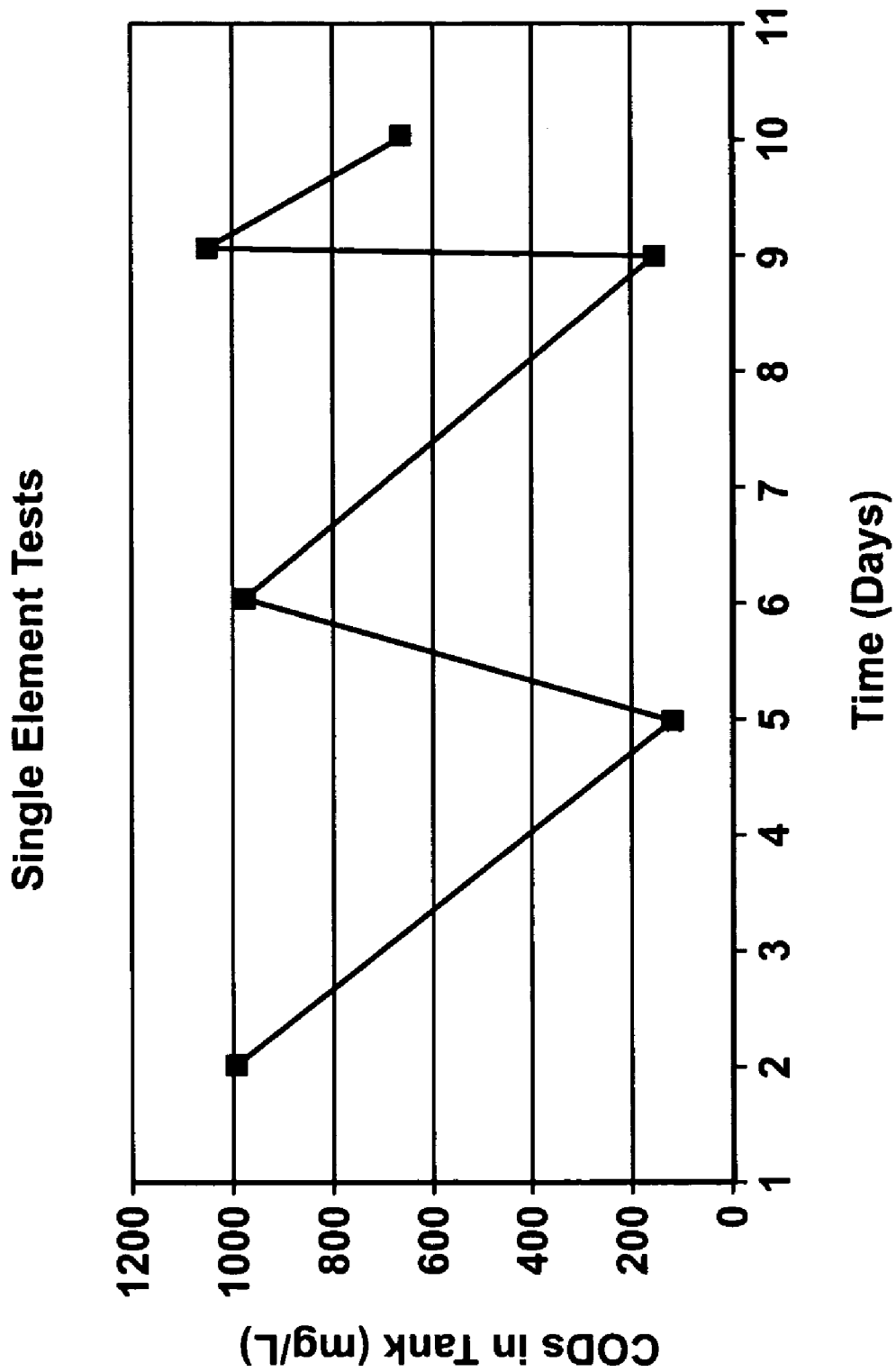
FIGS. 21 to 31 are results of tests conducted with various sample modules or reactors.
Figure 22:
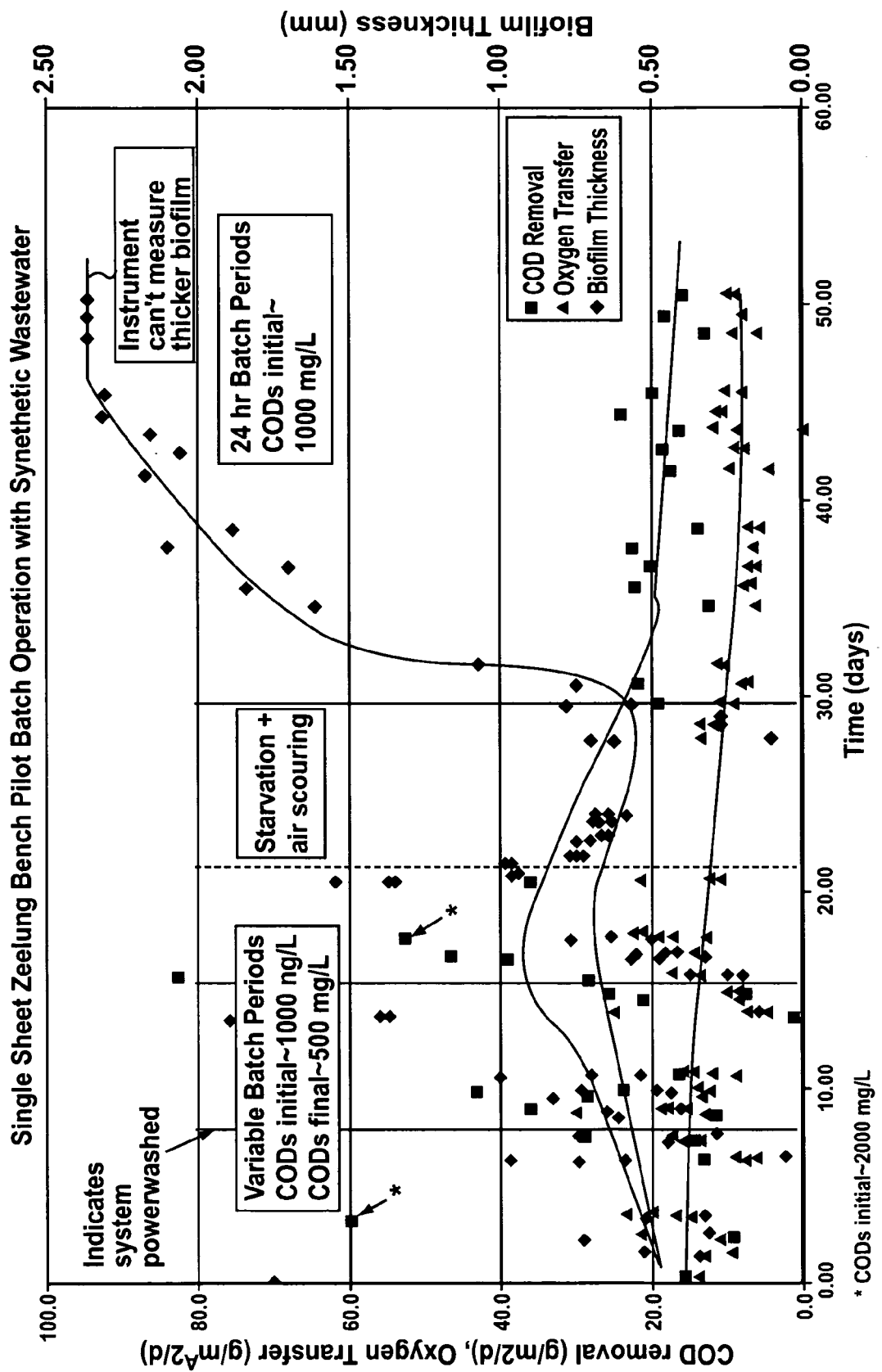

A bench scale bioreactor was made using a module generally as presented in FIGS. 6-9 except that only a single sheet of the fibres was used. The length of the sheet was 0.57 m and height 0.45 m, providing a total biofilm area of approximately 0.5 m$^2$ assuming a with both sides of sheet available for biofilm growth. The ratio of surface area for gas transfer to surface area of attached biofilm was between about 5 and 6. Inlet air flow was 25 ml/min at a pressure of 34.5 kPa. Reactor volume was 30 L. Synthetic wastewater with a COD level of 1000 mg/l was introduced in a batch manner periodically. The synthetic wastewater consisted of 1.0 g/L of soluble peptone and 0.03 g/L of sodium hydrogen phosphate dissolved in tap water. A series of batch reactions were conducted to determine the rate of reaction and oxygen transfer efficiency. FIG. 21 presents the results of three batch periods: a three day period form day 2 to day 5, a three day period from day 6 to day 9 and a one day period from day 9 to day 10. It can be seen that 80-90% reduction of COD was obtained in each of the three-day batch periods. A COD reduction of about 40% was achieved in the one-day batch period suggesting that the rate of COD reduction is higher while the concentration of wastewater is higher and that the COD reduction rate levels off as the COD concentration in the batch decreases with time. Oxygen transfer efficiency during these series of tests ranged from 50 to 70%, as measured by the exit concentration of air.

Example 2

Bench Test With Synthetic Wastewater

A bench scale bioreactor was designed using a single sheet module as described for Example 1. Synthetic wastewater with a COD level of 1000 mg/l, as described in Example 1, was introduced and treated by the biofilm on the module. Rates of COD removal and oxygen transfer and the thickness of the biofilm were calculated or measured and recorded. For about the first 21 days, the reactor (which has a 30 L fill volume) drained and re-filled with feed after variable batch periods to keep the CODs in the tank generally between 500 and 1000 mg/L. At day 8 and day 16, in addition to emptying the tank and re-filling it with new feed, the module was powerwashed with a water sprayer to remove biofilm. From about day 21 to day 30, the biofilm was subjected to starvation (i.e. the tank was filled with tap, i.e. clean or drinkable, water while oxygen supply continued to the module) and air scouring treatments. On about day 30, the tank was emptied and re-filled with feed. From then on, the tank was emptied and re-filled with wastewater daily but no biofilm control steps were taken, to allow the biofilm to grow in thickness and observe the effect and rate of such growth. The results of the test are presented in FIG. 21. It can be observed that the COD removal rate varied between about 19 to 38 grams per square meter per day without being proportional to the biofilm thickness. The oxygen transfer varied between about 10 to 15% grams per square meter per day, also over a relatively wide range of biofilm thickness, namely, from about 0.5 mm to over 2.3 mm, at which thickness the measurement device reached its maximum thickness.

Example 3

Pilot Study With Industrial Wastewater

Figure 23:
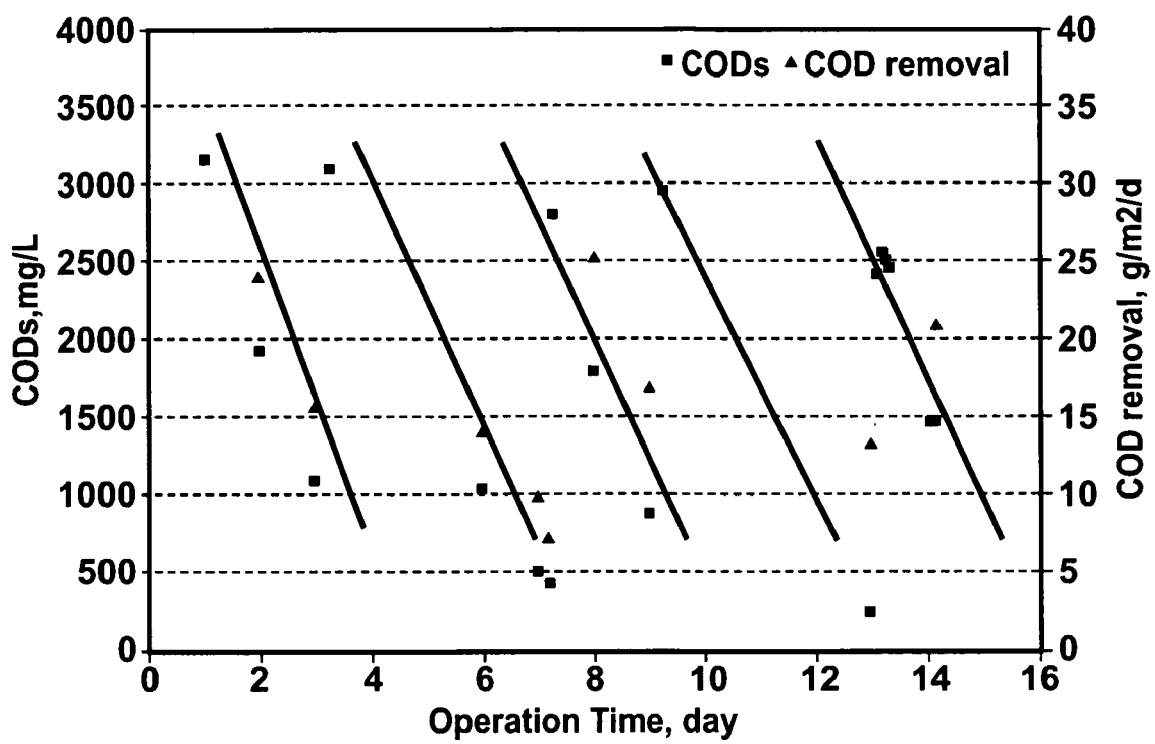

A small pilot study was conducted using four modules generally as shown in FIGS. 6 to 9. Each module has 6 sheets of fibers and a total planar surface area, or area of biofilm, of about 3.6 m², and a ratio of surface area for gas transfer to surface area of attached biofilm of between about 5 and 6. The modules were installed in a 300 liter tank. The reactor was initially operated with peptone (about 2000 mg/l) and then peptone added to wastewater in a declining ration to accelerate the initial growth of biofilm on the sheets but then acclimatize the biofilm to the wastewater. After acclimatizing the biofilm, batch operations were conducted, filling the tank with industrial wastewater. The wastewater was drawn from multiple sources in ratios chosen to create an feed COD of about 3000 mg/l. "Pure" oxygen was supplied to the modules at a feed pressure of about 5 psi. As shown in FIG. 23, bulk CODs concentration dropped to less than 1000 mg/l in about 2 to 3 days. It was also noted that COD removal rates declined with bulk CODs concentration in the wastewater, and with time, during each batch.

Figure 24:
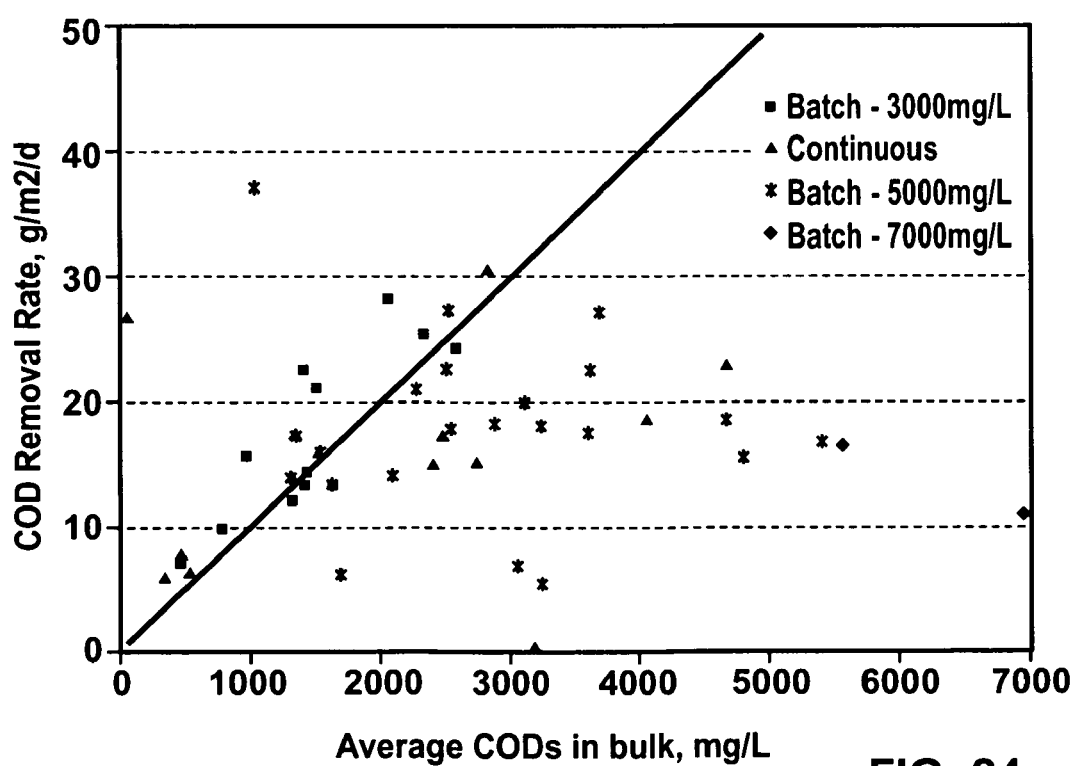

COD removal rates were calculated at different periods of time during the batches corresponding to different concentrations of CODs in the tank. Batches having initial CODs of 5000 mg/l and 7000 mg/l were also tested to observe the effect of higher initial COD concentrations on COD removal rate. The results are presented in FIG. 24. As indicated in FIG. 24, removal rate was generally higher at higher loadings except that, in the reactor tested, very high loadings did not always produce very high removal rates suggesting that one or more of air feed pressure, surface area for air transfer to biofilm surface area or total module area were less than optimum for very high loadings.

Figure 25:
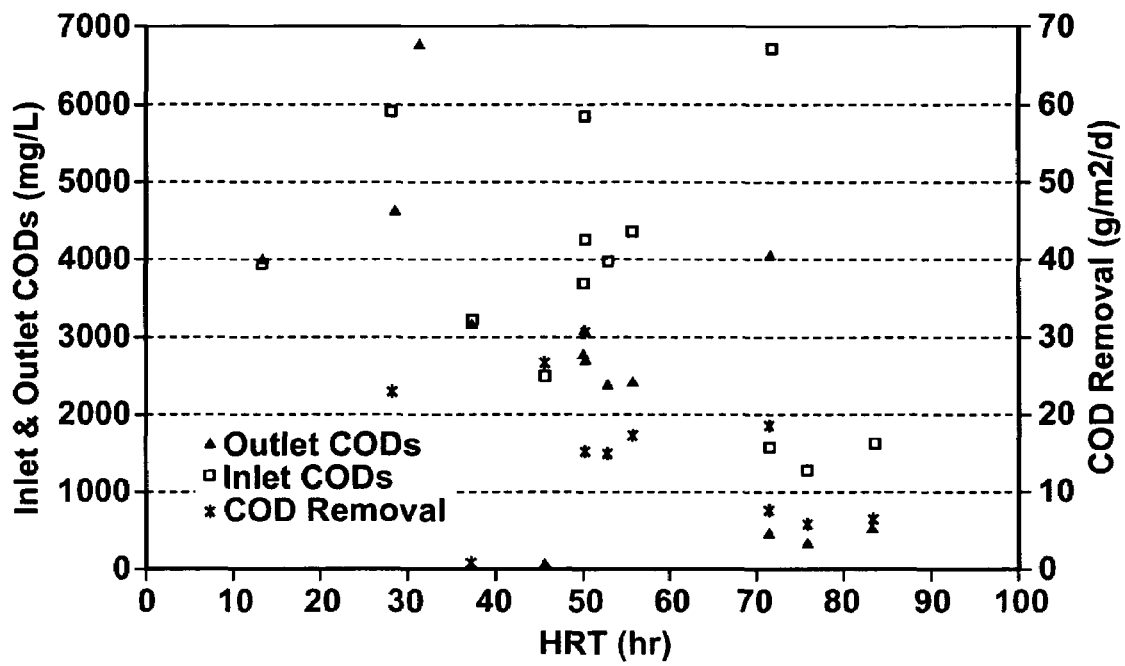

The same reactor was used for a series of trials conducted under continuous operation. In the trials, HRT and inlet CODs were varied. The feed gas was "pure" oxygen at a feed pressure of 5 psi. For each trial, the average inlet CODs, outlet CODs and removal rate, organized by HRT of the trial, are presented in FIG. 25. COD removal rates generally decreased as HRT increased or as inlet CODs decreased.

The effectiveness of biofilm control procedures were also verified in the reactor during the batch trials mentioned above. Gentle aeration of about 1 scfm/module for 15 seconds every hour was applied, primarily for mixing, and more aggressive air scouring of about 4 scfm/module for 2-3 minutes every 2-3 days was applied primarily to remove biofilm. The biofilm thickness was successfully maintained in a range from about 0.2 mm to less than 0.8 mm regardless of the average bulk CODs in the reactor, which varied from about 300 mg/L to about 5,500 mg/L.

Example 4

Pilot Study With Municipal Wastewater

Figure 26:
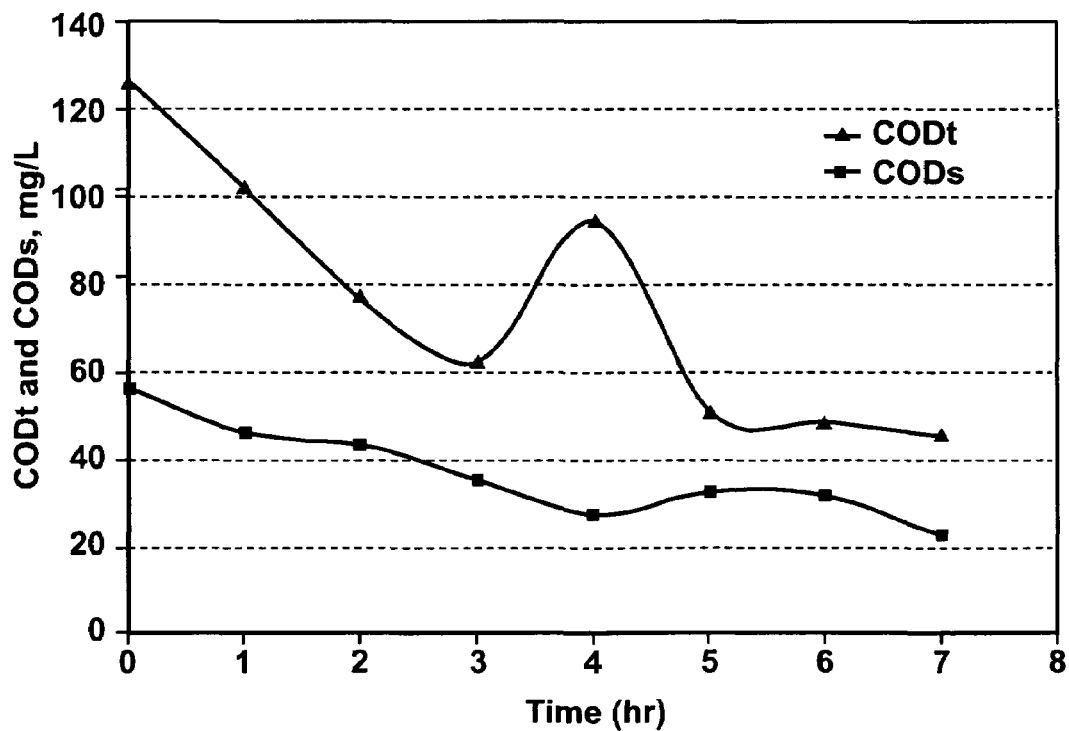

Another pilot study was conducted using two modules as described in Example 3, each having a surface area of about 3.6 m², installed in an 85 liter tank. Air was supplied to the modules at a feed pressure of about 5 psi. Peptone was added initially to the sewage to accelerate the initial growth of biofilm on the sheets as described for example 3. Batch operations were conducted, filling the tank with municipal wastewater, screened through a 3 mm screen, having an initial CODs of averaging about 100 to 200 mg/l, but occasionally up to 700 mg/L. At the ends of the batches, CODs concentration had generally dropped to less than 30 mg/l and COD removal rate had also generally dropped to less than 1 g/m2/d. The levels of CODs and CODt with respect to time within a sample period in a batch are presented in FIG. 26.

A study was also conducted with a continuous process, with different trials performed over a total period of about 60 days. In the trials, HRT varied from 24 hours to 3 hours and inlet CODs from 100 mg/l to 200 mg/l. Average removal rates tended to be lower with lower loading rates.

Nitrification and denitrification kinetics were also measured in the continuous process study. The results of 4 trials are presented in the following table.

TABLE 1

Nitrification and Denitrification in Continuous Operation

| HRT (hr) | Inlet CODs (mg/L) | Inlet NH3—N (mg/L) | Outlet CODs (mg/L) | Outlet NH3—N (mg/L) | Outlet NO3—N (mg/L) |
|---|---|---|---|---|---|
| 11.5 | 165 | 18.2 | 29 | 3.5 | 3.4 |
| 7.8 | 117 | 19.6 | 25 | 5.4 | 4.4 |
| 4.4 | 105 | 17.7 | 35.9 | 5.6 | 4.3 |
| 3.1 | 84 | 18.7 | 37.6 | 11.6 | 1.3 |

Biofilm control was also tested in the municipal wastewater study. Biofilm thickness averaging 0.2 mm was observed with air scouring, but thicker biofilm appeared to collect between some individual sheets indicating that these areas were not receiving full scouring air.

Example 5

Bench Scale Study With a Tow Module With Wastewater

A module similar to the one shown in FIG. 5, having 100 PMP fibre tows, each tow having 96 fibres of dense walled PMP, was tested. The total surface area of the fibres in the module was 0.54 m$^2$. In the module, each tow was individually potted into an upper and lower header. The module was fed with a supply of air at a rate of 10 ml/min to the bottom header and exhausted out of the top header. The module was suspended, with the top header held in a clamp at the water surface and the bottom header weighed down, in a container filled to a volume of 4 L. The module was operated in a batch mode using a synthetic wastewater of 1000 mg/L CODs and also wastewater from a septic tank. At the start of each batch processing period, the container was filled with wastewater. Air was supplied to the module to support a biofilm growing on the fibres for processing periods ranging from between about 1 to 7 days while wastewater was neither added to nor withdrawn from the tank. Shorter batch periods were generally used with wastewater having lower concentrations of COD. At the end of the processing period, the tank was drained. New wastewater was added to start the next processing period. At various times, the module was removed to non-destructively measure the thickness of the biofilm on them and measurements of the COD in the wastewater were taken.

Figure 27:
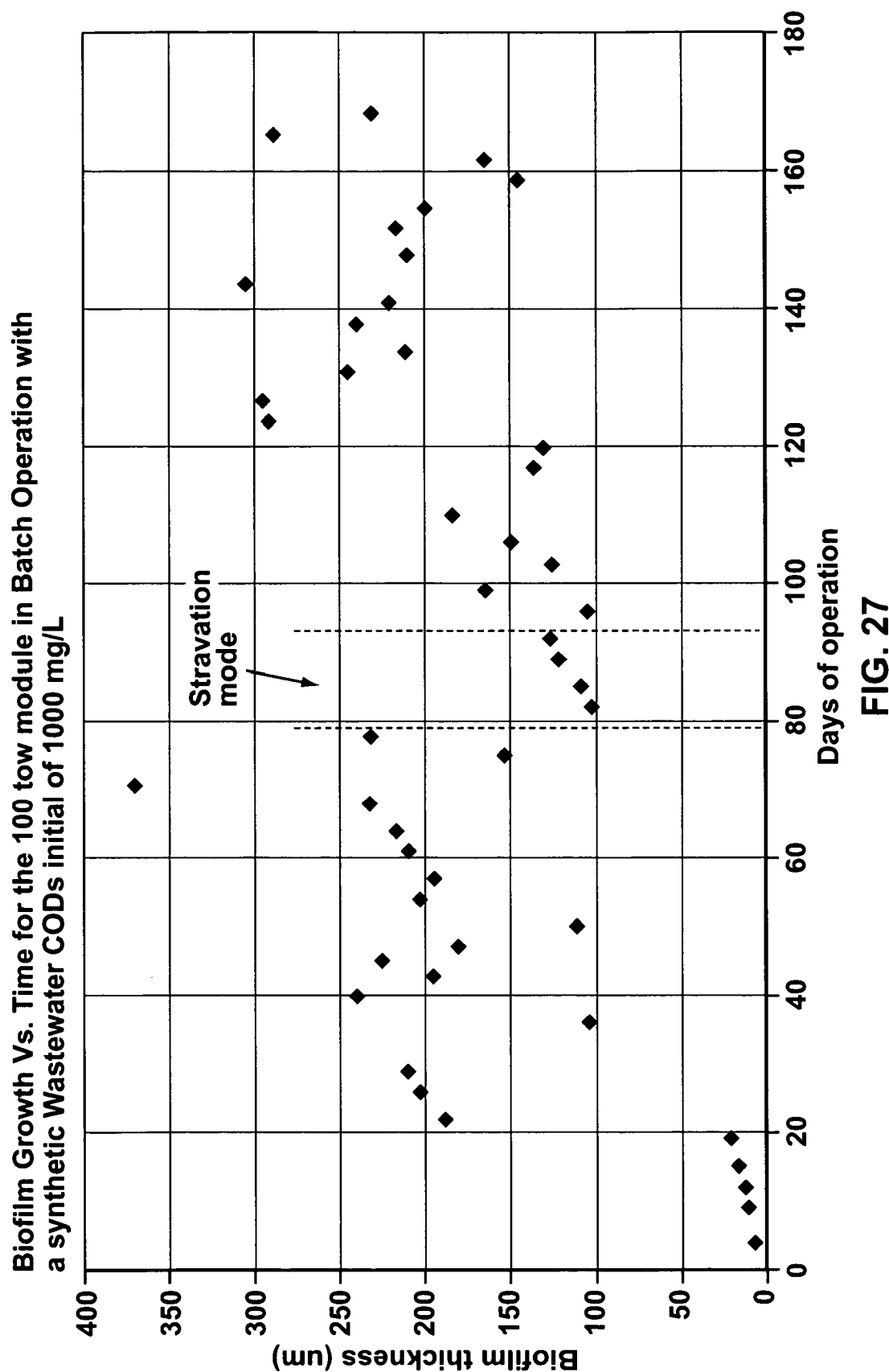

The thickness measurements from the tests using synthetic wastewater are recorded in FIG. 27 which shows the thickness of the biofilm on the fibres over the period of 180 days of operation. There was initially no biofilm but after about 20 or 40 days a biofilm had developed having a thickness that generally ranged between about 100 and 300 µm. For most of the test run, no additional methods were used to control the biofilm thickness and yet the biofilm thickness remained generally stable and acceptable. Small portions of biofilm were observed to be shed from the module during at least some of the tank draining operations, and biofilm control was otherwise provided by endogenous growth of the biofilm. However, for a period of approximately 15 days, the module was operated in a starvation mode. In this mode, the tank was filled with tap water and air feed was continued. The biofilm was reduced in thickness from about 250 µm to about 100 µm during the starvation period indicating that the starvation period was effective at reducing the thickness of the biofilm.

Figure 28:
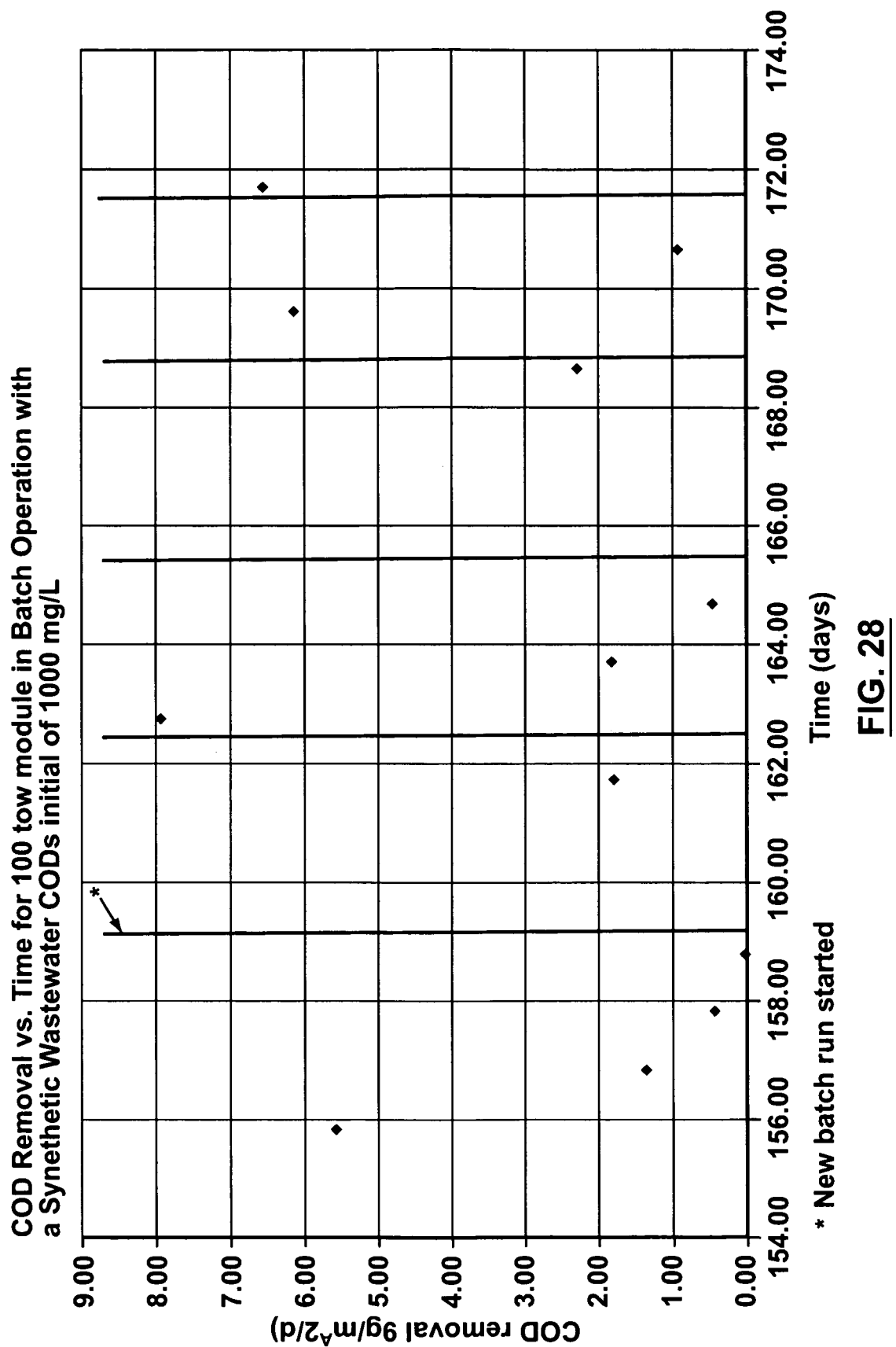
Figure 29:
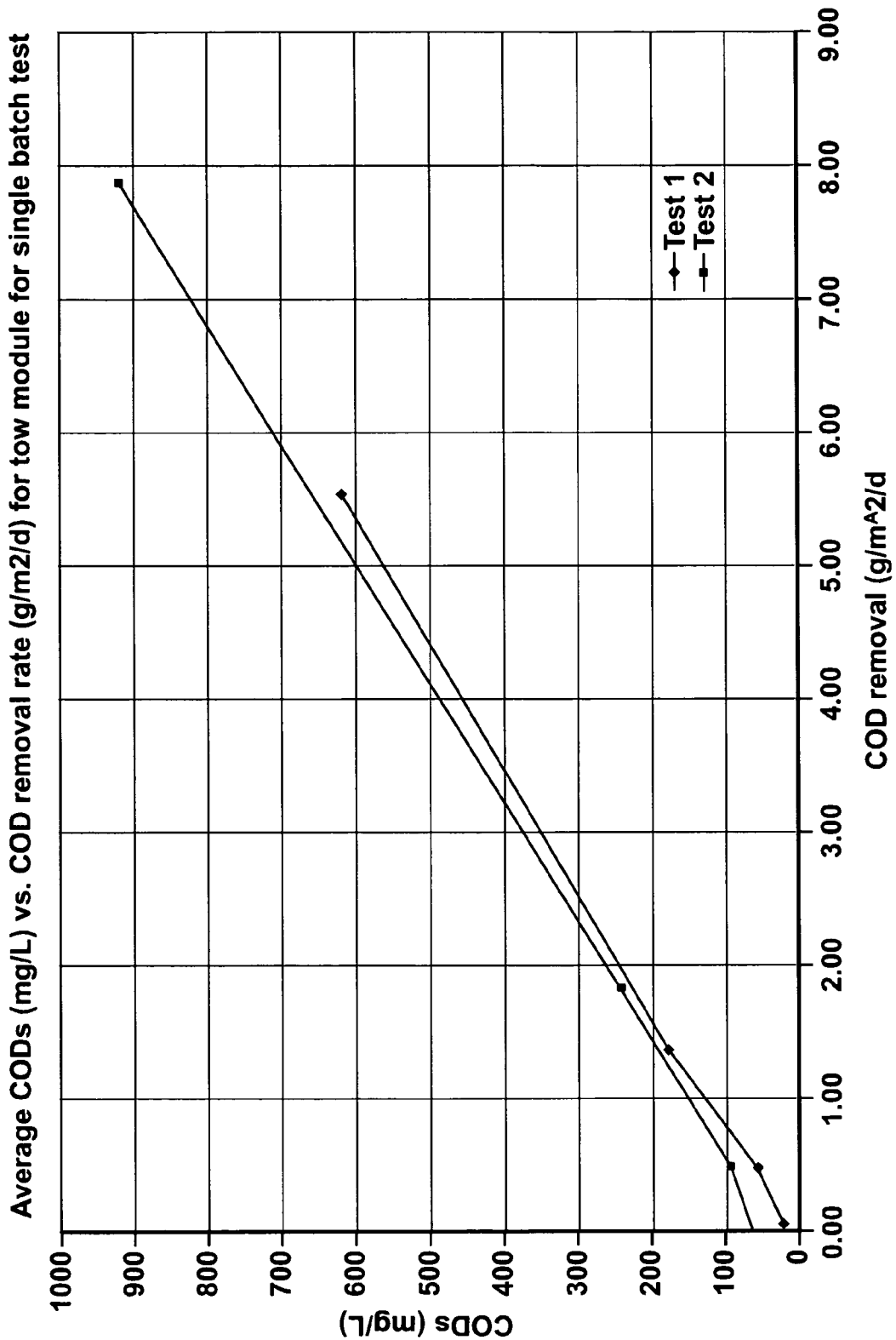

FIGS. 28 and 29 show the removal rate of COD in tests using the synthetic wastewater. FIG. 28 shows removal rate as a function of time and FIG. 29 shows removal rate as a function of COD concentration. Referring first to FIG. 28, each vertical line within the figure indicates the start of a new batch processing period. Accordingly, at the times indicated by the vertical lines, new wastewater having a COD of 1,000 mg/L was added to the tank. As the batch progresses, the wastewater is treated and accordingly its COD concentration reduces. As shown in FIG. 28, the COD removal rate tended to drop with time in each batch processing period suggesting that the removal rate is related to the COD concentration in the wastewater. Further, the removal rate in the batch between day 154 and day 159 approached zero indicating that further processing time would have marginal value. In FIG. 29, the COD removal rate is plotted directly against the average COD concentration in the wastewater. As indicated in FIG. 29, the relationship between COD removal rate and COD concentration in the wastewater is nearly linear with the removal rate being generally proportional to the COD concentration.

For the tests using septic tank wastewater, the wastewater was taken from the second chamber of a septic tank. For one trial, the characteristics of the wastewater were as follows:

Total Chemical Oxygen Demand ($COD_t$):377 mg/L
Soluble COD ($COD_s$):199 mg/L
Ammonia Nitrogen (AN):55.1 mg/L
Total Suspended Solids (TSS):70 mg/L The module was operated in a batch mode with batch processing periods of approximately 24 hours to simulate actual reaction conditions in a septic tank. Air was supplied during these periods at the rate given above to provide oxygen to the biofilm. After one processing period of 22 hours and 35 minutes in duration, a sample of the treated wastewater was analyzed and results were as follows:

$COD_t$:140 mg/L
$COD_s$:73 mg/L
AN:24.7 mg/L
TSS:1 mg/L

A significant improvement in effluent quality was achieved. In particular, a huge reduction in TSS was achieved. By visual observation, a large portion of the TSS removed was in the form of colloidal matter.

Figure 30:
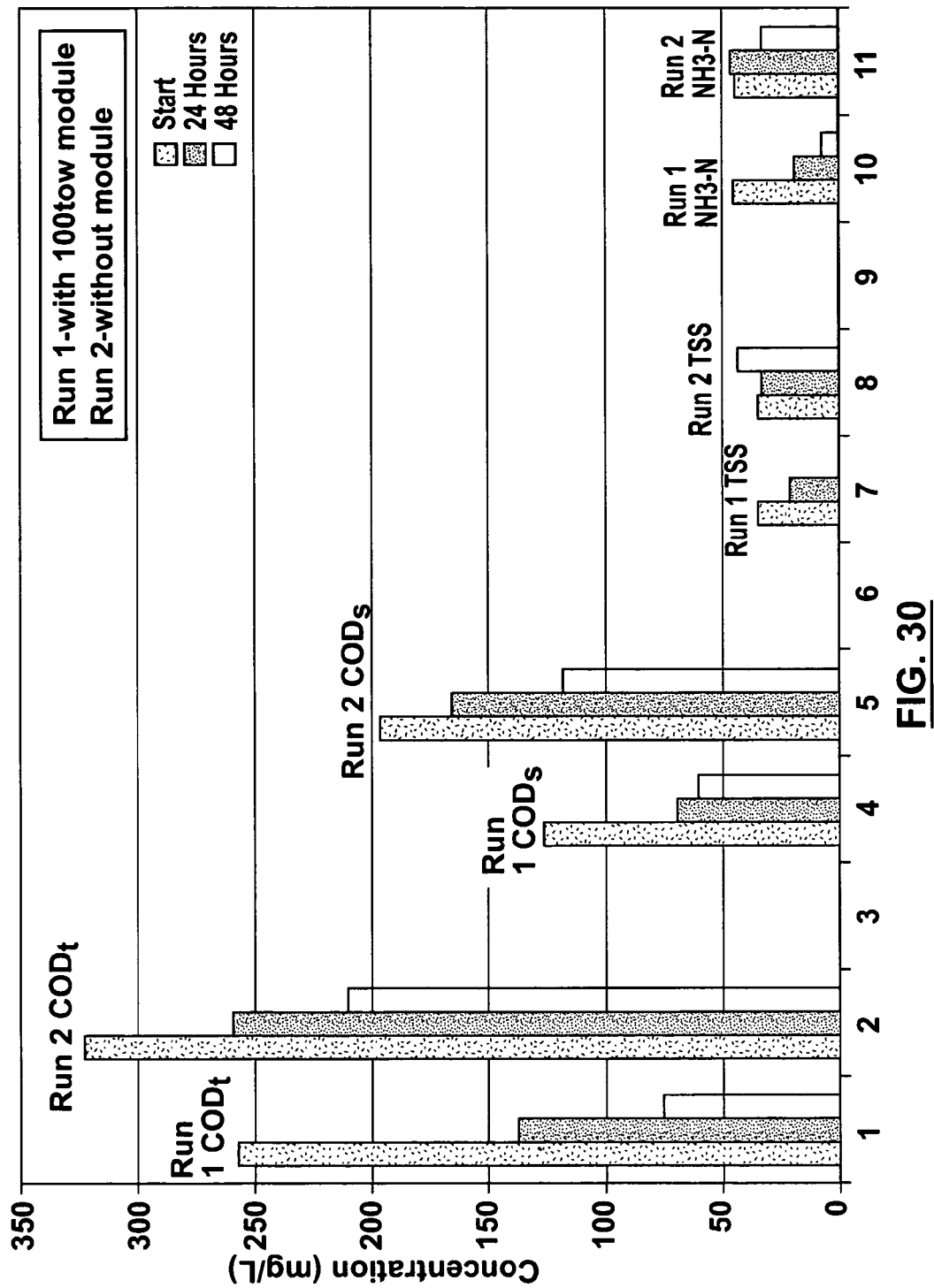

FIG. 30 records the results from another trial using septic tank wastewater. The reactor was operated for a two-day batch period with concentration of CODt, CODs TSS and ammonia nitrogen measured at the beginning, middle and end of the batch period. For comparison purposes, another sample of wastewater taken from the same septic tank on the same day was placed in a 500 mL graduated cylinder and monitored as a control. After two days of operation, reduction of Total COD (CODt) in the reactor approached 75 mg/L, with a removal in excess of 70%. TSS dropped from 34 mg/L to almost no appreciable TSS after two days of treatment. Ammonia was also reduced during this period. During the same period, the control had a less than 40% reduction in COD and an increase in TSS. The batch process and reactor effectively treated the septic tank wastewater by removing COD but also removing suspended solids, in part because of the quiescent nature of the process.

Example 6

Chemical Biofilm Control

A biofilm control study was done using the single sheet reactor described in Example 1 with a very thick biofilm on it. At the start of the test, the tank was drained and 30 L of sodium hydroxide solution in deionized water at a pH of 9.43 and a temperature of 40 C was added to the reactor. After a first 4 hours of soak, air scouring at 2 scfm was started and was continued for more than 18 hours while sodium hydroxide solution remained in the tank. Air supply to the lumens remained on. The biofilm thickness was reduced slightly (4.6 mm to 4.3 mm) over the first four hour period. After the 18 hours of soaking and air scouring, the thickness of the biofilm was reduced further to 3.2 mm.

Figure 31:
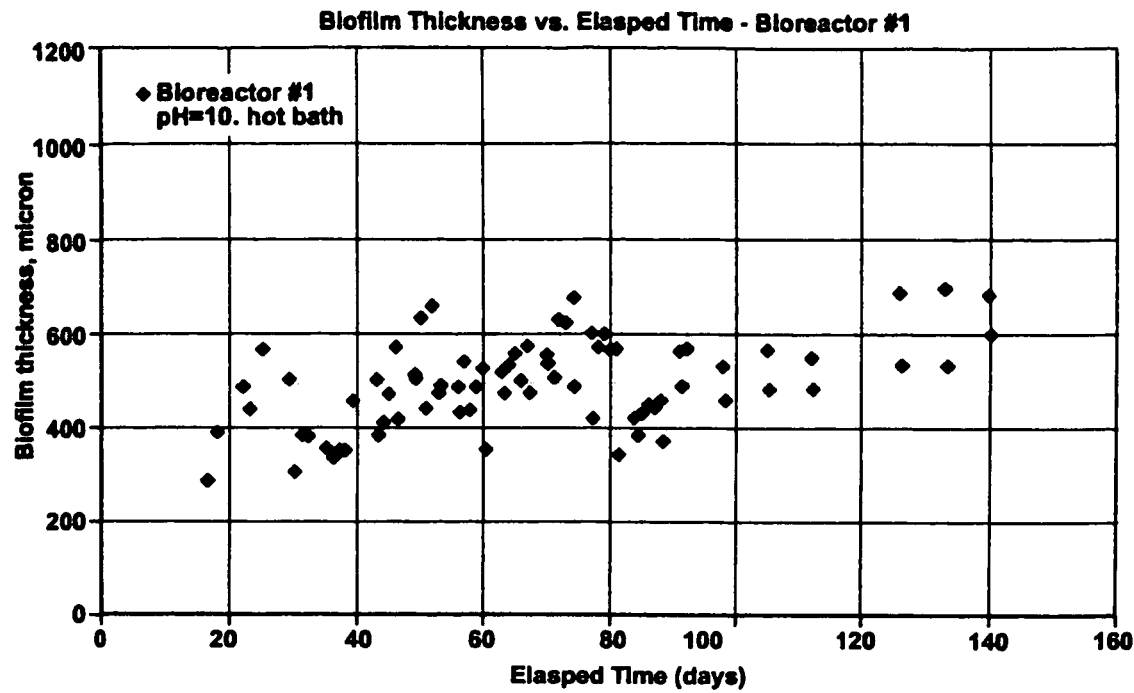

In another biofilm control study, 6 single sheet modules as shown in FIGS. 10a and 10b were used. Each sheet was about 27 cm long by 20 cm wide and had an available surface area of about 0.11 square meters. The sheets were woven with the hollow fibers running lengthwise and open at both ends. The ratio of air transfer area to biofilm area was about 6 to 1. The modules were placed in a 20 L (working volume) reactor operated in batch mode at room temperature with batch periods of about 3 days. The reactor was fed with synthetic sewage at concentrations from 2000 to 8000 mg/L CODs. Air was fed to the lumens of the modules at about 2 psi with a flow rate of about 20 mL/min to an inlet header of each sheet. At intervals of from 3 to 7 days, between batches, the modules were soaked for 4 hours in a solution of NaOH in hot water with a pH of 10 at 50 C. Air supply to the lumens remained on. After the 4 hours, the reactor was re-filled with feed. No air scouring was provided during the soak periods or during the batch periods. FIG. 31 shows the biofilm thickness over time which was maintained between 0.2 and 0.8 mm and averaged about 550 microns over a 140 day period. Calculated results from the batches during that period indicate that during the interval between cleanings the biofilm removed from 66 to 120 grams of CODs per square meter.

Calculation Example 7

Aerating a Suspended Growth Bioreactor

A module similar to module 40 described above, is used to supply substantially molecular oxygen to a suspended growth bioreactor. Important module and process characteristics are as follows:
1. Fibre material: polymethyl pentene (PMP)
2. Oxygen diffusivity in PMP fibre: 2E-13m3/m2/s*m/kPa
3. Fibre outside diameter: 68 micron
4. Fibre wall thickness: 10 micron
5. Total fibre length in the module: 3.78 E+9 cm
6. No. of sheets in the module: 297
7. Dimension of sheet: 2.3 m long by 1 m high
8. Module dimensions: 2.5 m long, by 1 m high by 3 m wide
9. Module volume: 7.5 m$^3$
10. Effective oxygen transfer area: 6925 m2/module
11. Oxygen diffusivity in the biofilm and the liquid boundary layer: 1.97E-9 cm$^2$/s
12. Assumed biofilm and liquid boundary layer thickness: 20 microns
13. Oxygen source: air
14. Wastewater source: Municipal wastewater
15. Bioreactor type: Suspended growth
16. Bioreactor bulk oxygen concentration: 2 mg/L
17. Inlet gas pressure: 55 kPa gauge
18. Outlet gas pressure: 0 kPa gauge Results are as follows:
1. Total oxygen transferred through the walls and the biofilm: 70 kg/h
2. Oxygen transfer efficiency: 62%
3. Volumetric oxygen delivery intensity: 9.3 kg oxygen/m3
4. Specific power use: 0.114 kWh/kg oxygen delivered Comparable calculations for a conventional diaphragm disk operator are as follows:
1. Oxygen transferred per aerator: 2.93 kg
2. Oxygen transfer efficiency: 10%
3. Volumetric oxygen delivery intensity (for a 5 m high bioreactor and limiting oxygen uptake rate to 100 mg O2/L/h: 2.7 kg oxygen/m3
4. Specific power use: 0.95 kWh/kg oxygen delivered It can thus be seen that the invention delivers oxygen to the suspended growth bioreactor at a substantially higher density at a lower energy use and a high transfer efficiency.

Calculation Example 8

Aerating a Suspended Growth Bioreactor

In this example, the biofilm thickness is increased to 50 microns instead of 20 microns.

Performance of this module as an aerator is as follows:
1. Total oxygen transferred through the walls and the biofilm: 58 kg/h
2. Oxygen transfer efficiency: 51%
3. Volumetric oxygen delivery intensity: 7.75 kg oxygen/m3
4. Specific power use: 0.114 kWh/kg oxygen delivered Thus it can be seen that while increasing the biofilm thickness reduces efficiency and oxygen delivery, it continues to be far superior to the conventional disk aerator.

Calculation Example 9

In this example, the module described in Calculation Example 7 is used, except the fibre material is PMP with an enhanced permeability which is twice that of PMP. Such enhancement is achieved by using methods described in this document. To achieve optimum oxygen transfer, inlet gas pressure is increased to 151 kPa gauge. Results are as follows:
1. Total oxygen transferred through the walls and the biofilm: 217 kg/h
2. Oxygen transfer efficiency: 51%
3. Volumetric oxygen delivery intensity: 29 kg oxygen/m3
4. Specific power use: 0.305 kWh/kg oxygen delivered Thus it can be seen that significant benefits are achieved by enhancing polymer permeability by methods disclosed in this invention. In this example, the air delivery gas pressure is increased to fully utilize the oxygen delivery capacity of the module, although the specific energy requirement continues to be small compared to the conventional disk aerator. One can as efficiently deliver oxygen by reducing gas pressure to a more common 55 kPa gauge by reducing the length of fibre and the module.

Calculation Example 10

Aerating a Suspended Growth Bioreactor

In this example, a polypropylene fibre without permeability enhancement is used for making the module described in Calculation Example 7. The permeability of PP is only 5.3% of PMP, and this value is used for the calculation. The module and system described in Calculation Example 1 is used except PP permeability instead of PMP permeability. It is determined that the inlet pressure must be dropped to 1.9 kPa gauge to provide an outlet pressure of 0 kPa gauge. Results are as follows:

1. Total oxygen transferred through the walls and the biofilm: 2.19 kg/h
2. Oxygen transfer efficiency: 72%
3. Volumetric oxygen delivery intensity: 0.292 kg oxygen/m3
4. Specific power use: 0.022 kWh/kg oxygen delivered The specific power use is very low, showing that this module can deliver power very efficiently. However, since an inlet pressure of 1.9 kPa may be too low to be supplied by existing equipment without significant energy loss, the sheet length was increased to 11 m in a modified form of this Calculation Example 10. Results are as follows:

1. Total oxygen transferred through the walls and the biofilm: 16.7 kg/h
2. Oxygen transfer efficiency: 72%
3. Volumetric oxygen delivery intensity: 2.22 kg oxygen/m3
4. Specific power use: 0.099 kWh/kg oxygen delivered This shows that a PP module without permeability enhancement is superior in efficiency and specific power use to the conventional disk aerator and can be used where low capital cost is desirable and power cost is high. However, it is preferred that PP permeability be enhanced by methods disclosed in this patent to enhance the range of applications of this invention.

Calculation Example 11

A test was conducted to determine the oxygen transfer efficiency of a module having sheets, as shown in FIG. 4a, of polymethyl pentene membranes. The following two modules were placed in a 106 L reactor:

Description of Modules:

|  | Module 1 | Module 2 |
| --- | --- | --- |
| Module width (m) | 0.43 | 0.23 |
| Fiber length (m) | 0.7 | 0.7 |
| Number of fibres | 244800 | 92160 |
| Membrane OD (um) | 45 um | 45 um |
| Membrane area (m2) | 26.5 | 9.97 |

The reactor was operated for 20 days with a continuous feed of municipal sewage at an hydraulic retention time of approximately 48 hrs to grow a visible biofilm on the surface of the fibre. The thickness of the biofilm was difficult to measure but was roughly 50 microns towards the end of the test.

The feed with 0 mg/L oxygen was introduced into the bottom of the reactor and the effluent overflowed to drain.

Experimental Set-Up:
Volume of reactor: 106 L
Reactor hydraulic retention time: 43 hr
Inlet air pressure: 3.2 psi
Inlet air flow to modules: 314 ml/min
Outlet air flow to modules: 280 ml/min
Inlet oxygen purity: air at 21% by volume
Outlet oxygen purity: 13.9% by volume
Oxygen transferred: 58.4 g/d (1.75 g/m2/d)

Substrate inlet and outlet concentrations were as follows:

| Parameters | Inlet | Outlet |
| --- | --- | --- |
| CODt (mg/L) | 588 | 185 |
| CODs (mg/L) | 340 | 163 |
| TSS (mg/L) | 96 | 40 |
| NH3 (mg/L) | 157.5 | 13 |
| NO3 (mg/L) | 1.2 | 6.9 |

In addition, total dissolved Oxygen in Bulk (substrate in the reactor) was 5.17 mg/L.

This shows that the system was operating in a hybrid mode, with oxygen partially being consumed in the biofilm to treat the influent, and partly being transferred through the biofilm to the bulk, or substrate (partially treated sewage) in the reactor. Therefore, it is concluded that the invention can be used either to supply oxygen to the bioreactor, or to be used as a hybrid system to support biological reaction both in bulk and in the biofilm.

Calculation Example 12

5600 fibres, of a polymethyl pentene textile fibre (outside diameter, 58 microns, inside diameter, 41.6 microns) were used to make a module, 1.5 m long, with total outside surface area of 1.53 m2. This module was used to transfer oxygen to mixed liquor from a membrane bioreactor. Mixed liquor was pumped from the bioreactor to a 340 mL oxygen transfer reactor. Mixed liquor suspended solids concentration was 13 g/L. Temperature was 20 deg. C. A new module was used with no biofilm grown on it. Operating conditions and oxygen concentrations are as follows:

| Sludge flow, mL/min | Air pressure, psi | Air flow out, L/minute | Dissolved oxygen in, mg/L | Dissolved oxygen out, mg/L | Oxygen in outlet gas streams, % by volume |
| --- | --- | --- | --- | --- | --- |
| Water only | 10 | 14 | Not applicable | Not applicable | 19.5 |
| 240 | 10 | 13.5 | 0.21 | 2.89 | 18.6 |
| 370 | 10 | 14 | .22 | 1.41 | 18.7 |
| 140 | 10 | 14 | 0.24 | 3.55 | 18.7 |
| 140 | 5 | 6 | 0.22 | 2.22 | 18.7 |

As can be seen, oxygen concentration in the gas stream is reduced and concentration of dissolved oxygen in the mixed liquor increases. This demonstrates that the dense membrane fibre can be used to transfer oxygen to a mixed liquor from a suspended growth bioreactor.

Many modifications and variations of the present invention are possible within the teachings of the invention and the invention may be practiced other than as described above. The scope of the invention is defined by the following claims.

We claim:

1. A process for treating a liquid comprising the steps of:
    a) contacting an apparatus having a port in communication with one or more inner surfaces of a gas permeable biofilm support medium with the liquid, the medium comprising a membrane having openings of up to about 40 Angstroms in size;
    b) providing a gas to the port of the apparatus, the gas permeating to outer surface(s) of the medium to support a biofilm growing on the outer surface(s); and
    c) providing air bubbles in the liquid.

2. The process of claim 1 wherein the liquid comprises wastewater.

3. The process of claim 1 wherein the gas comprises oxygen.

4. The process of claim 1 performed in a septic tank or shipboard system or to treat a wastewater taken generally directly from one or more houses or businesses or parts of a ship.

5. The process of claim 1 wherein the biofilm is maintained at a thickness between 0.05 mm and 2 mm, more preferably between 0.1 mm and 1 mm.

6. A process for treating a liquid comprising the steps of:
   a) contacting an apparatus having a port in communication with one or more inner surfaces of a gas permeable biofilm support medium with the liquid; and,
   b) providing a gas to the port of the apparatus, the gas permeating to outer surface(s) of the medium to support a biofilm growing on the outer surface(s); and,
   c) maintaining a least a portion of the biofilm so that its thickness alternately increases and decreases, the biofilm increasing in thickness over first periods of time and, between the first periods of time, reducing the thickness of the biofilm.

7. The process of claim 1 wherein step (b) comprises steps of providing an oxygen bearing gas to the port, the oxygen traveling to the outer surface(s) of the medium and into the liquid.

8. The process of claim 7 further comprising growing a biofilm on the outer surface(s) of the medium, the oxygen traveling through the biofilm and into the substrate.

9. The process of claim 8 further comprising maintaining the biofilm under endogenous respiration.

10. The process of claim 7 wherein the apparatus has an exhaust port, the gas is air, and gases flow through the apparatus from the port to the exhaust port.

11. The process of claim 10 wherein the exhaust gas has a higher concentration or mass flow rate of carbon dioxide than the inlet gas.

12. The process of claim 8 further comprising performing nitrification in the biofilm.

13. The process of claim 7 wherein at least 100 mg/h of oxygen per liter of substrate is transferred.

14. The process of claim 8 wherein the biofilm has a thickness of at least 20 microns.

15. The process of claim 8 wherein the biofilm performs one or more of:
   (a) nitrification (removal of ammonia); and,
   (b) removal of COD.

16. The process of claim 8 further comprising maintaining the substrate at a low soluble COD concentration and air scrubbing the biofilm to maintain the biofilm under a certain thickness.

17. The process of claim 1 wherein the air bubbles do one or more of
   (a) add additional oxygen to the liquid;
   (b) mix the liquid; or,
   (c) maintain bacteria in suspension in the liquid.

18. The process of claim 7 wherein the liquid is water within a suspended growth bioreactor.

19. The process of claim 7 wherein the biofilm support medium comprises hollow fibers made of a melt spun thermoplastic polymer subjected to thermal or mechanical treatment after spinning to have at least an annular region of increased permeability to oxygen without permitting a flow of liquid water through the walls of the fibers from the outer surfaces of the fibers to the lumens.

20. The process of claim 6 wherein the thickness of the biofilm is reduced by providing the air bubbles in the liquid.

21. The process of claim 1 wherein the air bubbles in the liquid are sufficiently gentle to leave the biofilm on the outer surface(s) of the medium.

22. The process of claim 1 comprising using the air bubbles in the liquid to maintain biomass in suspension.

23. The process of claim 1 wherein the biofilm support medium comprises a plurality of membranes, each membrane supporting a layer of biofilm thereon, the air bubbles gently mixing the liquid between adjacent layers of biofilm.

* * * * *